US012434169B2

(12) United States Patent
O'Connell

(10) Patent No.: US 12,434,169 B2
(45) Date of Patent: Oct. 7, 2025

(54) SYSTEM AND METHOD FOR PEPPERS GHOST FILMING AND DISPLAY

(71) Applicant: Ian O'Connell, London (GB)

(72) Inventor: Ian O'Connell, London (GB)

( * ) Notice: Subject to any disclaimer, the term of this patent is extended or adjusted under 35 U.S.C. 154(b) by 66 days.

(21) Appl. No.: 18/272,575

(22) PCT Filed: Oct. 15, 2021

(86) PCT No.: PCT/IB2021/059536
§ 371 (c)(1),
(2) Date: Jul. 15, 2023

(87) PCT Pub. No.: WO2022/153104
PCT Pub. Date: Jul. 21, 2022

(65) Prior Publication Data

US 2024/0075402 A1 Mar. 7, 2024

Related U.S. Application Data

(60) Provisional application No. 63/138,060, filed on Jan. 15, 2021.

(51) Int. Cl.

| | |
|---|---|
| ***G02B 30/56*** | (2020.01) |
| ***A63J 5/02*** | (2006.01) |
| ***G02B 27/14*** | (2006.01) |
| ***G06F 3/14*** | (2006.01) |
| ***H04N 5/222*** | (2006.01) |
| ***H04N 21/2187*** | (2011.01) |

(Continued)

(52) U.S. Cl.
CPC .............. *A63J 5/02* (2013.01); *G02B 27/144* (2013.01); *G02B 30/56* (2020.01); *G06F 3/1446* (2013.01); *H04N 5/222* (2013.01); *H04N 21/2187* (2013.01); *H04N 21/41415* (2013.01); *H04N 21/4307* (2013.01); *H04N 23/56* (2023.01); *H04N 23/60* (2023.01); *H04N 23/84* (2023.01)

(58) Field of Classification Search
None
See application file for complete search history.

(56) References Cited

U.S. PATENT DOCUMENTS

2011/0157297 A1* 6/2011 O'Connell ........... H04N 19/132 348/E7.083
2015/0219817 A1* 8/2015 Kim ........................ G02B 6/004 264/1.24

(Continued)

*Primary Examiner* — Eileen M Adams

(57) ABSTRACT

A system and method for filming and displaying a 3D image is provided, including acquisition of one or more video images at one or more capture locations of one or more subjects, the images being recorded as a data film for storage and playback, or transmission over a network, to a watching audience. The video images at the display venue are projected onto or through semi-transparent screens arranged to appear in front of a backdrop to a stage. The images may be displayed alongside or on the same stage as live performing talent, the projection perceived by the viewing audience as a virtual image. The semi-transparent screen is invisible to the watching audience or the cameras during the performance. The video image viewed by an online audience is perceived as bearing a close likeness to subject(s), providing a real presence of a virtual subject performing on a stage.

15 Claims, 60 Drawing Sheets

(51) Int. Cl.

| | |
|---|---|
| ***H04N 21/414*** | (2011.01) |
| ***H04N 21/43*** | (2011.01) |
| ***H04N 23/56*** | (2023.01) |
| ***H04N 23/60*** | (2023.01) |
| ***H04N 23/84*** | (2023.01) |

(56) References Cited

U.S. PATENT DOCUMENTS

2016/0266543 A1* 9/2016 Crowder ................ G02B 30/56
2019/0271943 A1* 9/2019 Bezirganyan ........ H04N 13/302

* cited by examiner

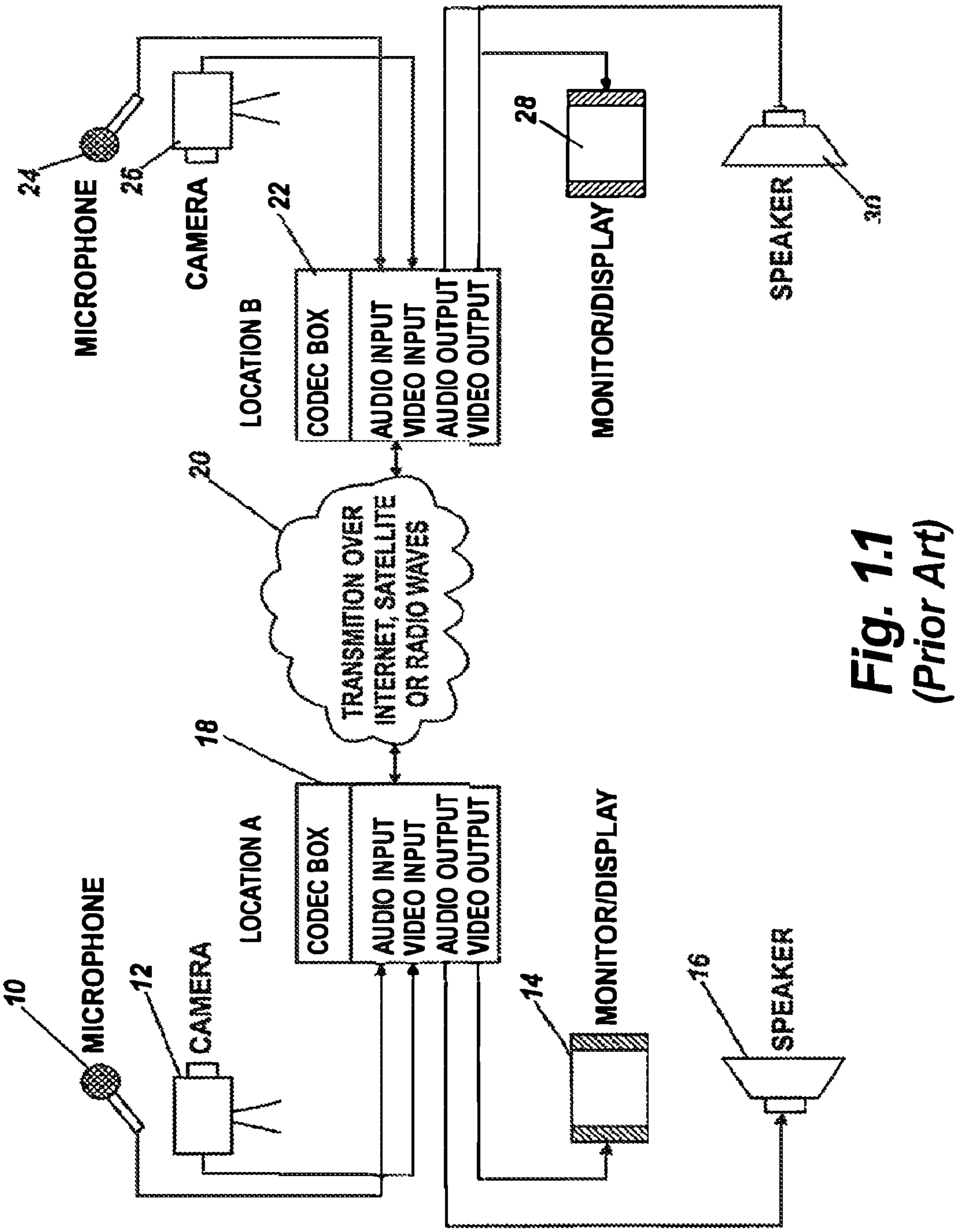
Fig. 1.1
(Prior Art)

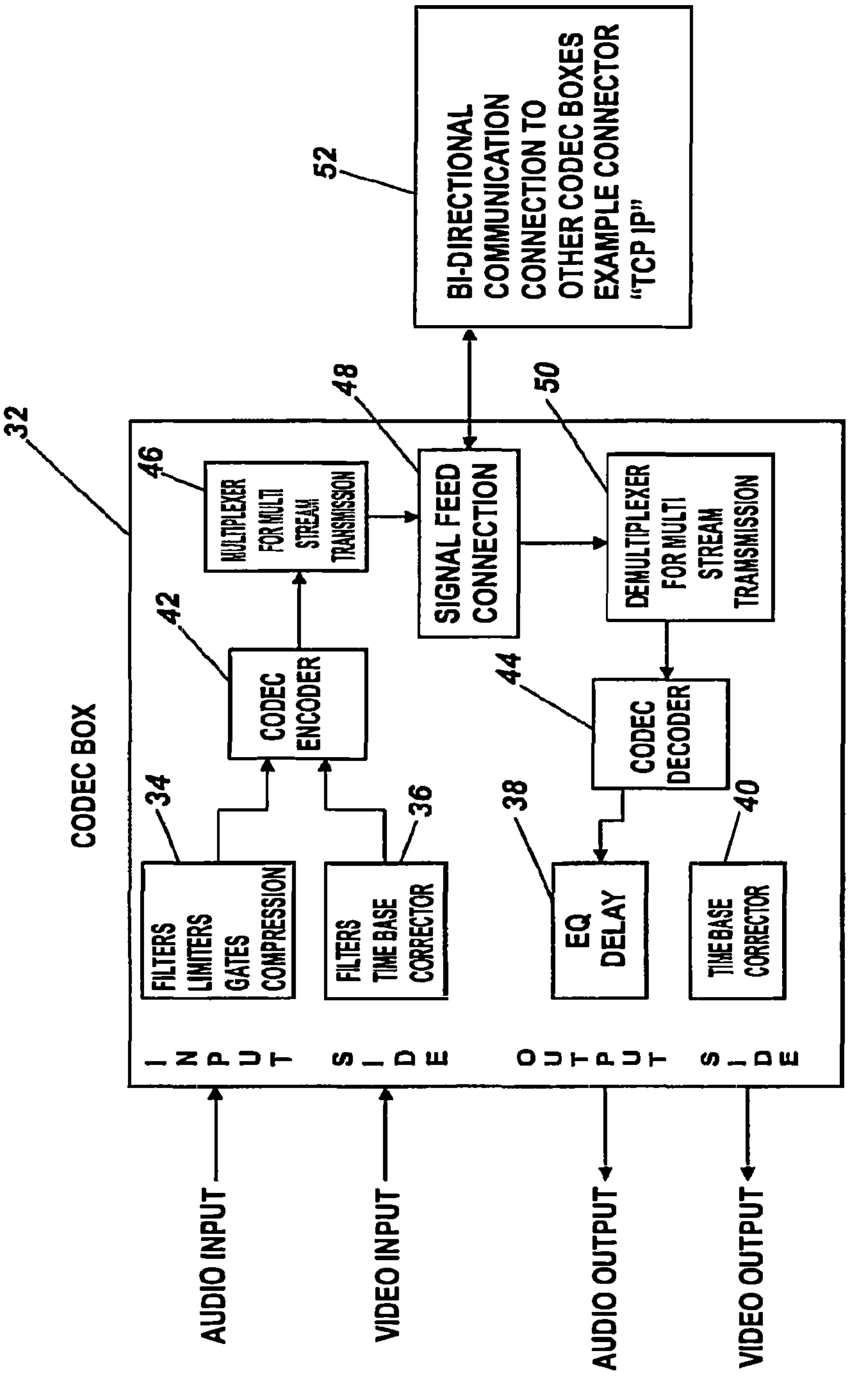
Fig. 1.2
(Prior Art)

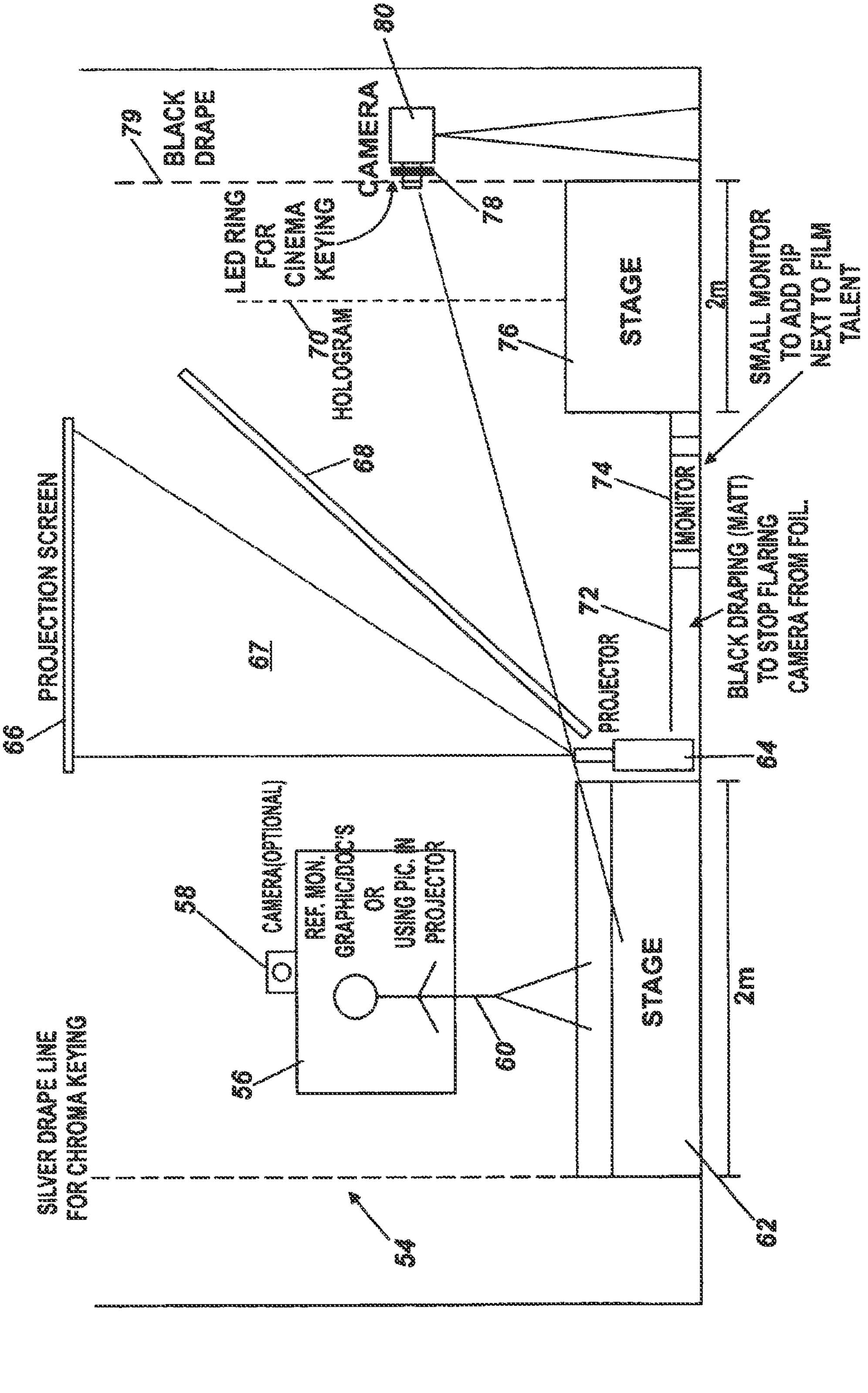
FIG. 2.1

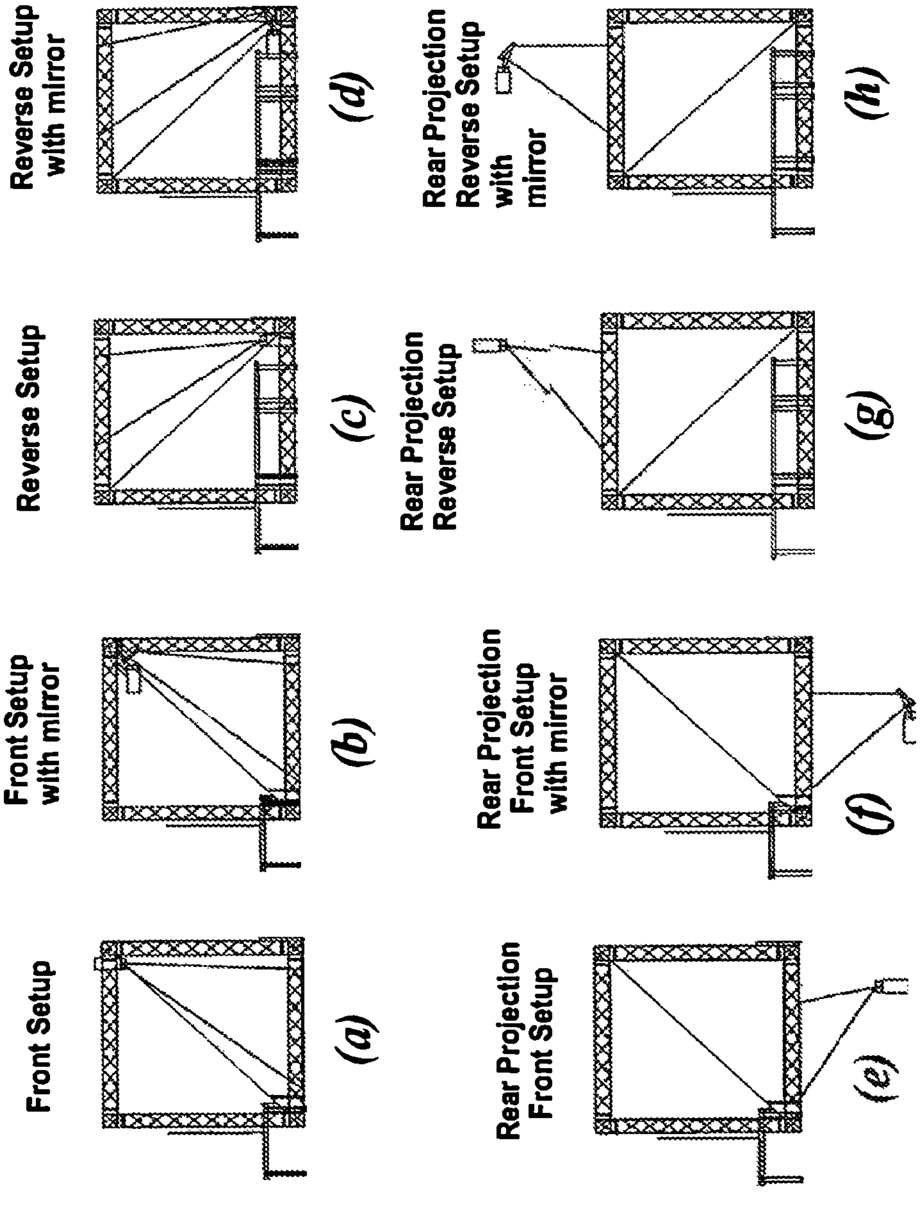
Fig. 3.1

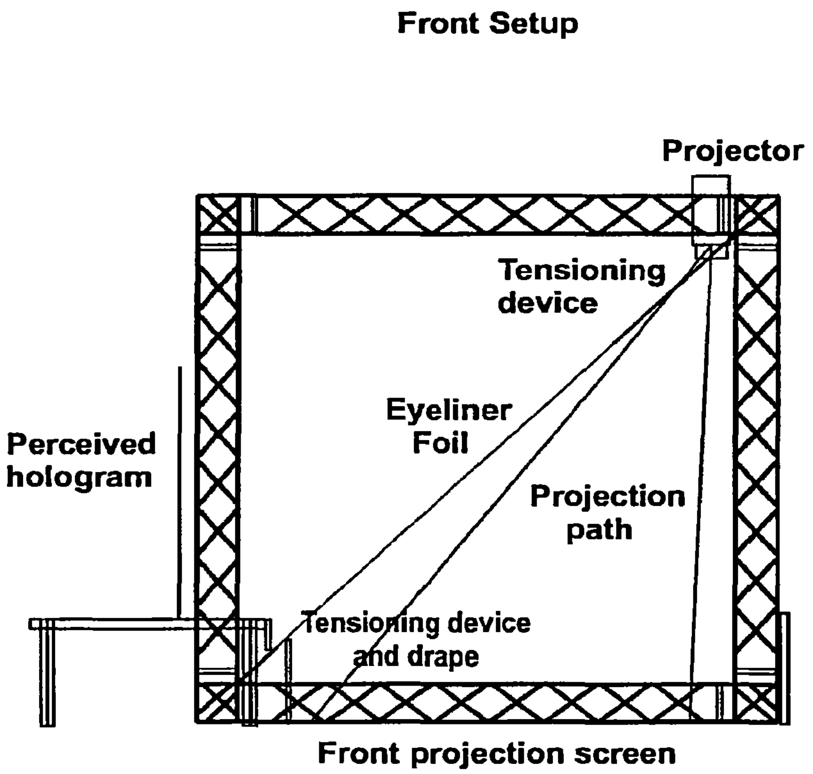
*Fig.* 3.1(a)

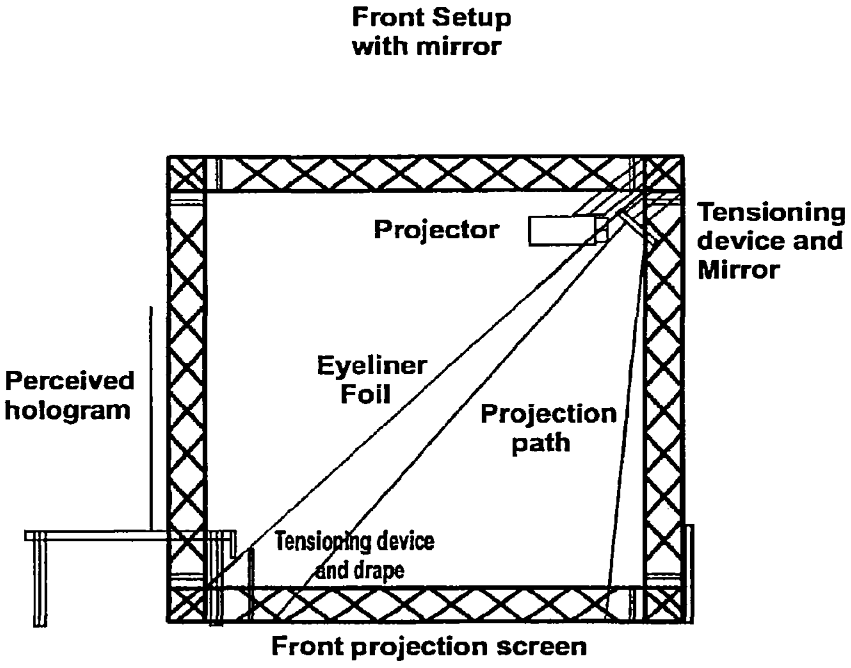
*Fig.* 3.1(b)

Reverse Setup
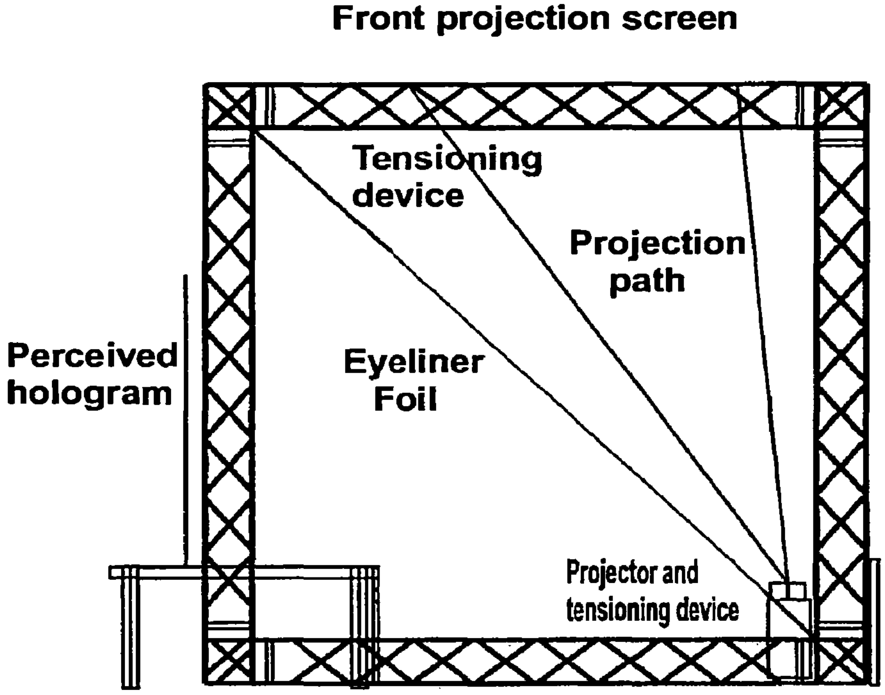
*Fig. 3.1(c)*

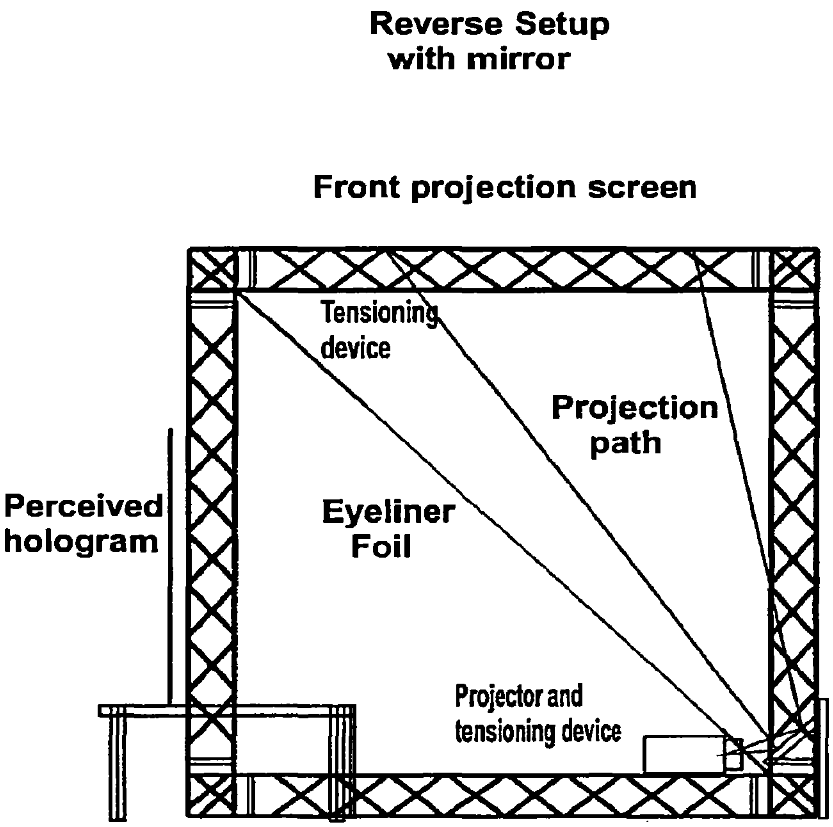
*Fig. 3.1(d)*

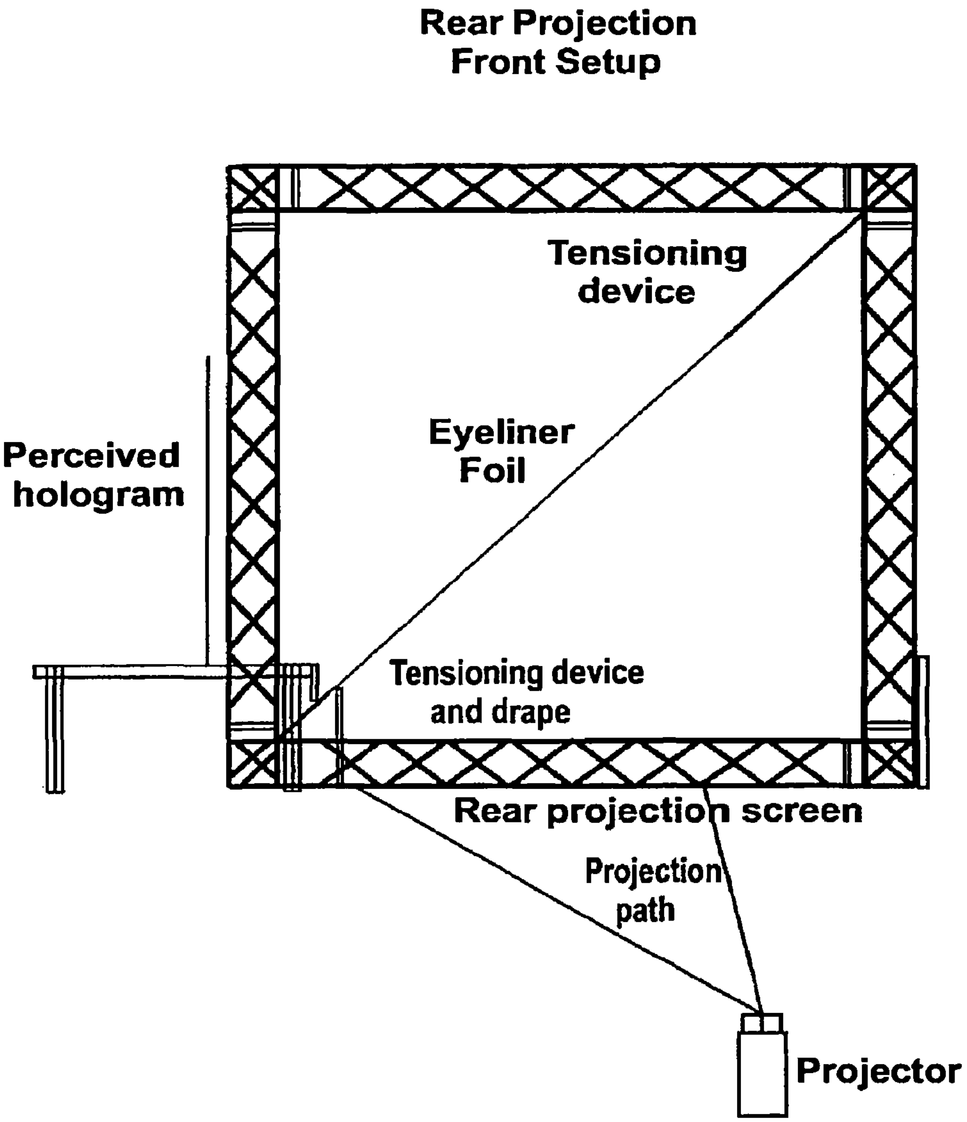
*Fig. 3.1(e)*

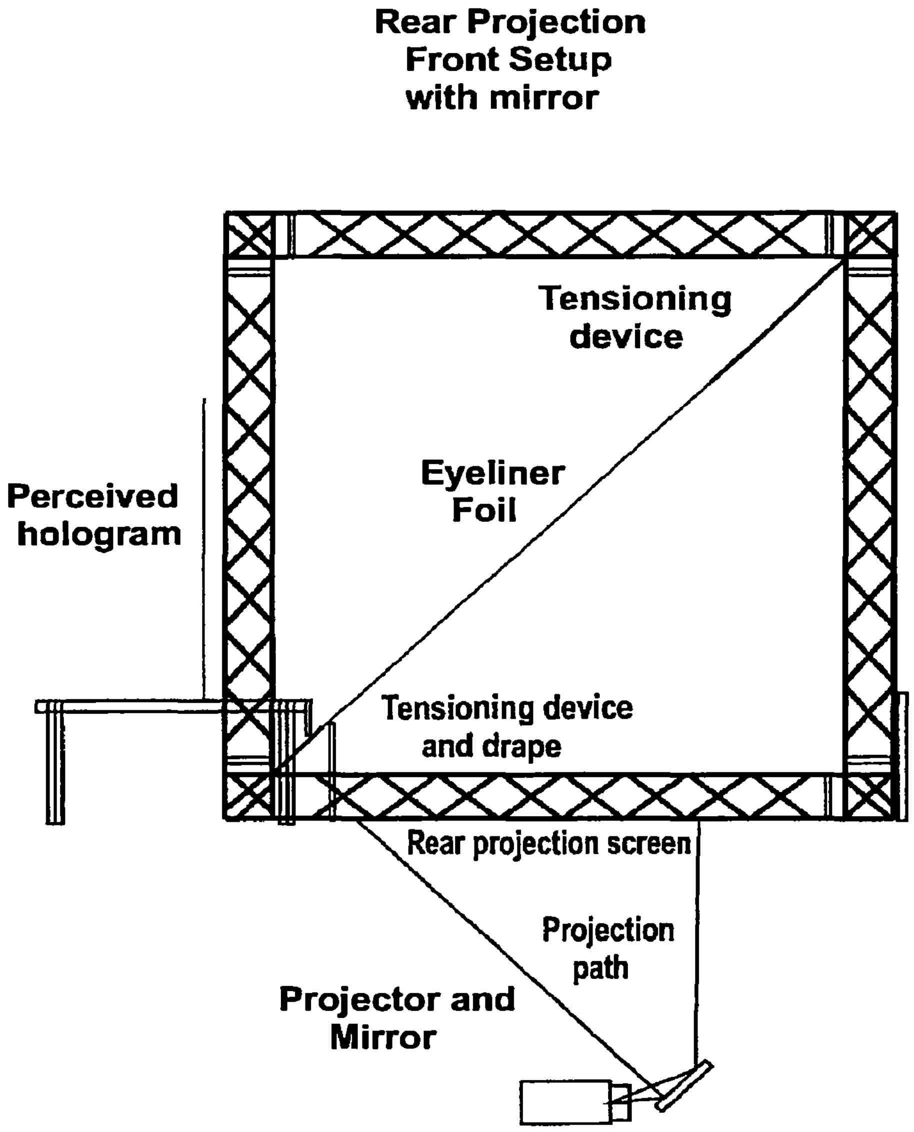
*Fig. 3.1(f)*

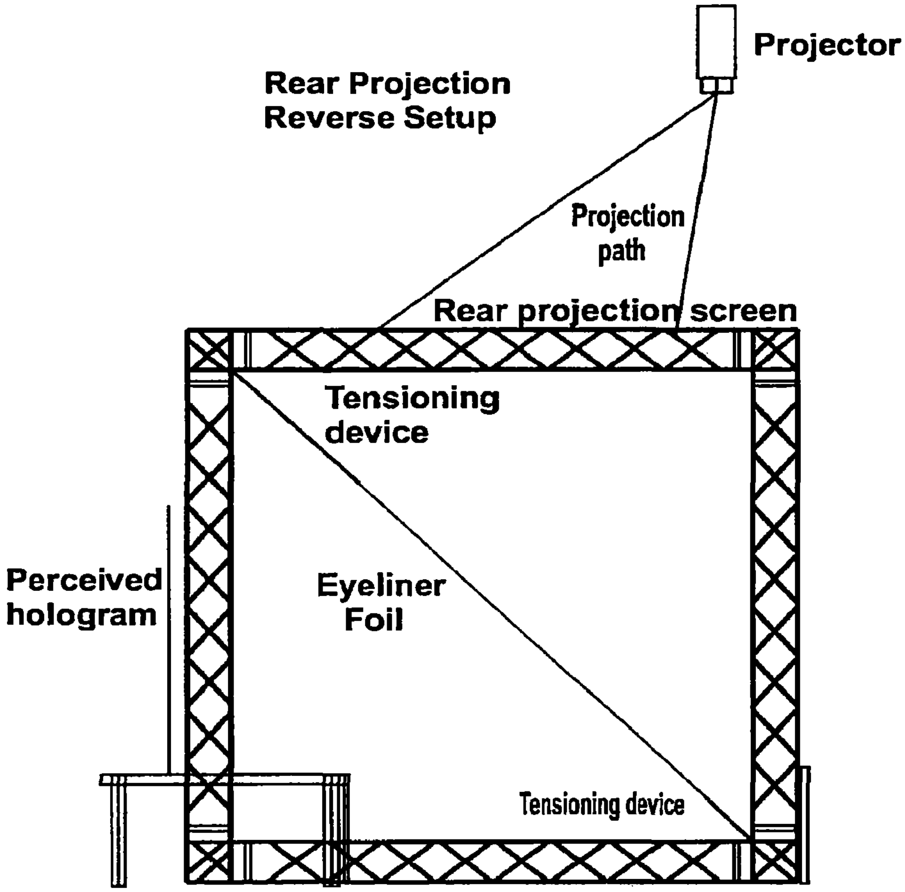
*Fig. 3.1(g)*

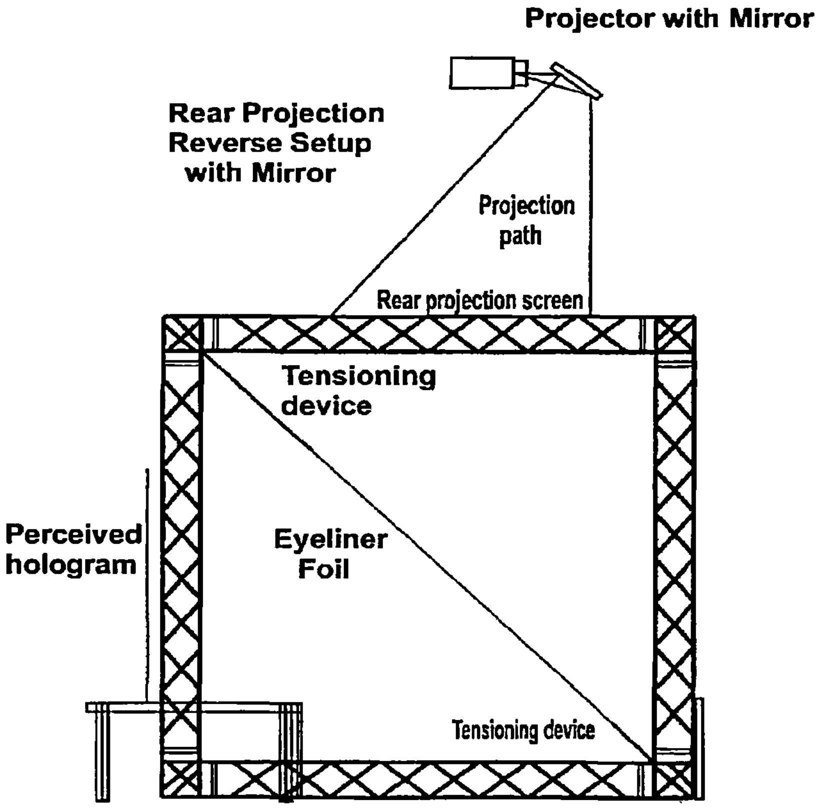
*Fig. 3.1(h)*

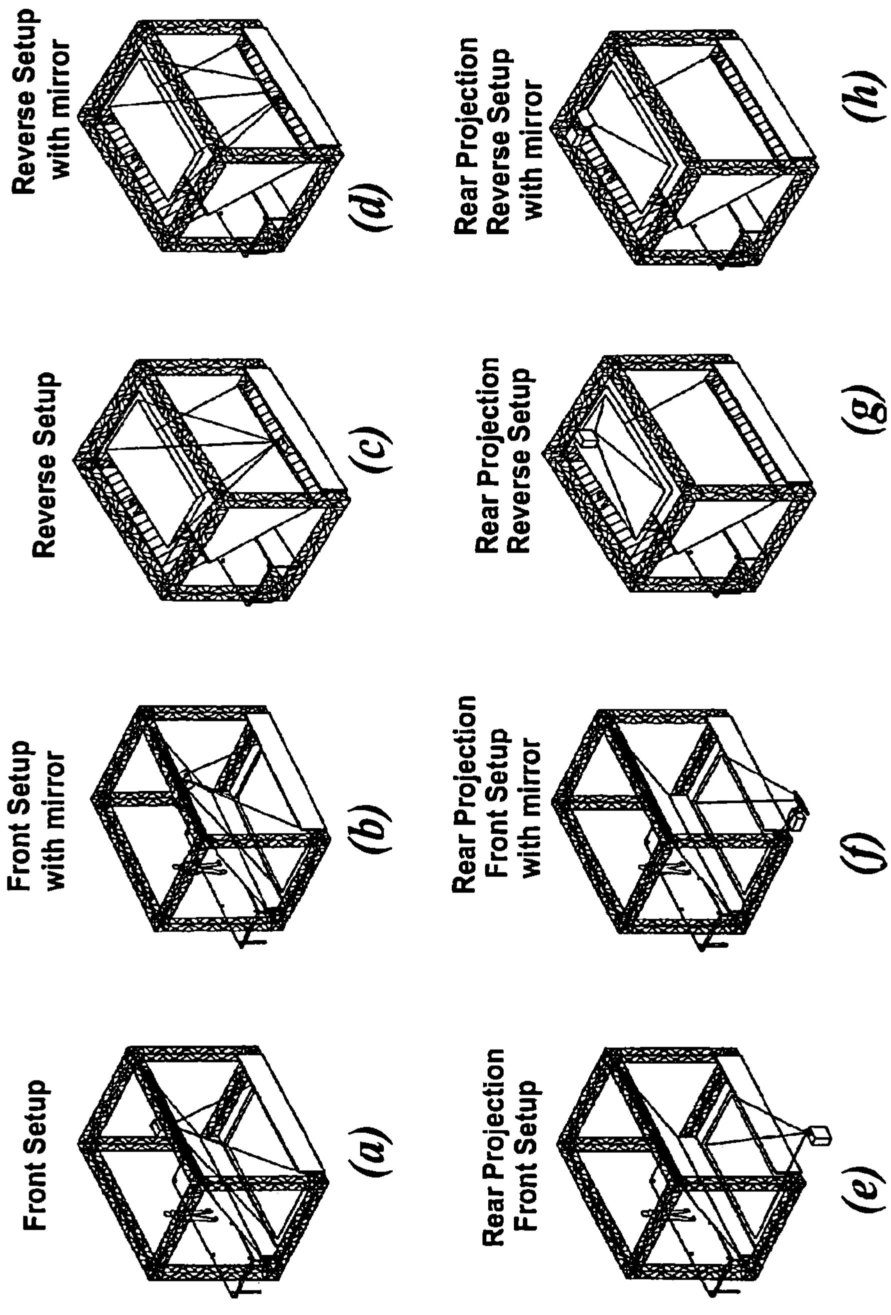
Fig. 3.2

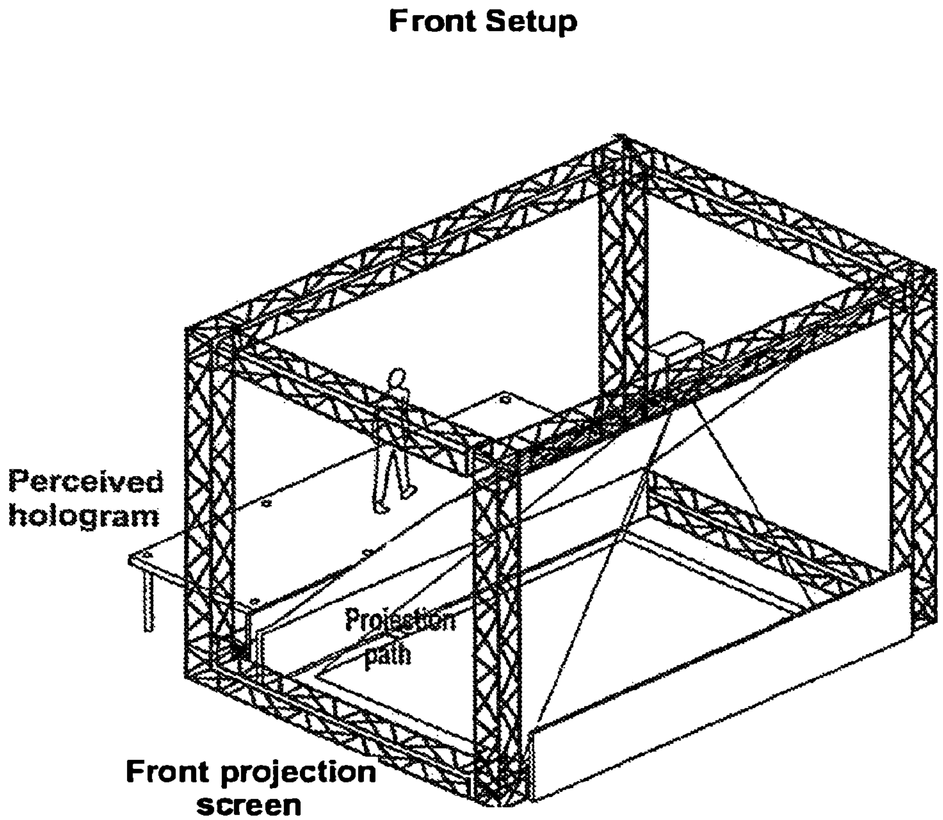
Fig. 3.2(a)

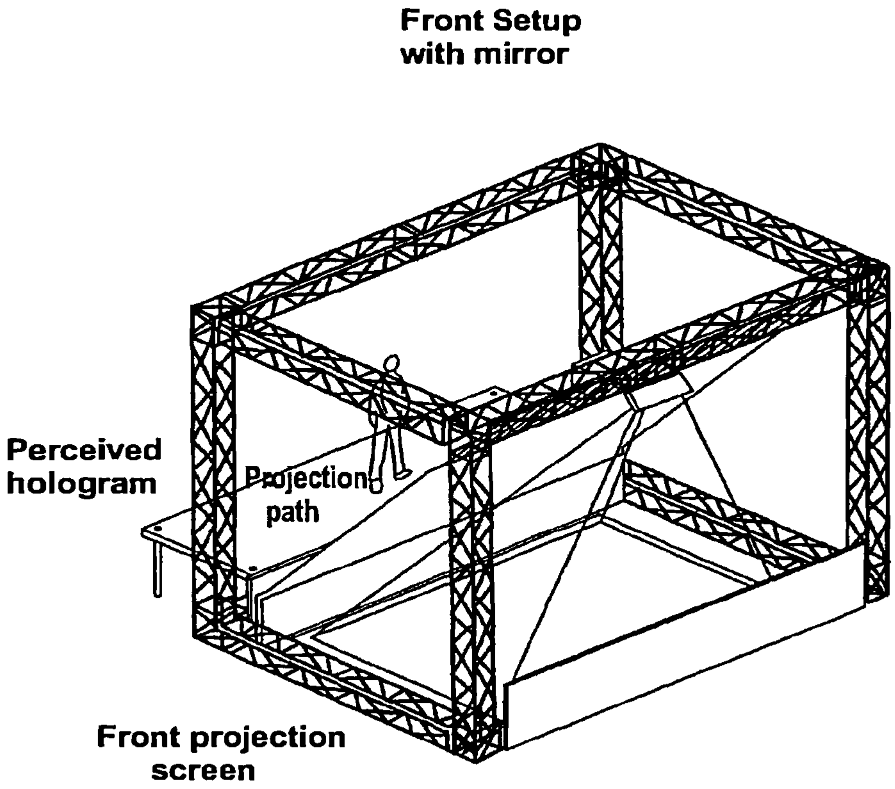
*Fig. 3.2(b)*

Reverse Setup
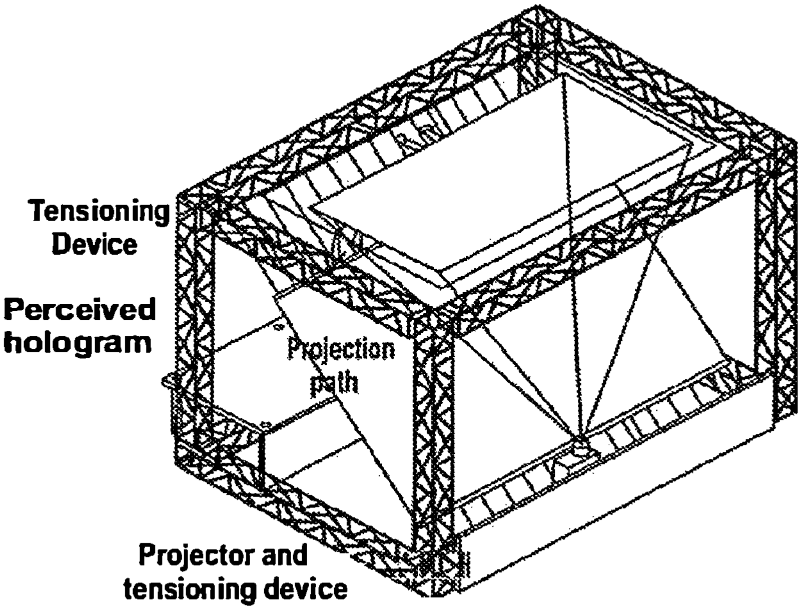
*Fig. 3.2(c)*

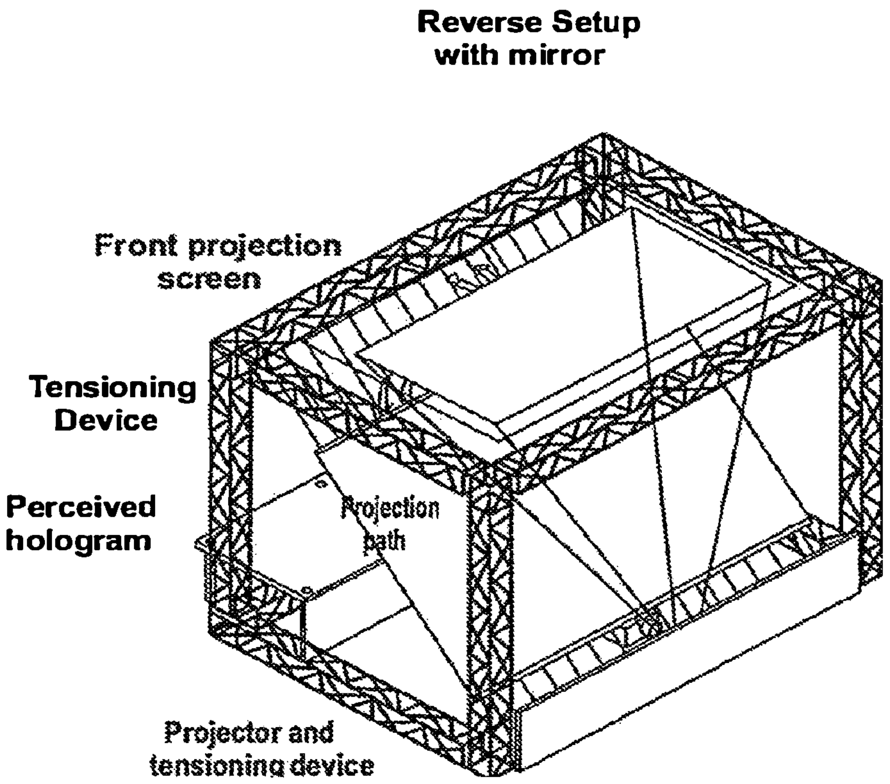
Fig. 3.2(d)

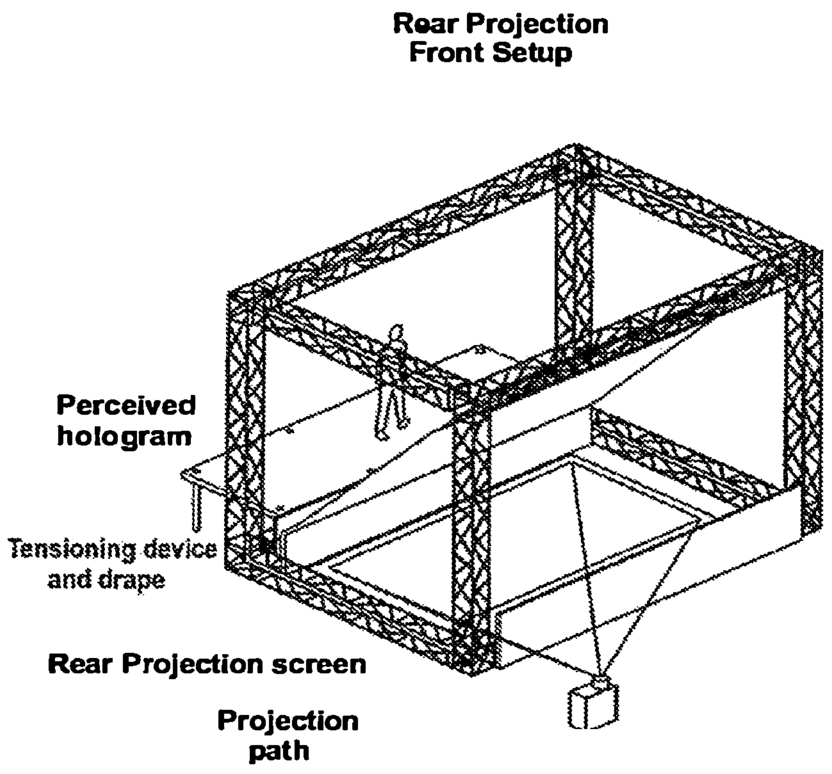
*Fig. 3.2(e)*

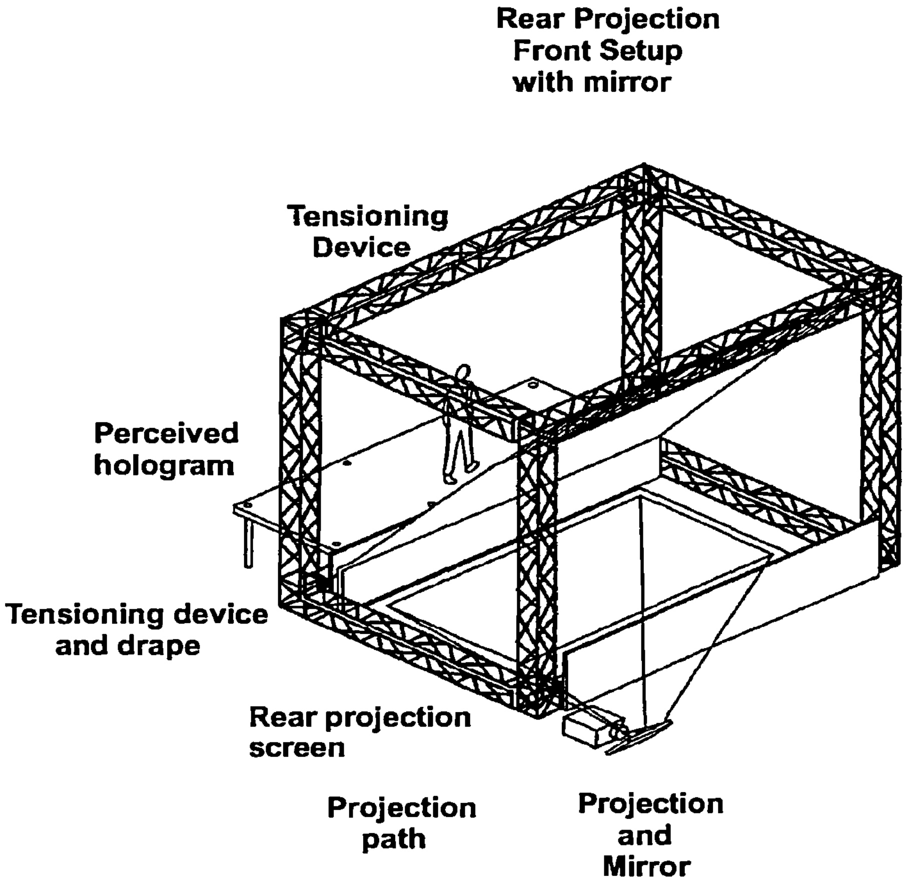
*Fig. 3.2(f)*

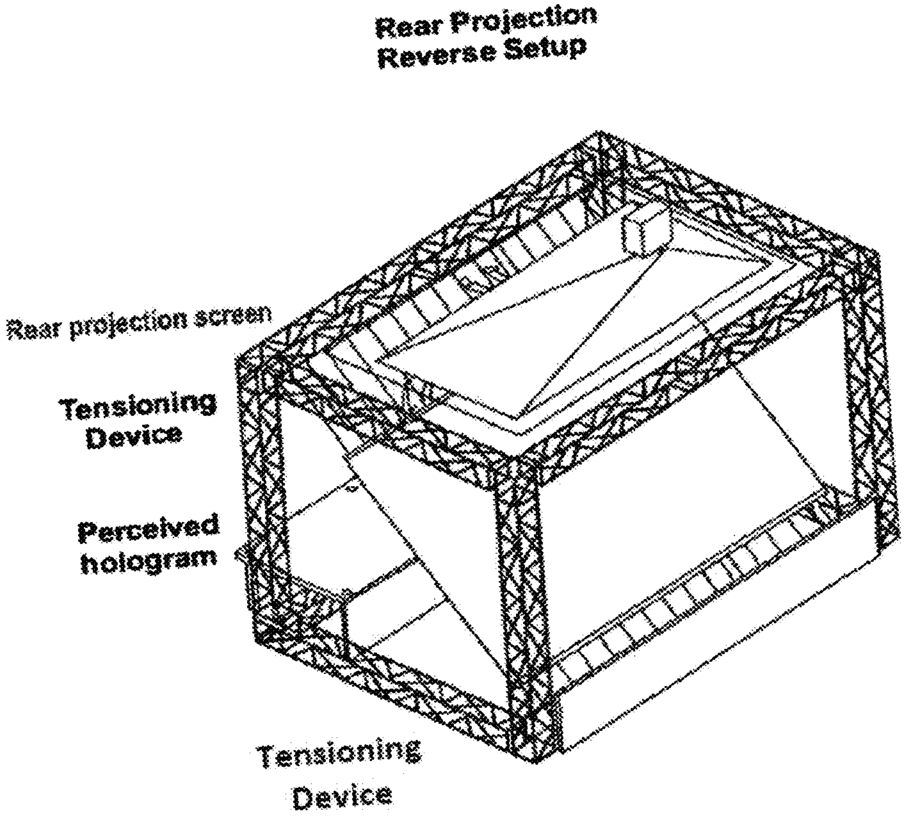
Fig. 3.2(g)

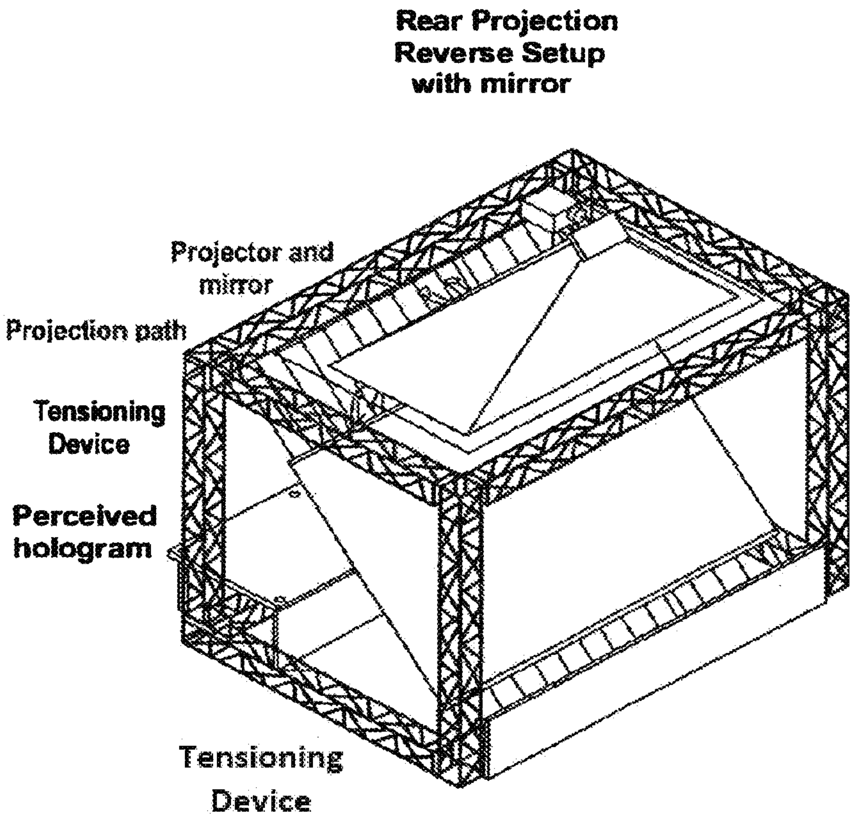
*Fig. 3.2(h)*

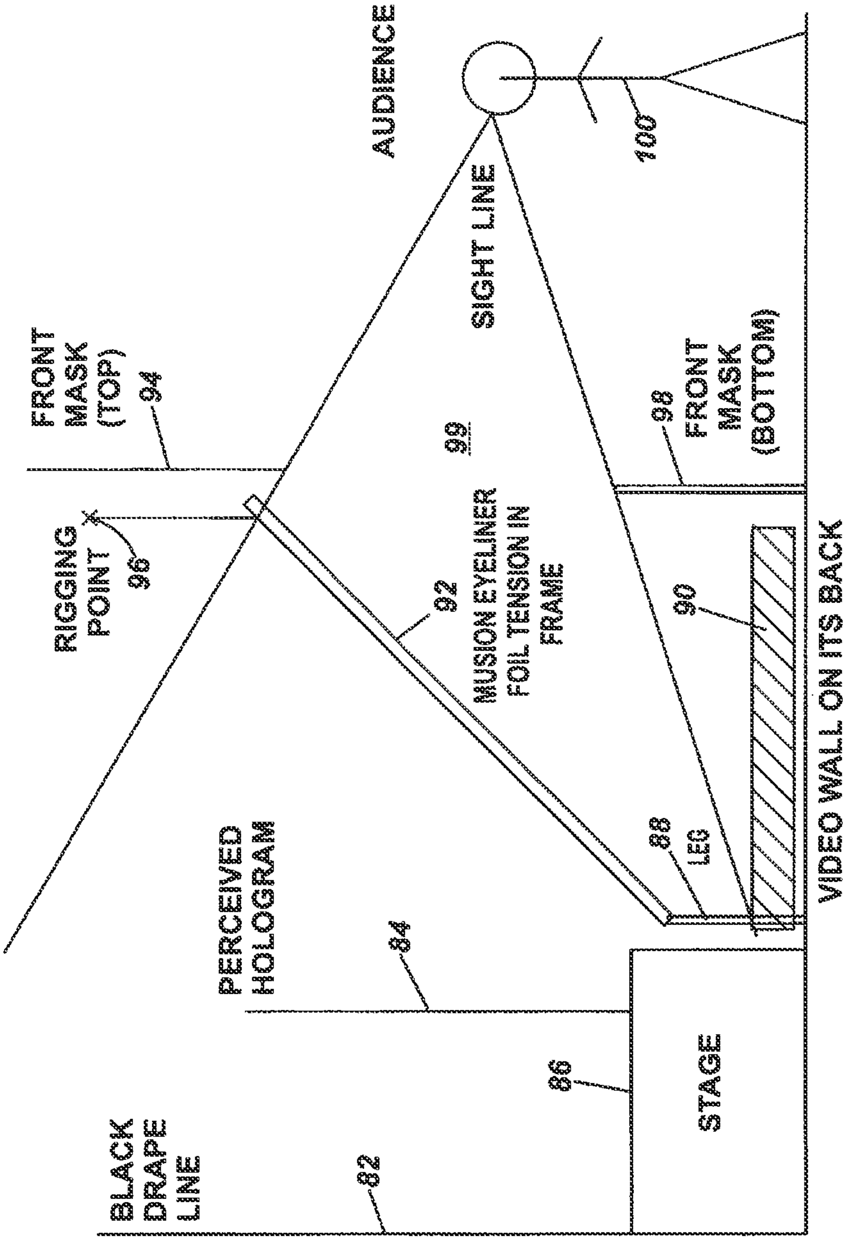
FIG. 3.3

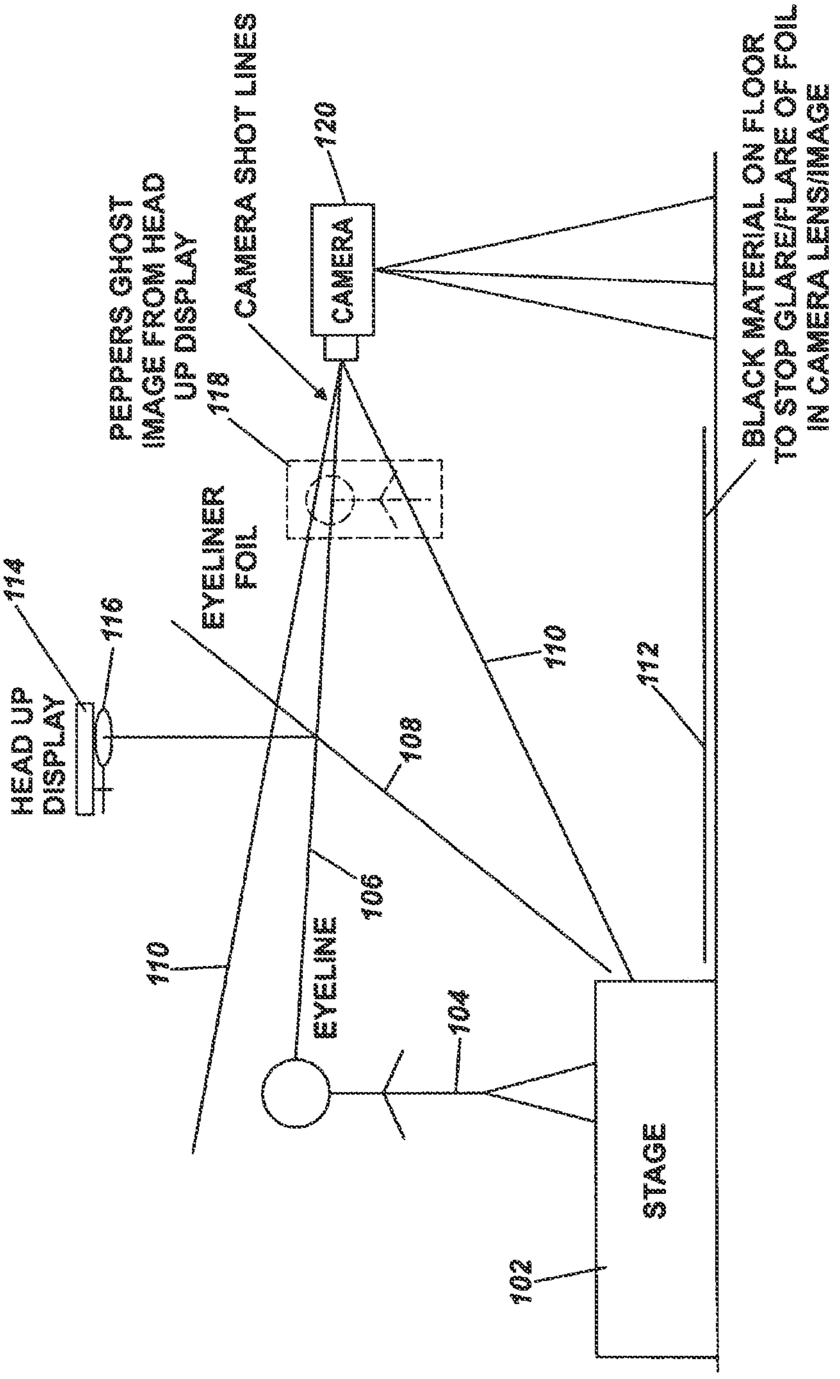
FIG. 4.2

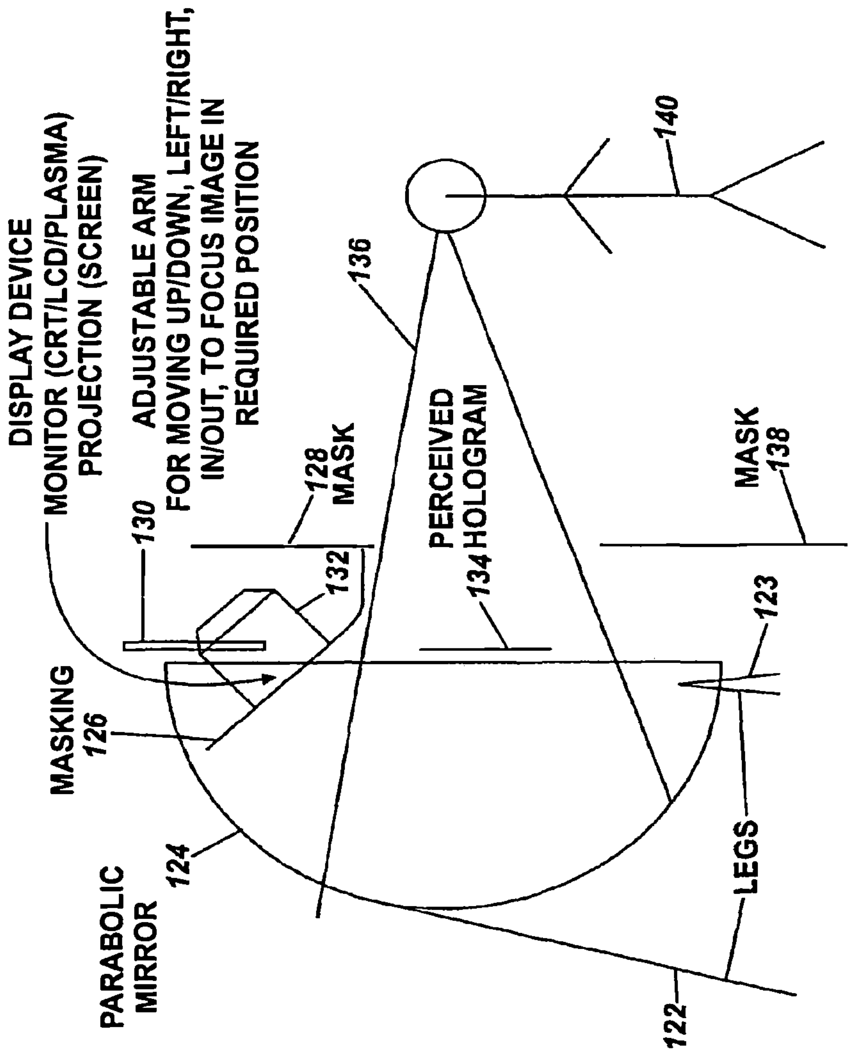
Fig. 5.1

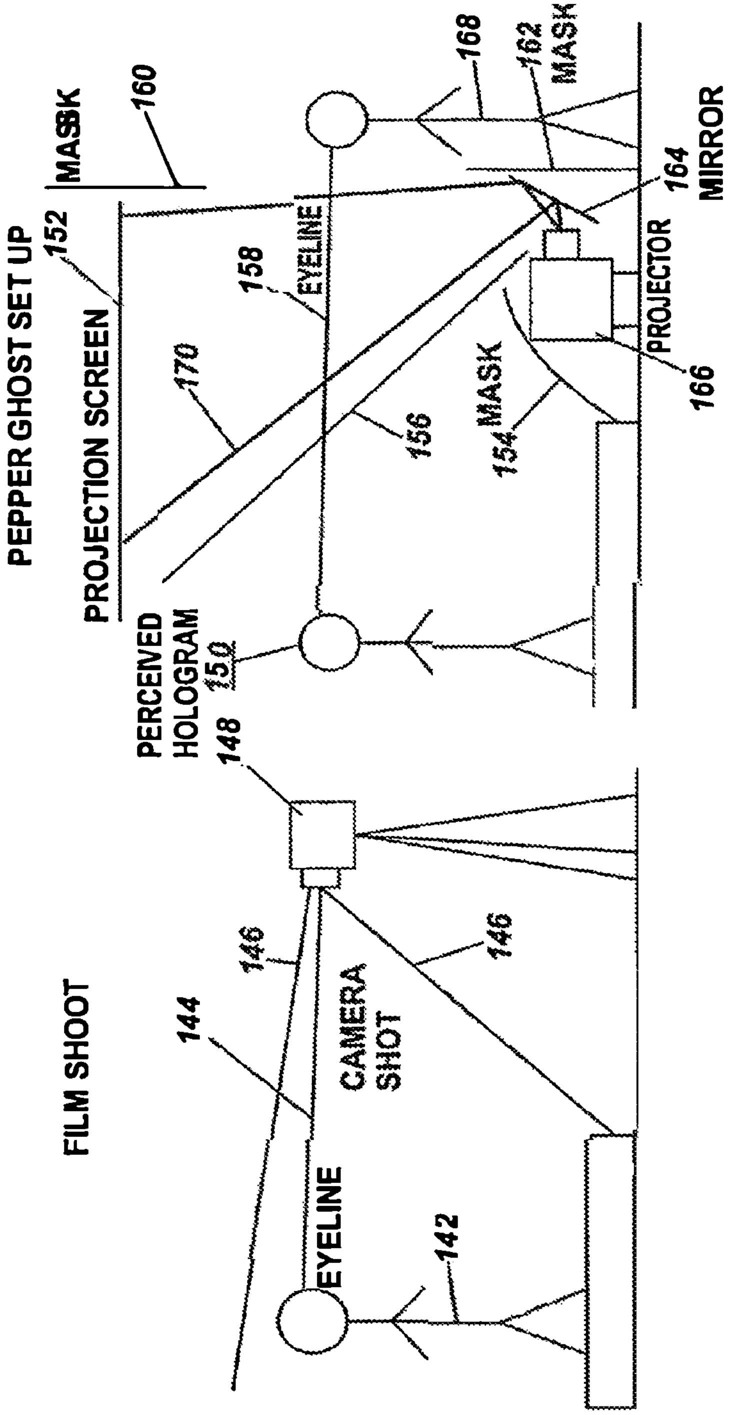
Fig. 6.1

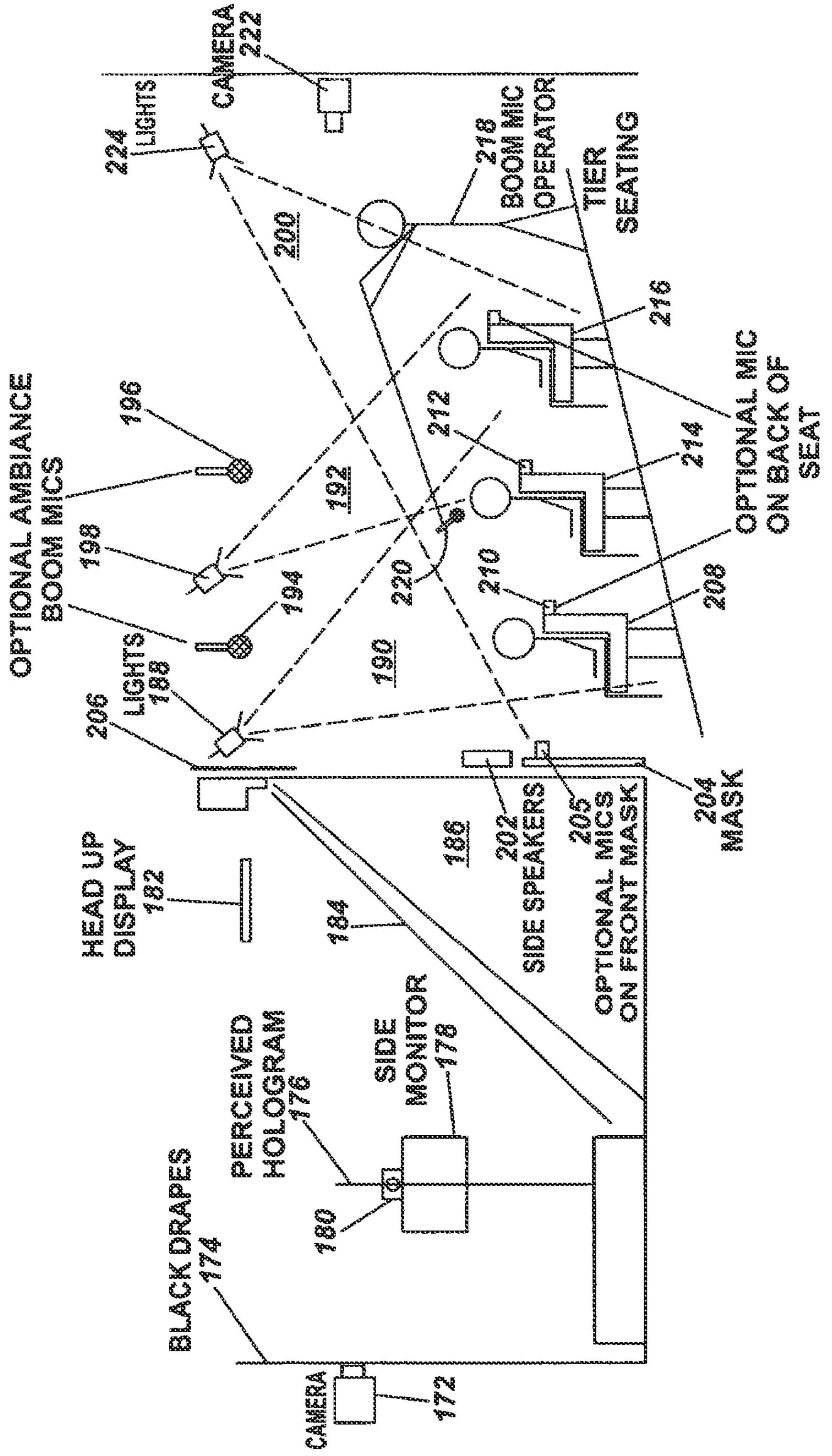
FIG. 7.1

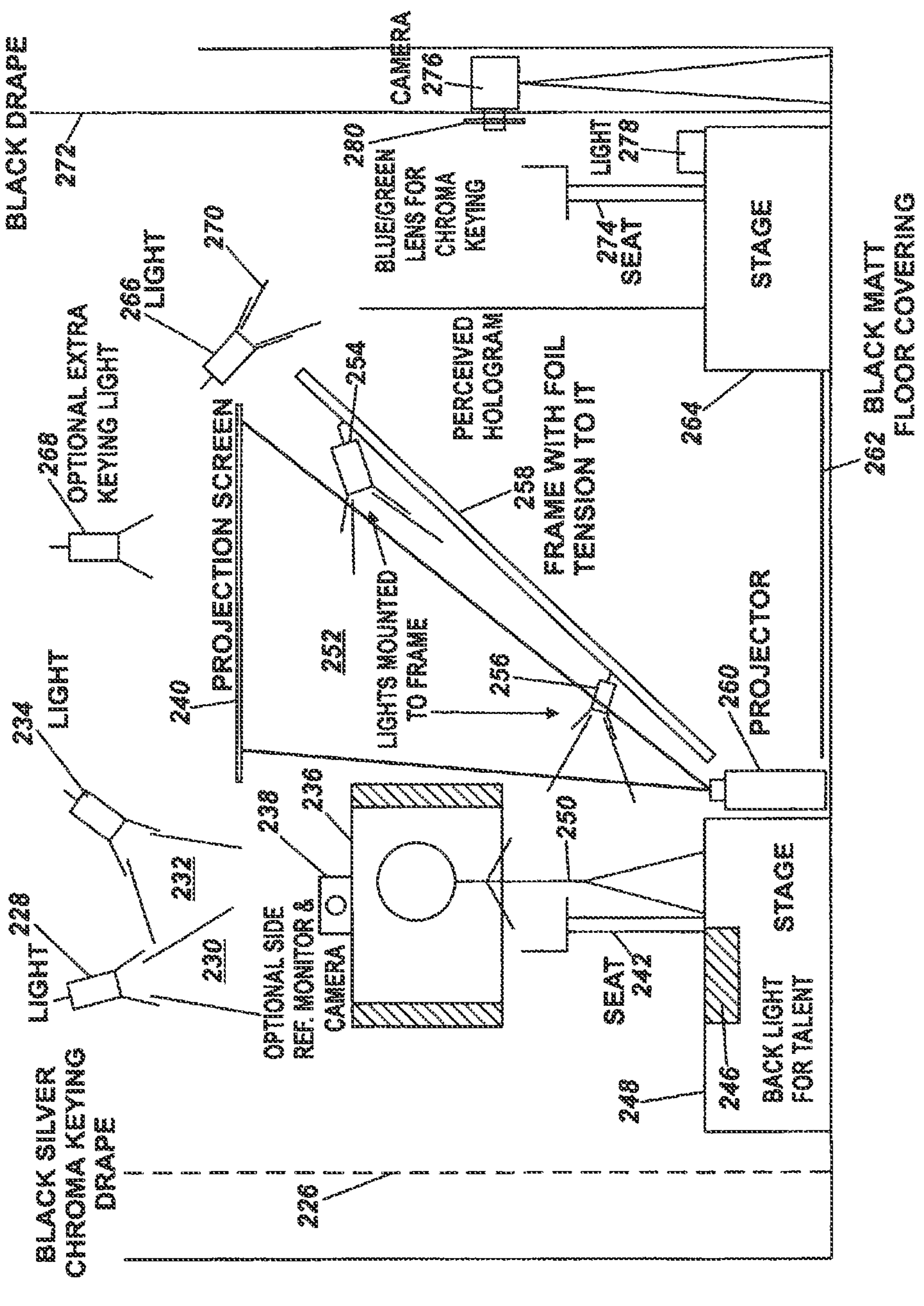
FIG. 7.2

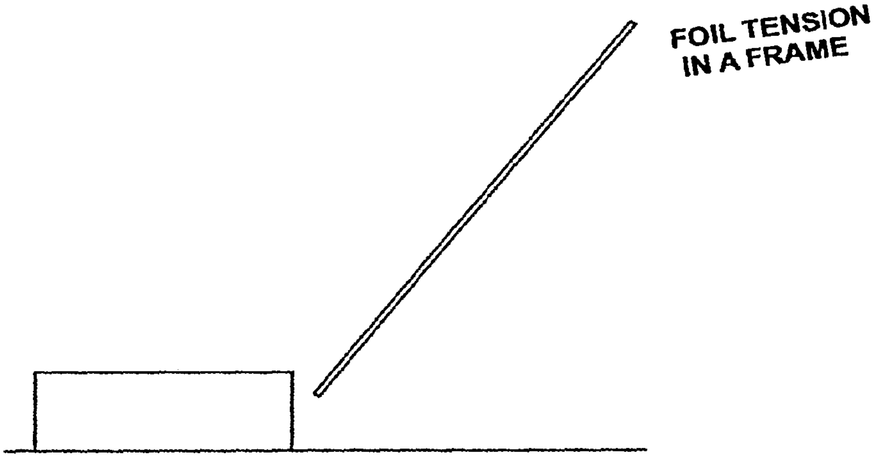
*Fig. 7.3*

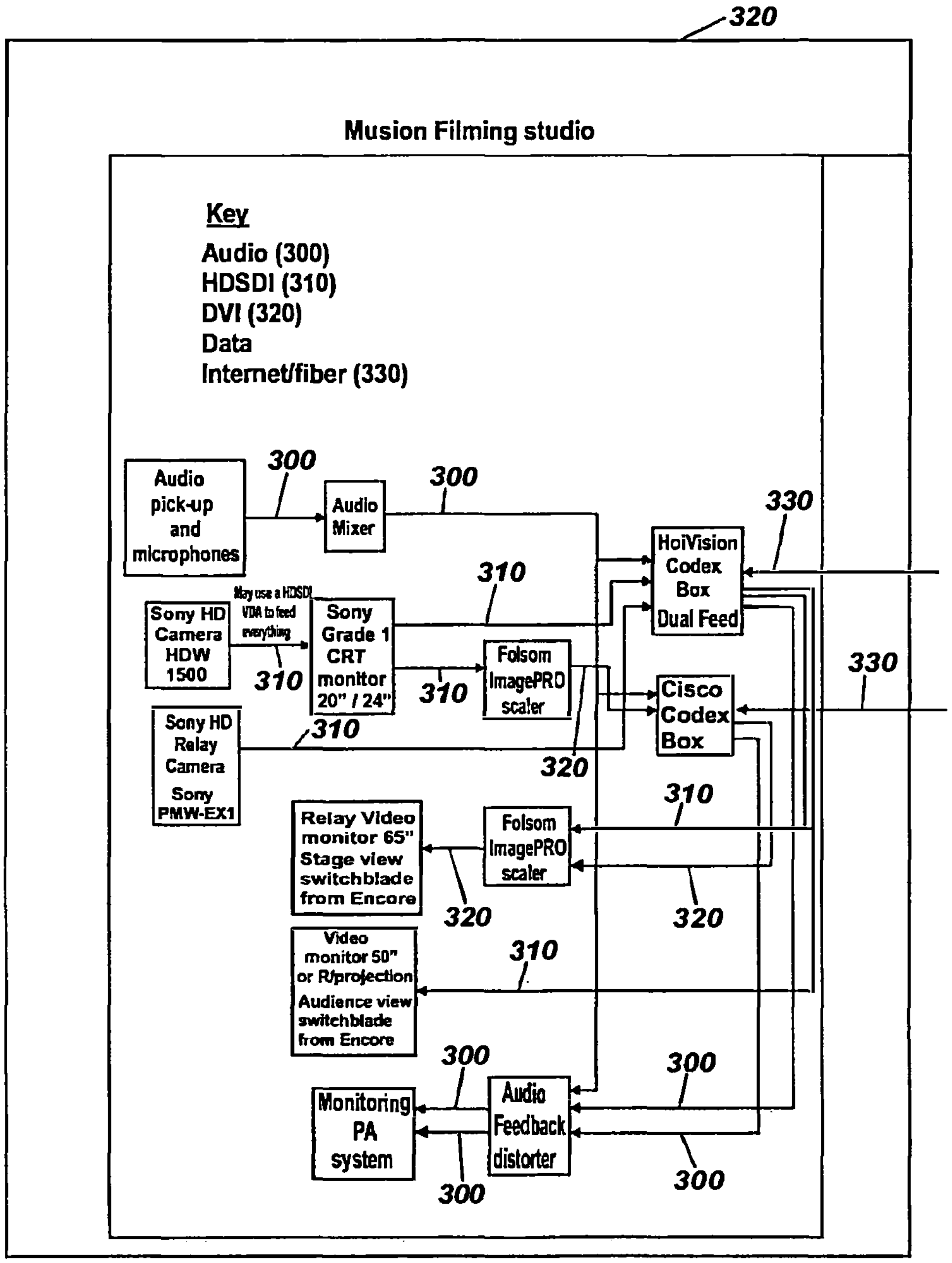
Fig. 7(A.1)

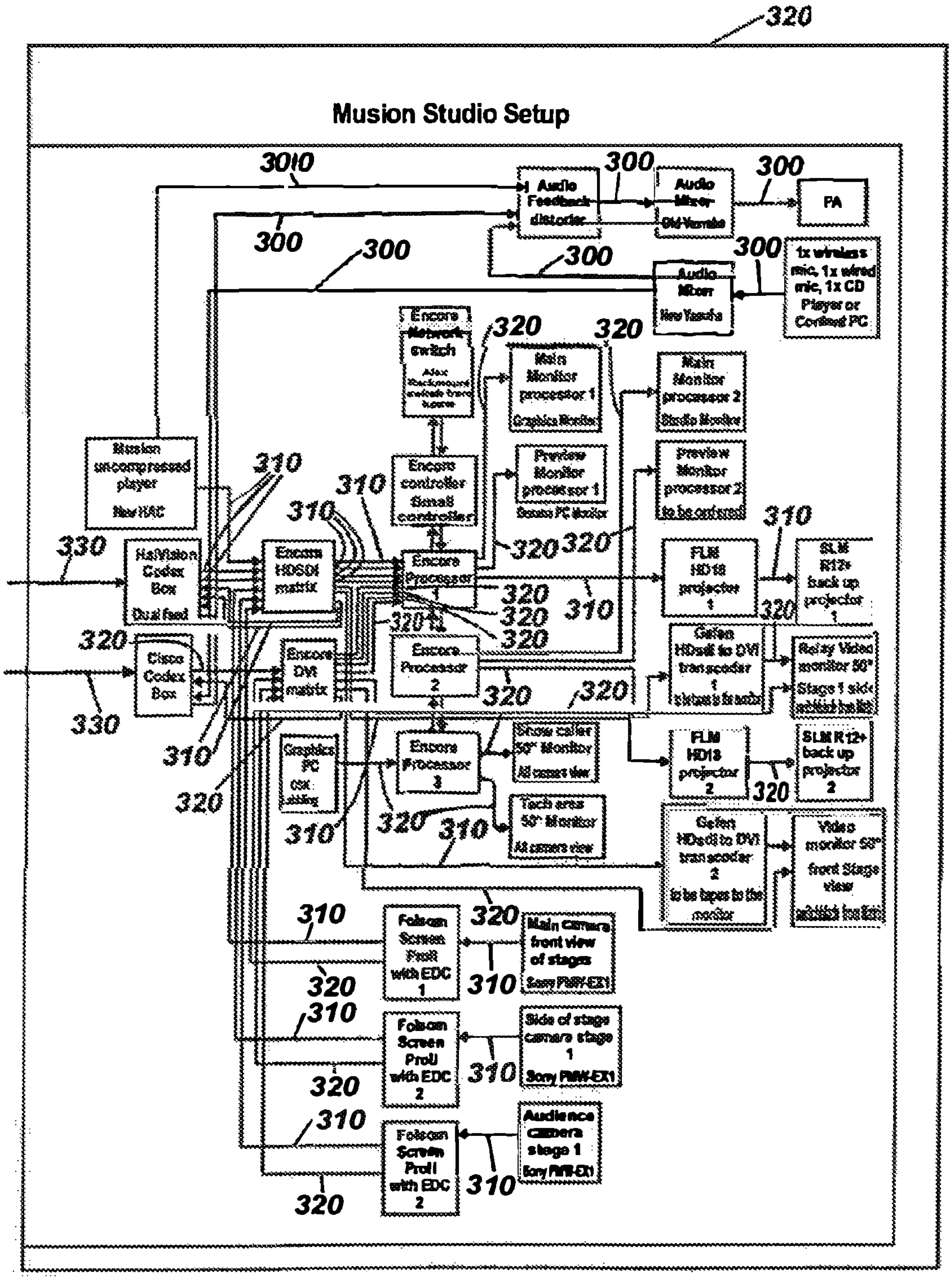
Fig. 7A(2)

Key:

A - High/front. Covers head to waist/shuttered off stage floor
B - Low/front. Covers waist to feet including shoes/shuttered off stage, so height of lamp must be height of stage
C - High/rim. Covers head to waist/shuttered off stage floor
D - Low/rim. Covers to feet including shoes/shuttered off stage, so height of lamp must be height of stage
E* - floor fill - lifts shadows in clothing
F* - eye light - hard focus slot + diff?
G* - overhead Kinos - lifts dark hair
H - High/rim. Centre backlight (head to waist) / shuttered off stage A - D, H: Focus with hard edge shutters, then slightly soften to mask cross-over lines. Use ND/dimmers to balance body/legs. Make sure shoes are fully covered.

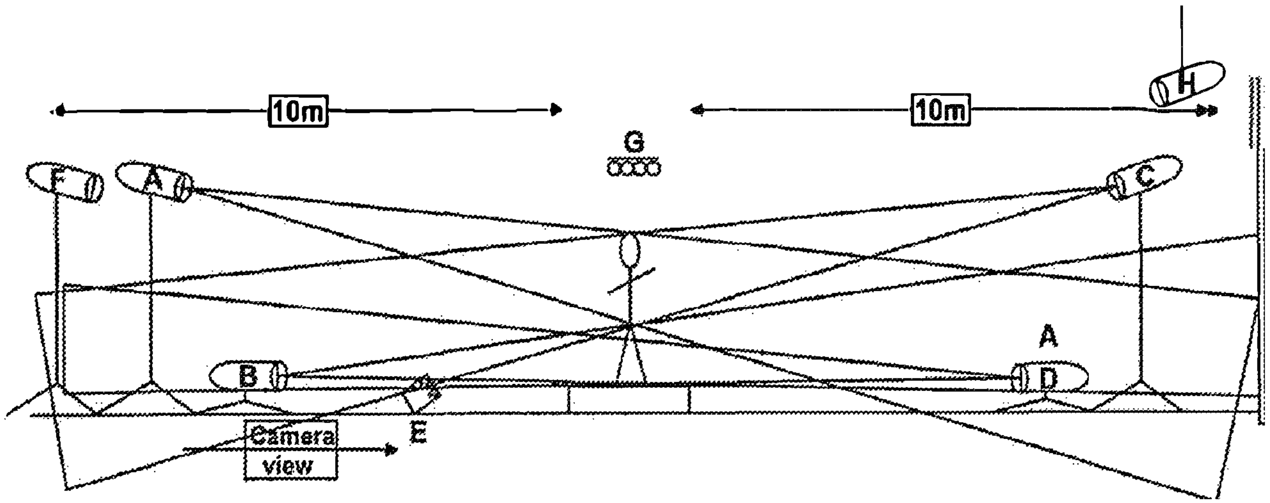

Fig. 8.1

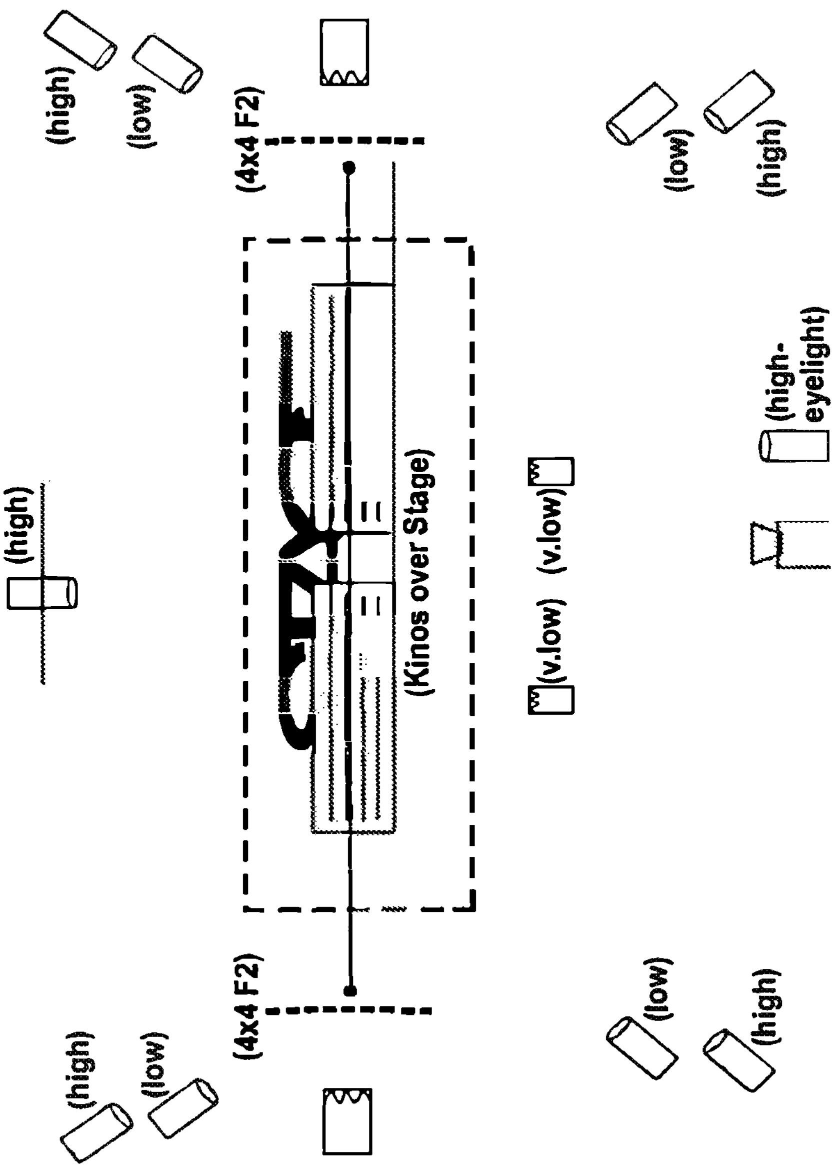
*Fig. 8.2*

5x ETC Source4 (50° or 25-50 zoom) ellipsoidal spots* on high (14ft) stands
4x ETC Source4 (50° or 25-30 zoom) ellipsoidal spots* on lowboys/turtles (lens height to match height of studio staging)
1x ETC Source4 (36° or 25-30 zoom) ellipsoidal spot* flown/hung as centre backlight

* *alternatives accepted: any 750w HPL or 1kW/1.2kW tungsten profile/ellipsoidal spot with beam angles as specified*

2x 4 Bank 4ft KinoFlos (tungsten tubes) on goalpost over studio staging
2x 2kW Fresnels on regular stands each through 4' x 4' diffusion frame (F2 / 1/2 Diff)
2x 650w Fresnels on lowboys/turtles A selection of large and small flags and Charlie bars.
Stands, knuckles, etc for above Various black/white poly/foam core sheets and support ND0.3 and ND0.6 filter
Hampshire Frost, F1 / 1/4 Diff and F2 / 1/2 Diff filter 4-9 ways of 2kW dimming if available

*Fig. 8.3*

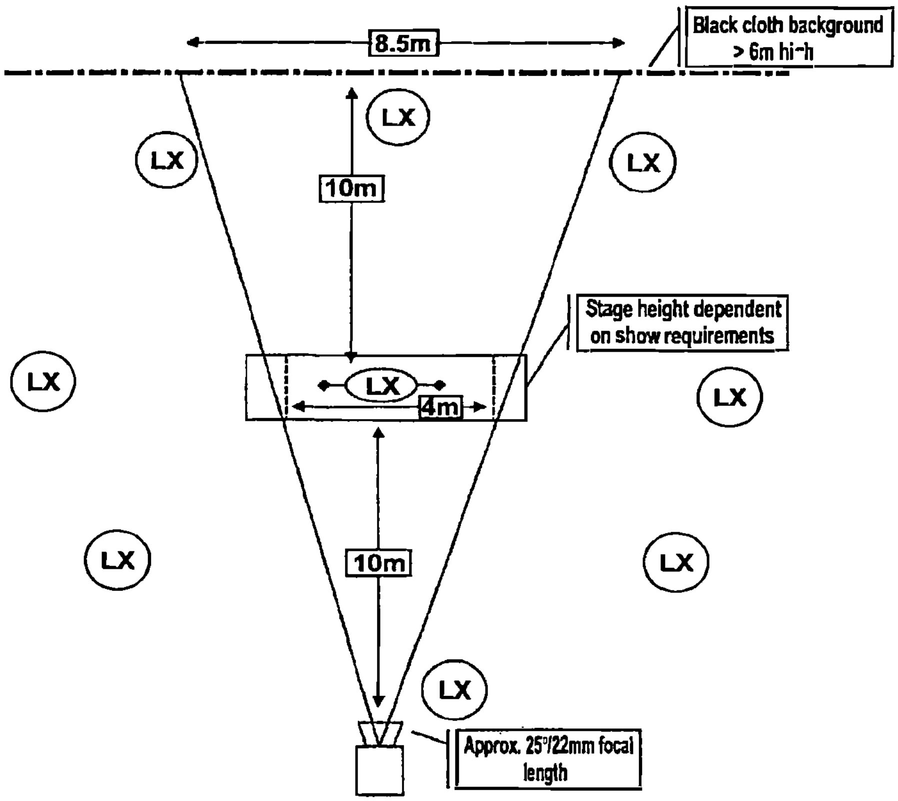
*Fig. 8.4*

SYSTEM AND METHOD FOR PEPPERS GHOST FILMING AND DISPLAY

CROSS REFERENCES TO RELATED APPLICATIONS

This Application is a non-provisional of and claims the benefit of U.S. Provisional Application No. 63/138,060 filed on Jan. 15, 2021 entitled "System And Method For Pepper's Ghost Filming And Display," which is hereby incorporated by reference in its entirety.

TECHNICAL FIELD

This disclosure relates to filming and displaying peppers ghost images or similar 3D or hologram images.

BACKGROUND

Immersive telepresence is a real time two way low latency telepresence system, including: an image source arranged to project an image directly towards a semitransparent screen for receiving a film of an image and subsequently projected by the image source to generate a partially reflected image directed towards an audience, the partially reflected image being perceived by the audience as a life size or partial virtual human image or another 3D floating image; wherein the image of the virtual subject is acquired using a process comprising filming a subject in front of a screen at a remote location from the display stage or viewing medium. The method can include creating a stage set with depth cues to enhance the 3D effect of the image projection, and controlling the lighting directed towards the subject projection display to provide a perceived likeness to the lighting direction used to acquire the filmed subject.

One problem with conventional filming and display methods for peppers ghost images or other 3D holograms is that the image quality of the projected image can be lacking such that a lifelike image of the filmed subject is not produced. Applicant has addressed several of the drawbacks of conventional peppers ghost systems with the inventions detailed in U.S. Provisional Application No. 61/080,411, U.S. Pat. No. 9,563,115, International Application No. PCT/GB2009/050850, and International Application No. PCT/GB2009/050849. However, further improvements to the methods taught in these prior applications to increase the quality and clarity of the peppers ghost image have been discovered by Applicant, as detailed herein. Additionally, it can be difficult to effectively transmit high quality peppers ghost displays with the limited bandwidth available for live communication transmissions (e.g. television).

As such, what is needed are improvements to peppers ghost filming and display systems and methods.

SUMMARY OF THE INVENTION

The object of this invention is to provide a more visually realistic and immersive Telepresence ("TP") experience for use in larger offices and/or public environments, such as theatres, concert halls and conference venues. The improvements relate to acquisition of one or more video images at one or more capture locations, the images being recorded as a data film for storage and playback, or transmission over a network, to a watching audience. The audience may be located in person at a display venue, or located remotely, viewing the subject image/s via cameras acquiring images at the display venue and transmitting the performance via a network or cable connection to display devices operated at the audience's location in the form of a video stream, characterized as being primarily a one way rather than interactive signal. One or more video images at the display venue are projected onto or through semi-transparent screens arranged to appear in front of a lit backdrop to a stage. The images may be displayed alongside or on the same stage as live performing talent, the projection perceived by the viewing audience as a virtual image, also known as a digital double, peppers ghost or "hologram" display. The semi-transparent screen is invisible to the watching audience or the cameras during the performance. The video image viewed by an online audience is perceived as bearing a close likeness to equivalent real original, providing a real presence of a virtual subject performing on a stage.

The techniques disclosed in this invention are also suitable for acquiring a video image of an Augmented Reality or AR Subject, wherein the image of the subject is augmented by digital means within a filmed image of a live stage, virtual or real backdrop, such as the image of a person appearing within an image area captured by a mobile phone in video camera mode, or a close up and head shoulders shot of the subject appearing on one or more large relay projection (or IMAG) screens during a stage presentation or performance before an audience located live or remotely. This invention provides improvements to the production processes applied to a display of a peppers ghost or AR subject, such as a presenter or stage artist, the display optimized to be acquired by one or more secondary cameras for onward "streaming" broadcast via cable, radio or satellite network to an online audience or TV viewing audience

BRIEF DESCRIPTION OF THE FIGURES

FIG. 1.1 shows a schematic view of a prior art system for transmitting a peppers ghost image.

FIG. 1.2 shows a schematic view of a prior codec box of FIG. 1.1

FIG. 2.1 shows a schematic view of one embodiment of a system of the present disclosure for displaying a peppers ghost image.

FIG. 3.1 shows side views of various embodiments of system setups of the present disclosure for displaying a peppers ghost image.

FIG. 3.1(*a*) shows a side view of a front setup for a system of the present disclosure for displaying a peppers ghost image.

FIG. 3.1(*b*) shows a side view of a front setup with mirror for a system of the present disclosure for displaying a peppers ghost image.

FIG. 3.1(*c*) shows a side view of a reverse setup for a system of the present disclosure for displaying a peppers ghost image.

FIG. 3.1(*d*) shows a side view of a reverse setup with mirror for a system of the present disclosure for displaying a peppers ghost image.

FIG. 3.1(*e*) shows a side view of a rear projection front setup for a system of the present disclosure for displaying a peppers ghost image.

FIG. 3.1(*f*) shows a side view of a rear projection front setup with mirror of a system of the present disclosure for displaying a peppers ghost image.

FIG. 3.1(*g*) shows a side view of a rear projection reverse setup for a system of the present disclosure for displaying a peppers ghost image.

FIG. 3.1(*h*) shows a side view of a rear projection reverse setup with mirror for a system of the present disclosure for displaying a peppers ghost image.

FIG. 3.2 shows perspective views of various embodiments of system setups of the present disclosure for displaying a peppers ghost image.

FIG. 3.2(*a*) shows a perspective view of a front setup for a system of the present disclosure for displaying a peppers ghost image.

FIG. 3.2(*b*) shows a perspective view of a front setup with mirror for a system of the present disclosure for displaying a peppers ghost image.

FIG. 3.2(*c*) shows a perspective view of a reverse setup for a system of the present disclosure for displaying a peppers ghost image.

FIG. 3.2(*d*) shows a perspective view of a reverse setup with mirror for a system of the present disclosure for displaying a peppers ghost image.

FIG. 3.2(*e*) shows a perspective view of a rear projection front setup for a system of the present disclosure for displaying a peppers ghost image.

FIG. 3.2(*f*) shows a perspective view of a rear projection front setup with mirror of a system of the present disclosure for displaying a peppers ghost image.

FIG. 3.2(*g*) shows a perspective view of a rear projection reverse setup for a system of the present disclosure for displaying a peppers ghost image.

FIG. 3.2(*h*) shows a perspective view of a rear projection reverse setup with mirror for a system of the present disclosure for displaying a peppers ghost image.

FIG. 3.3 shows a side view of another embodiment of a systems for displaying a peppers ghost image with a video wall positioned below a foil.

FIG. 4.2 shows a side view of an embodiment of a system for filming a subject for a peppers ghost display.

FIG. 5.1 shows an embodiment of a display system for displaying a peppers ghost image utilizing a parabolic mirror.

FIG. 6.1 shows side plan views of filming and display stages showing the orientation of the camera eyeline to the subject in the filming room being similar to the orientation of the audience eyeline to the perceived hologram on the display stage.

FIG. 7.1 shows a schematic view of one embodiment of an auditorium for displaying a peppers ghost image configured for light, camera, and sound.

FIG. 7.2 shows a schematic view of one embodiment of smaller meeting room for displaying a peppers ghost image configured for light, camera, and sound.

FIG. 7.3 shows a side view of a foil tensioned in a frame at an angle with respect to a stage riser.

FIG. 7(A.1) is a schematic view of one embodiment of the communications setup of the filming room of the filming system of the present disclosure.

FIG. 7(A.2) is a schematic view of one embodiment of the communications setup of the display room of the display system of the present disclosure.

FIG. 8.1 is a side perspective view of a lighting arrangement in a filming studio in accordance with one embodiment of the invention of the present disclosure.

FIG. 8.2 is a top view of the lighting arrangement of FIG. 8.1.

FIG. 8.3 is a list of lighting devices used in the lighting arrangements of FIGS. 8.1 and 8.2.

FIG. 8.4 is a top view of a filming arrangement in accordance with one embodiment of the invention of the present disclosure.

MODES OF CARRYING OUT THE INVENTION

Figure 7A:
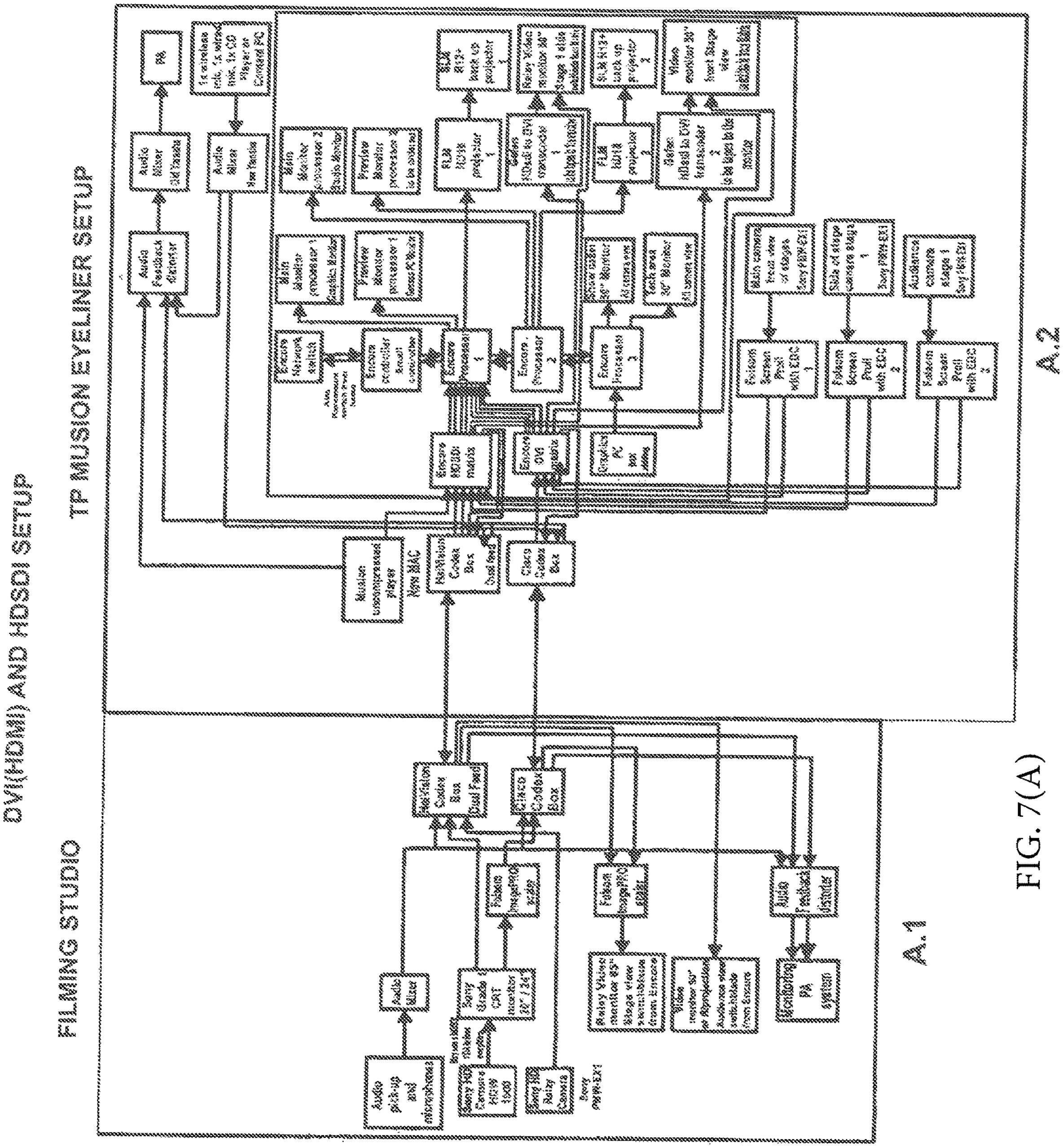
FIG. 7(A) is a schematic view of one embodiment of the electrical setup of and between the filming room and the display stage of the filming and display system of the present disclosure.
Figure 7B:
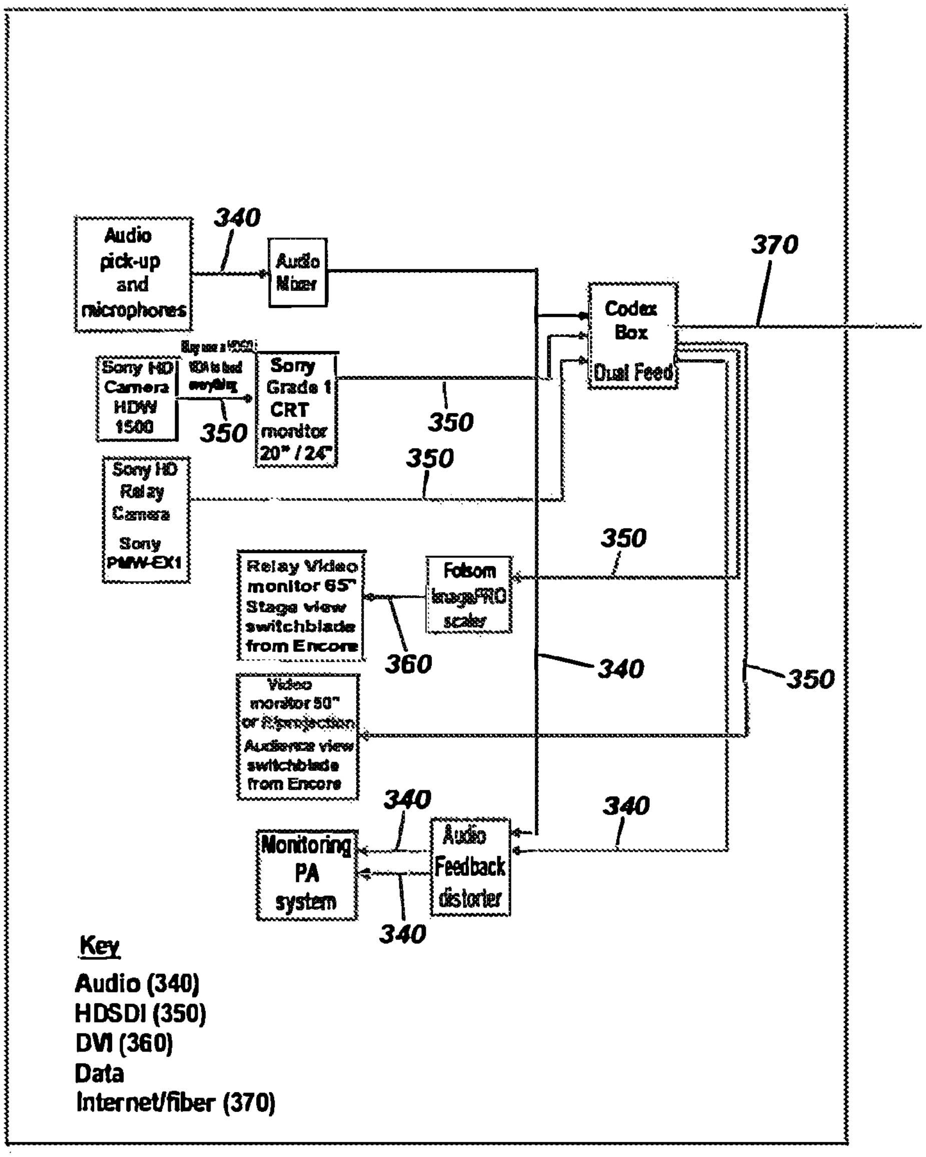
FIG. 7(B) is a schematic view of another embodiment of the communications setup of the filming room of the filming system of the present disclosure.
Figure 7C:
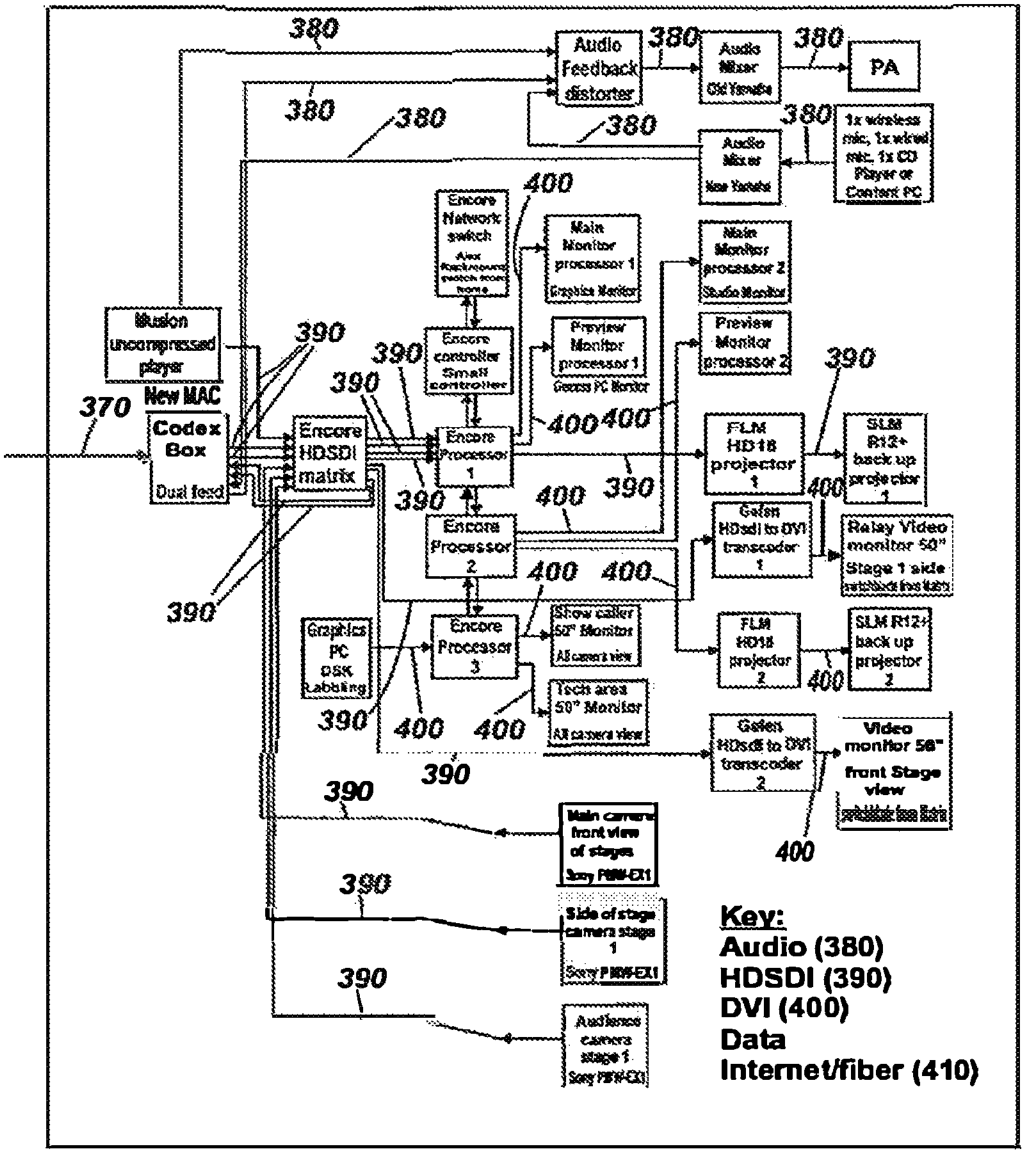
FIG. 7(C) is a schematic view of another embodiment of the communications setup of the display room of the display system of the present disclosure.
Figure 9:
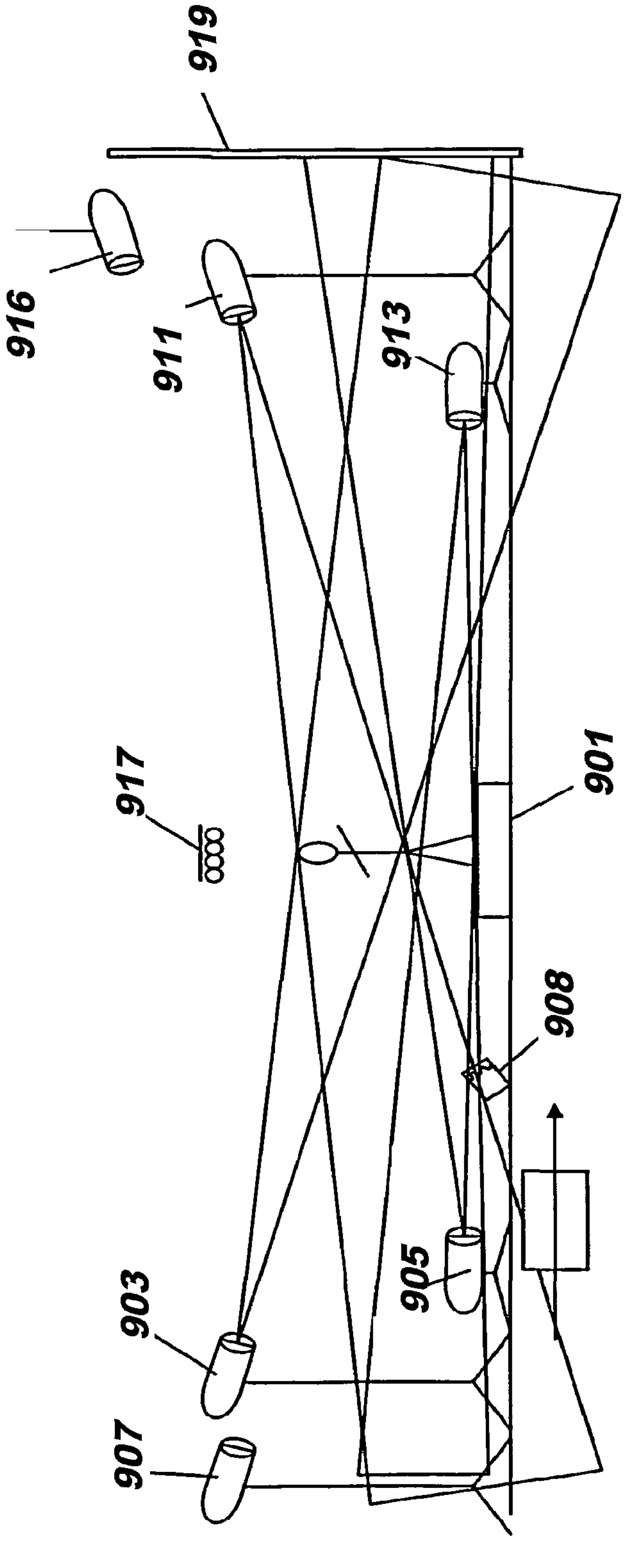
FIG. 9 shows a cross-sectional view of a studio setup for a lighting arrangement in accordance with one embodiment of the invention.
Figure 10:
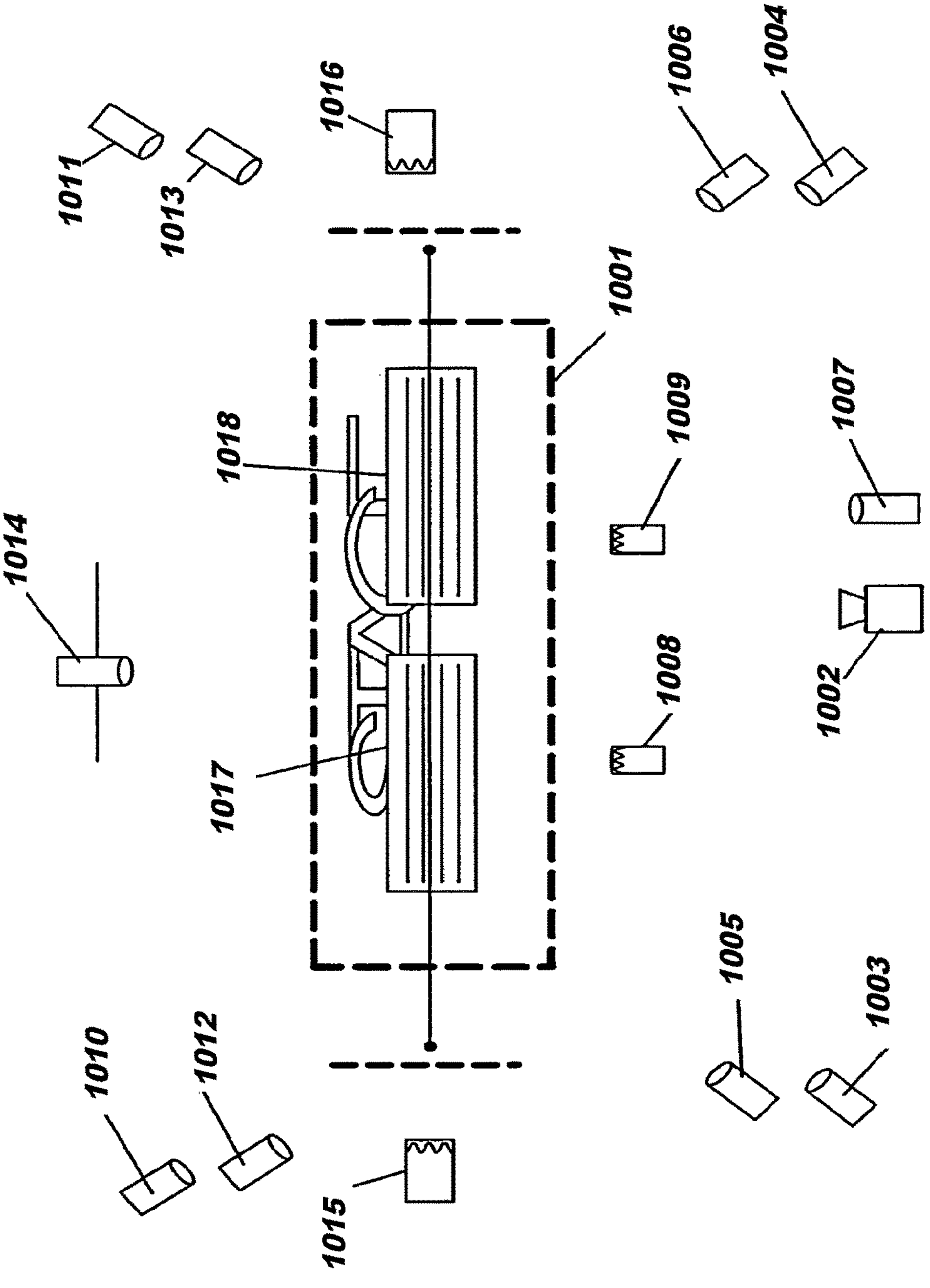
FIG. 10 is a schematic plan view of the studio setup shown in FIG. 9.
Figure 11:
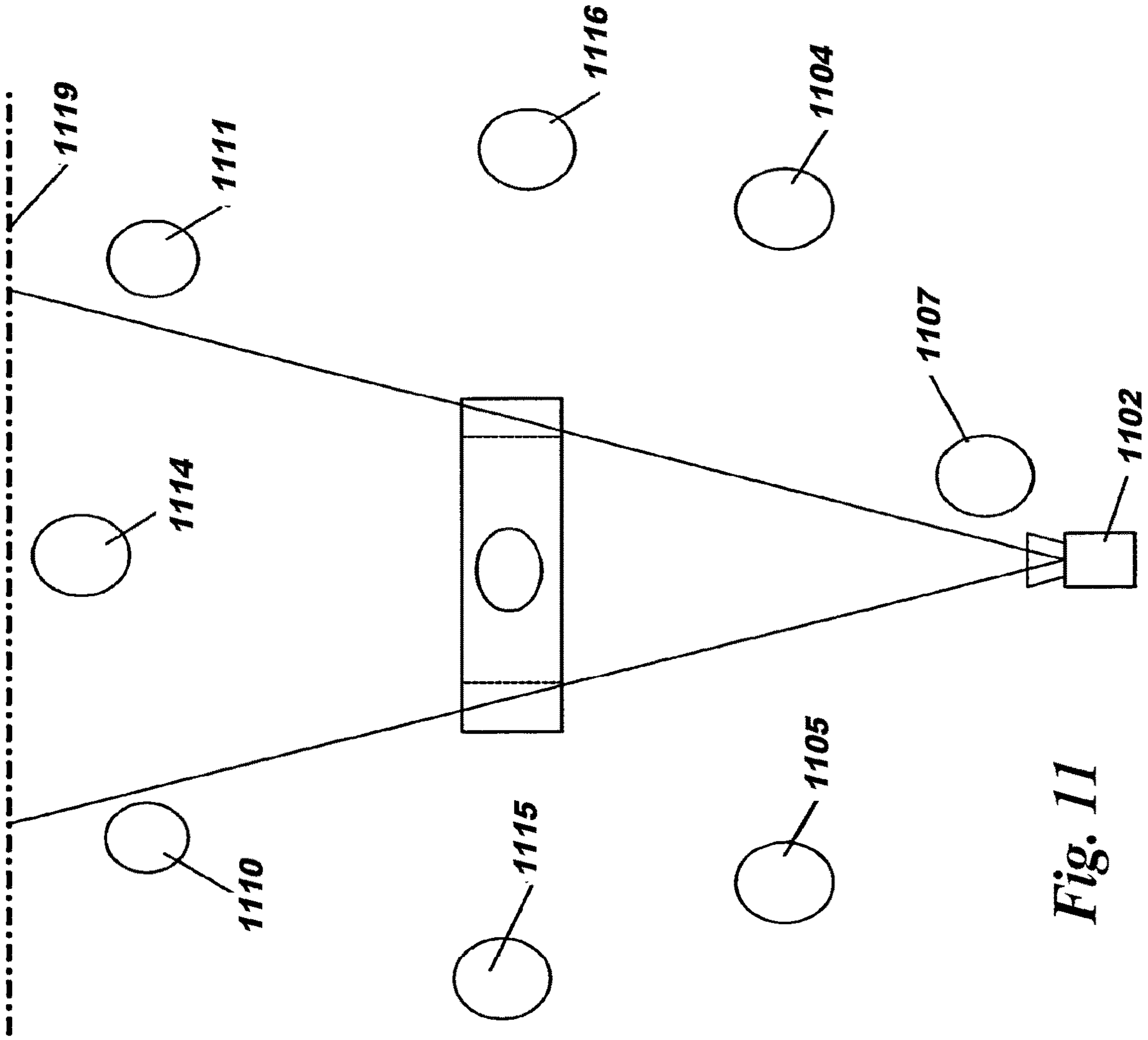
FIG. 11 is a schematic view of the shot captured by the camera as arranged in the studio setup of FIGS. 9 and 10.
Figure 12:
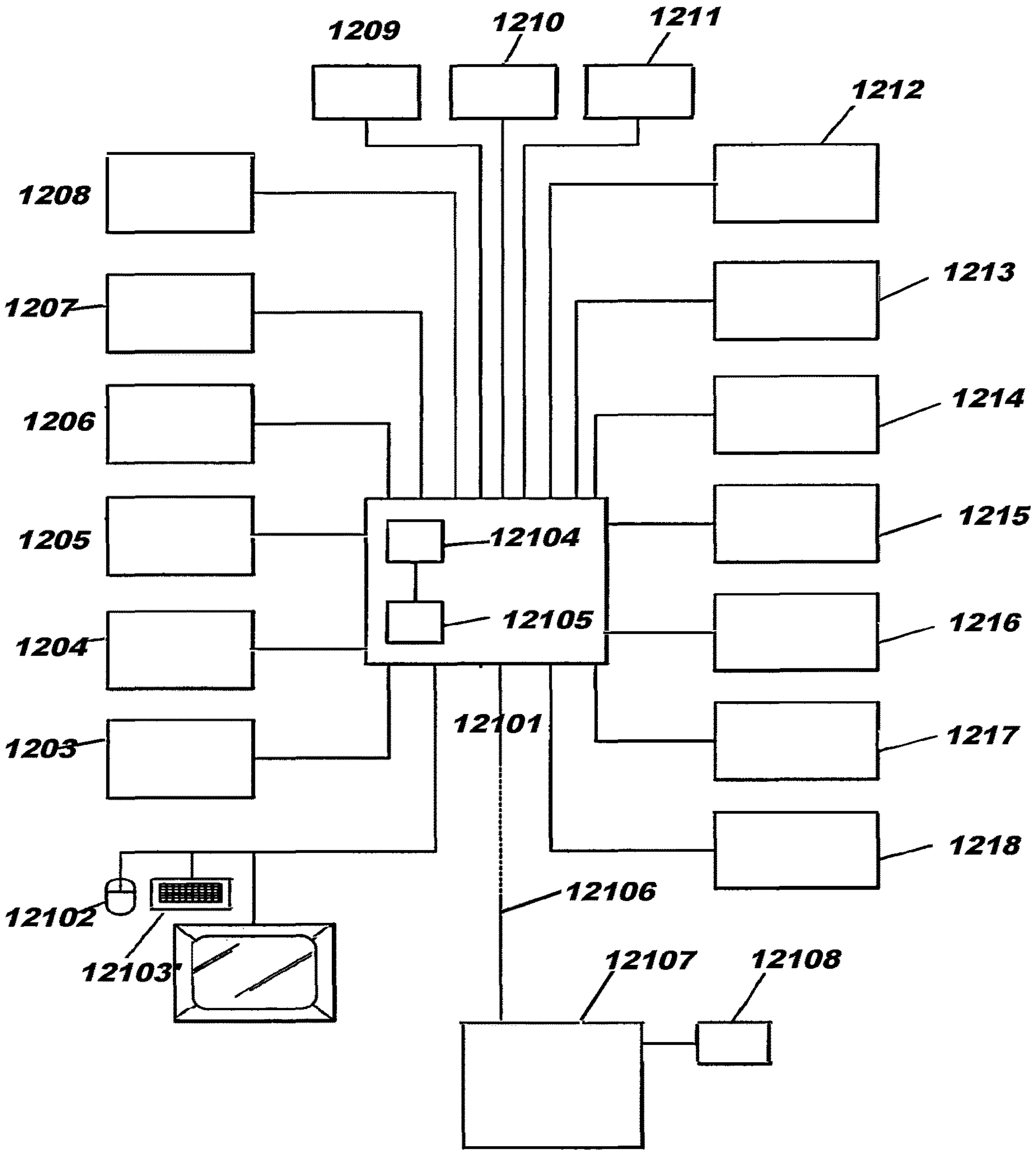
FIG. 12 is a schematic view of a lighting control system for automatically adjusting the lights of the studio setup shown in FIGS. 9 to 11.
Figure 13:
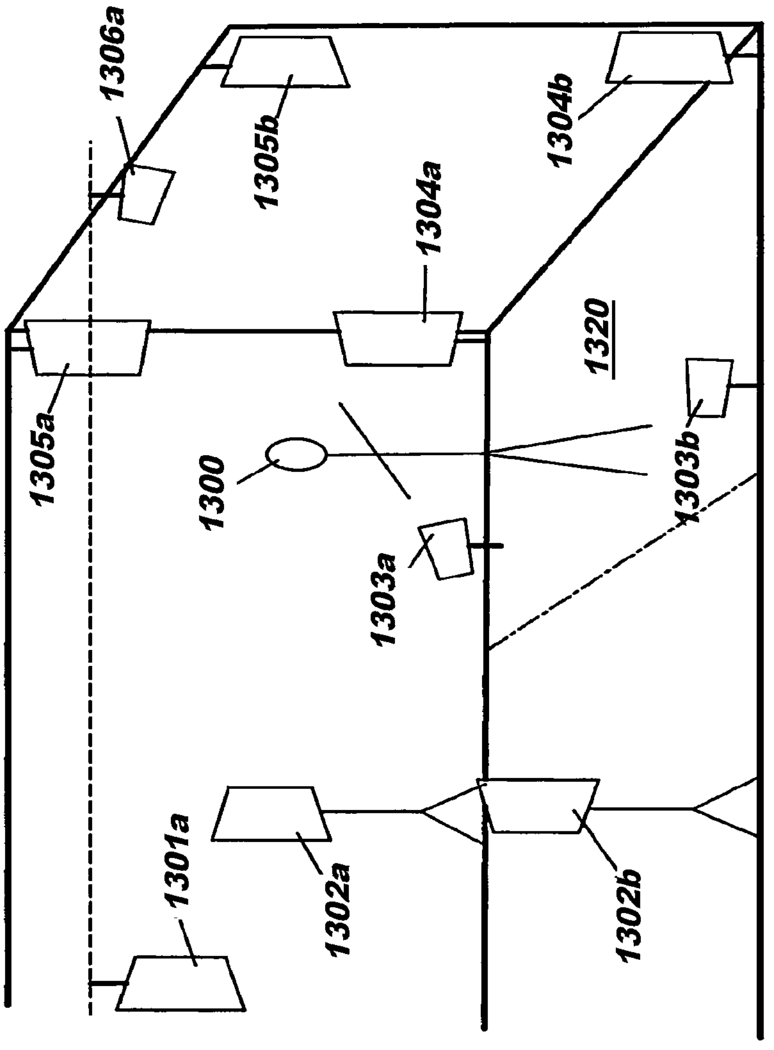
FIG. 13 shows a perspective view of a studio setup for a first lighting arrangement in accordance with another embodiment of the invention, wherein the lighting arrangement comprises LED lamps.
Figure 14:
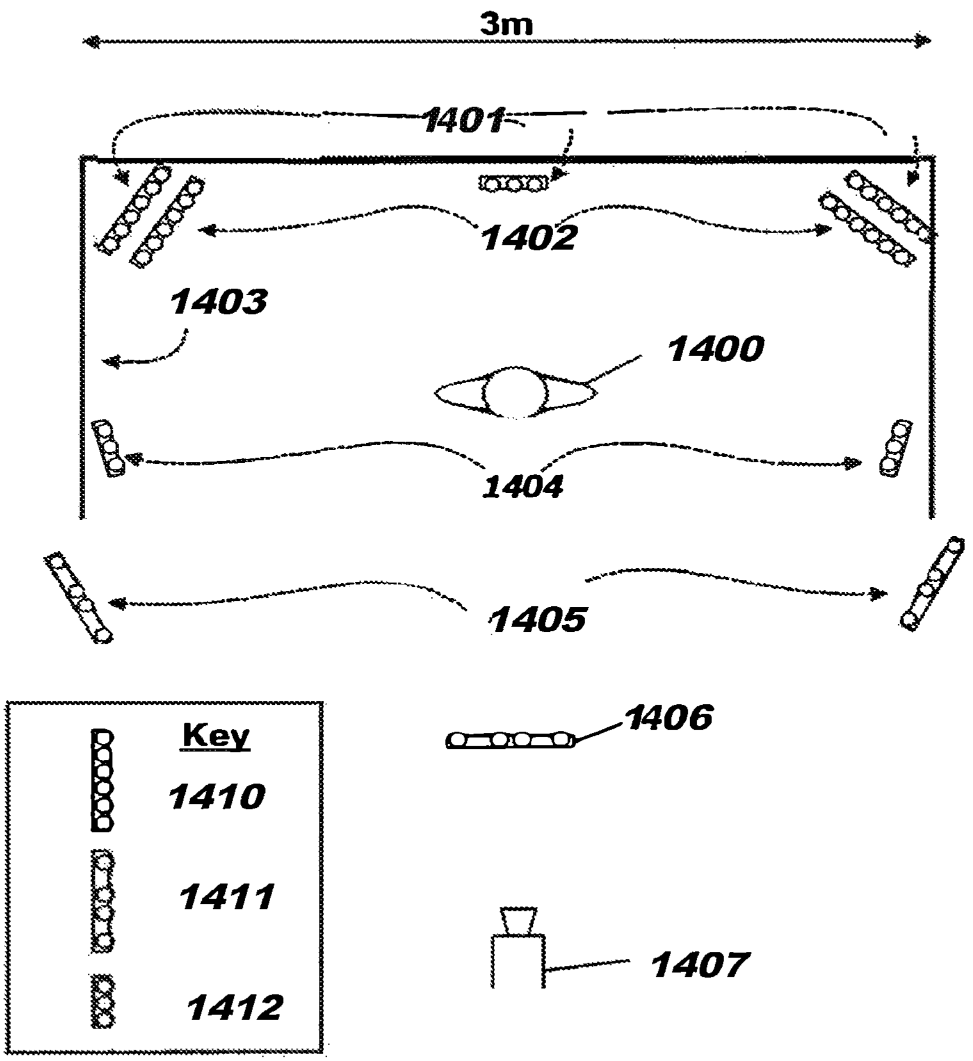
FIG. 14 shows a plan of the studio setup of FIG. 13.
Figure 15:
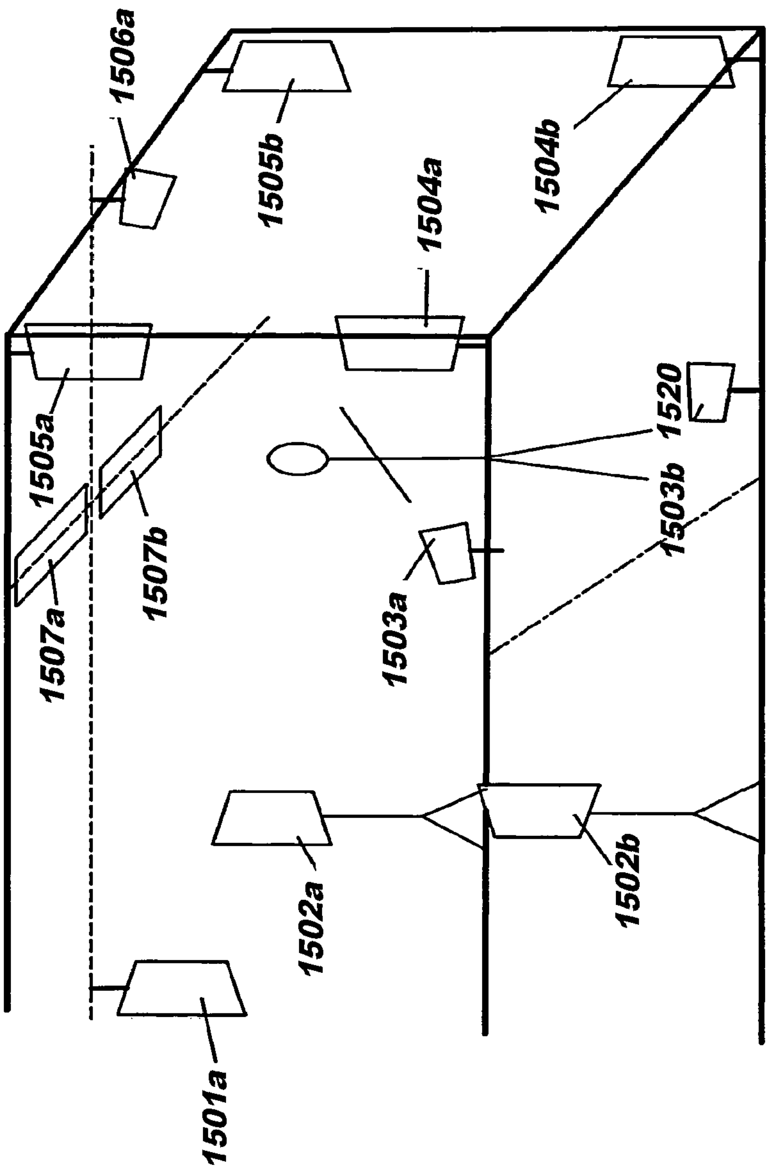
FIG. 15 shows a perspective view of a studio setup for a second lighting arrangement in accordance with another embodiment of the invention, wherein the lighting arrangement comprises LED lamps.
Figure 16:
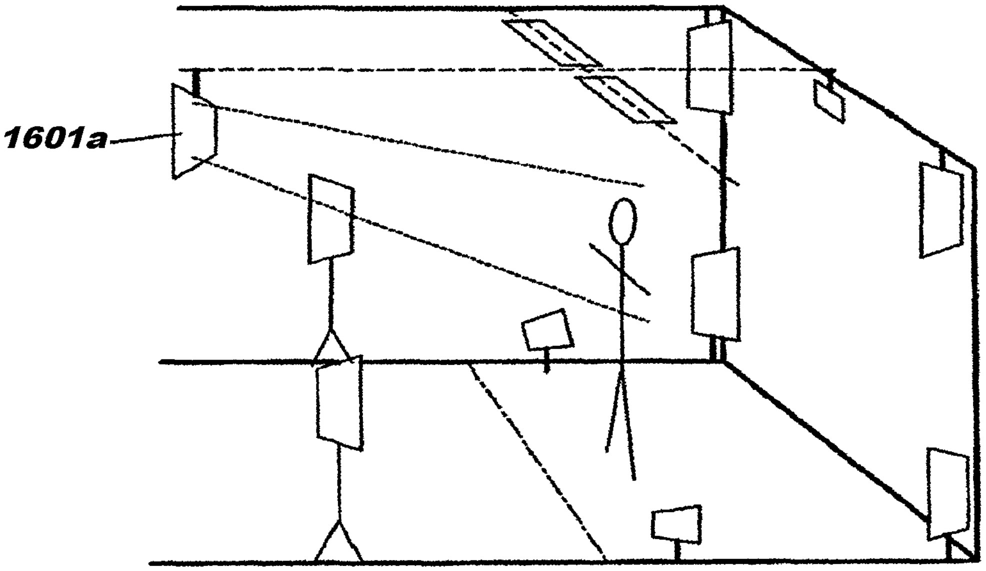
FIG. 16 shows a perspective view of a studio setup of FIG. 15 with the light path illustrated from a light panel arranged to illuminate the face and upper body of a subject.
Figure 17:
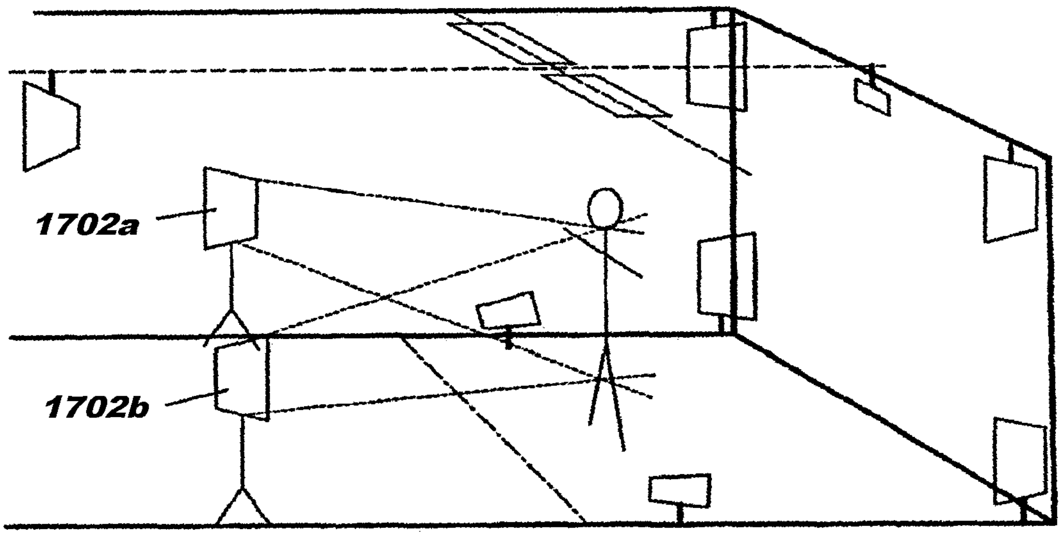
FIG. 17 shows a perspective view of a studio setup of FIG. 15 with the light path illustrated from a light panel arranged to illuminate the darker features of a subject.
Figure 18:
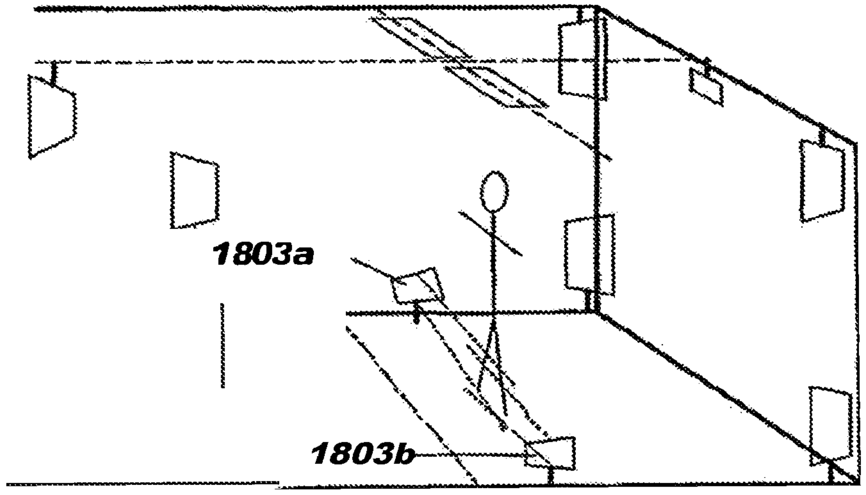
FIG. 18 shows a perspective view of a studio setup of FIG. 15 with the light path illustrated from a light panel arranged to illuminate the lower part of a subject.
Figure 19:
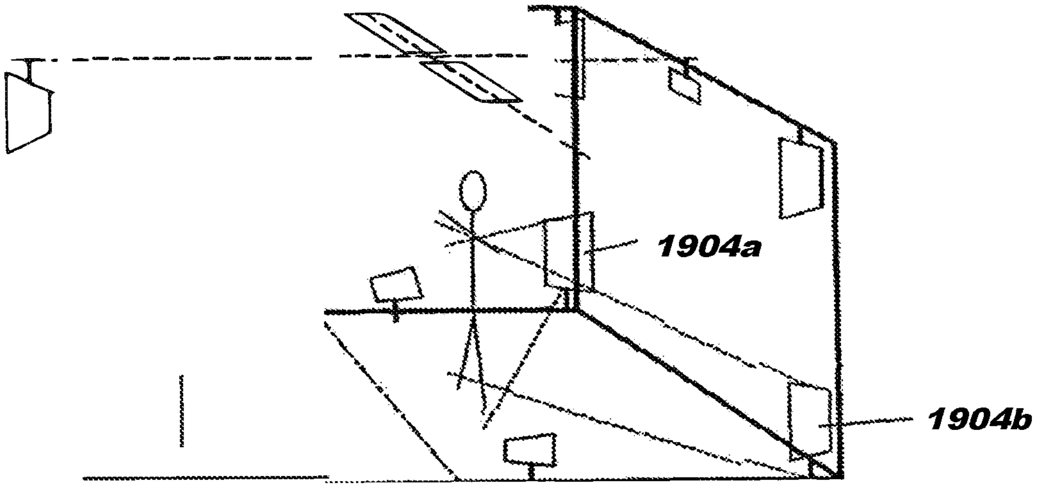
FIG. 19 shows a perspective view of a studio setup of FIG. 15 with the light path illustrated from a light panel arranged to illuminate generally up to the shoulders of a subject.

The object of this invention is to provide a more visually realistic and immersive Telepresence ("TP") experience for use in larger offices and/or public environments, such as theatres, concert halls and conference venues. The improvements relate to acquisition of one or more video images at one or more capture locations, the images being recorded as a data film for storage and playback, or transmission over a network, to a watching audience. The audience may be located in person at a display venue, or located remotely, viewing the subject image/s via cameras acquiring images at the display venue and transmitting the performance via a network or cable connection to display devices operated at the audience's location in the form of a video stream, characterized as being primarily a one way rather than interactive signal. One or more video images at the display venue are projected onto or through semi-transparent screens arranged to appear in front of a lit backdrop to a stage. The images may be displayed alongside or on the same stage as live performing talent, the projection perceived by the viewing audience as a virtual image, also known as a digital double, peppers ghost or "hologram" display. The semi-transparent screen is invisible to the watching audience or the cameras during the performance. The video image viewed by an online audience is perceived as bearing a close likeness to equivalent real original, providing a real presence of a virtual subject performing on a stage.

The techniques provided in the present disclosure are also suitable for acquiring a video image of an Augmented Reality or AR Subject, wherein the image of the subject is augmented by digital means within another video image of a live stage or real backdrop, such as the image of a person appearing within an image area captured by a mobile phone in video camera mode, or a close up and head shoulders shot of the subject appearing on one or more large relay projection (or IMAG) screens during a stage presentation or performance before an audience located live or remotely. This invention provides improvements to the production processes applied to a display of a peppers ghost or AR subject, such as a presenter or stage artist, the subject superimposed into the display optimized to be acquired by one or more secondary cameras for onward "streaming" broadcast via cable, radio or satellite network to an online audience or TV viewing audience.

The contents of U.S. Provisional Application No. 61/080,411, U.S. Pat. No. 9,563,115, International Application No. PCT/GB2009/050850, and International Application No. PCT/GB2009/050849 are incorporated by reference herein in their entireties. The figures of International Application No. PCT/GB2009/050850 (FIGS. 1-8.4) and International Application No. PCT/GB2009/050849 (FIGS. 9-31) have been included in this application for reference. These figures are discussed in more detail in Applicant's respective prior applications, which are incorporated herein in their entireties. While certain features and/or reference numerals in FIGS. 1-31 may be discussed in more detail herein, for a more detailed discussion of FIGS. 1-31 please see Applicant's prior international applications referenced above.

Referring now to FIG. 4, immersive telepresence is a real time two way low latency telepresence system, including: an image source arranged to project an image directly towards a semitransparent screen for receiving a film of an image and subsequently projected by the image source to generate a partially reflected image directed towards an audience, the partially reflected image being perceived by the audience as a life size or partial virtual human image or another 3D floating image; wherein the image of the virtual subject is acquired using a process comprising filming a subject in front of a black, blue, or green back screen under a lighting arrangement having one of more first lights for illuminating a front of the subject, one or more second lights for illuminating the rear and/or side of the subject and operable to sharpen the outline of the subject, and optionally, if the image is to be displayed as a full bodied image, one or more third lights for illuminating the feet of the subject, wherein a camera used to acquire the subject is stationary or "Locked Off" and; wherein the subject being acquired is moving; and/or the system and method comprises creating a stage set with depth cues to enhance the 3D effect of the image projection. This is preferably achieved by up-lighting a backdrop behind the subject projection display with LED spot lights, and/or LED wash lights, and/or LED batons, and/or par type lighting fixtures, the lights located upstage behind the semi-transparent screen, illuminating the stage and/or directed toward the subject from behind and side on to the subject, and controlled such that the light directed towards the subject projection display provides a perceived likeness to the lighting direction used to acquire the filmed subject; and/or wherein the color temperature of person/objects at the location of the subject projection display are lit to a color temperature that matches the color temperature of or is consistent with the subject projection display when viewed by the naked eye of a live audience; and/alternatively, when the subject projection display is viewed on a monitor, the color fidelity is further calibrated via a signal from a camera acquiring the image of the projection display; and/or controlling the lights illuminating the subject projection display in response to changes in the lighting environment operative during acquisition of the filmed subject; and/or a system incorporating a video processor such as the Barco Encore, and Christie Spyder X20 located in the projection display venue, the processor providing a switchable matrix for routing multiple audio/video signals from one AV device to another to provide a Heads Up Display; and/or incorporating alpha channel layering for compositing a live display of more than one image source to become a single display.

The method may also include in some embodiments providing Picture In Picture (PIP) processing of one or more camera signals viewing a projection stage together with one or more cameras viewing an audience; and/or image sizing the signals; and/or arranging image orientation in portrait or landscape mode; and/or controlling the locational placement of the filmed subject on a stage; and optionally routing or controlling 3D Graphics alongside an image of a filmed subject display via the processor's input channels from a live signal via either a codec or a pre-recorded media player; and providing means for routing via a signal matrix incorporated or augmented with the video processor to one or more reference screens located for viewing by the subject in the Filming acquisition studio or by the performers upon the display stage, for example in the form of a Heads Up Display (HUD), as illustrated in FIG. 4.2; or the video processor provides a picture in picture combining via a video mixer multiple camera views of the performance stage mixed into a single 1080 HD or 4K UHD image for onward broadcast to the filmed subject as a reference image, or to a TV or online network; and preferably, the smaller picture within the bigger picture is located to the lower or center portion of the reference screen directed towards the filming subject; and preferably comprises a camera view of the peppers ghost display stage as the smaller picture within the bigger picture.

The Barco Encore, and Christie Spyder X20 are examples of video processors suitable to manage as a switchable matrix multiple inputs and outputs of audio/video signals, including picture in picture processing, sizing, orientation and positioning of the filmed subject being processed seamlessly; optionally adding to the display video of a peppers ghost subject on stage with 3D Graphics via the processor's input channels from a live signal via codec or prerecorded media player. More recent models providing largely similar video processing capabilities include the Barco S3 and Barco E2.

The capabilities of these processors within the scope of the prior art are documented in the PCT/GB2009/050850 specification. The processors are effective for use in circumstances where low latency response times for interaction between remote locations is crucial (such as Q&A sessions) and/or a higher bit or data rate is used for the video stream, when motion video quality is important. In the latter element, bandwidth otherwise assigned to the interactive elements of the show (audience camera/s, positional reference camera/s) could be switched temporarily whilst not in use, concentrating all the available upload or download bandwidth instead on delivering the most realistic moving subject image experience. This is most conveniently achieved using a switchable scalar (Spyder or Encore) along with the associated equipment. At the press of a controller button (managed either by presenter, artist or other designated show controllers) at appropriate moments during a presentation or performance. The control button is linked to a network router managing the codec download/upload data feeds from the image acquisition location.

A simple but effective video processor capable of mirror reversing or "flipping" the video image to display reflected images through a Foil is the Decimator Design MD-HX HDMI/SDI Cross Converter for 3G/HD/SD. Although projectors often have this feature integral to their design, the image is required to be "flipped" prior to transmission on an LED used to reflect images through a Foil and also, the display return feed located in front of the filming subject during film acquisition.

The method of optimizing a virtual image display comprises ensuring illumination at or near the location the subject projection display is not due to the projection of the film. The film area beyond the subject outline being projected should be transparent to the viewer, i.e. black when viewed on a live stage, so as to maintain the illusion of the subject image being realistically superimposed onto, and/or able to interact with, a real backdrop. For example, lights illuminating a backdrop to a stage on which the filmed image appears is directed towards reflective surfaces of the stage area that cause light to fall on or near the location around the image display. This arrangement adds 3D reality to the surrounding environment, adding realism to the virtual image.

In particular, a Peppers Ghost image is created by projecting the image onto a semi-transparent screen, such as a semi-transparent foil, placed at 45 degrees to the projector; and an audience's eye line such that the audience perceives the image as a "ghost" in the backdrop behind the screen. However, the semi-transparent screen only reflects a proportion of the light of the projected image, which often results in an image filmed using conventional lighting arrangements appearing darker than the backdrop. The term "semitransparent" should be understood to take its normal meaning of allowing the passage of some, but not all, incident light (i.e. partially transparent). The method may comprise projecting the film such that the Peppers Ghost image of the subject appears the same height as the subject in real-life.

Heads Up Display

This Heads Up Display comprises mounting a video screen/s upstage to a foil, the screens optionally being mechanically moveable. The foil is inclined at an angle with respect to a plane of emission of light from the upstage video screen which may comprise a projector using a Front or Rear Projection Screen, LCD, LED or TFT screen; the foil having a front surface arranged such that light emitted from the video screen is reflected therefrom; and the video screen being arranged to project an image such that light forming the image impinges upon the foil upstage of the audience (and thus invisible to Audience) such that a virtual image is created from light reflected from the screen, the virtual image appearing to be located behind the screen, or down stage of the Presenter.

The screen may be attached to the stage truss framing the foil screen and positioned in a substantially horizontal fashion, screen angled downwards towards the foil (in a similar way to the 103" panel fixed to the foil described in the Prior Art). The Foil frame could be attached to a front of rear projection screen in a variety of configurations known as peppers ghost shown in FIGS. 3.1 and 3.2. The Front Projection/Rear Projection screens reflect video images from projectors (preferably 1080 HD), or the foil directly from video or LED walls, which too can be attached to the Foil frame. This is shown in FIG. 3.3.

The performers or compares located on stage view the video image as a peppers ghost image floating directly above or amongst the audience participants, yet the images are entirely invisible to the audience. This superimposition of a reflected image in front of a real backdrop is similar to the earlier principal of a camera shooting through the foil even whilst a virtual image is masking the camera's presence.

This feature is also of practical use for providing line of sight guidance to talent requiring accurate eye to eye contact during two way real time video communications and/or in the design of a TP meeting room or area of limited size. The live talent upon both the acquisition and display stages are able to view 'hard copy' references through the transparent foil screen as well as the virtual image. Such a hard copy reference could be a light or signal designed to accurately guide the precise direction of eye view.

The position of the HUD monitor/screen may be referenced to a position and eye line angle between a live Performer or virtual subject on stage, relative to the position of the audience participant. The image upon the screen may be a close up camera shot of the audience participant, creating the illusion of a virtual audience member, highlighted or enlarged as a peppers ghost image appearing in the same seating block/seat as the live audience member. The display of an audience through a foil brings the communicating parties 'closer,' enabling the filmed subject and live Performers on stage to experience a facial detail and intensity of audience interaction (including eye to eye contact) not previously possible.

Alternatively, the Heads Up Display may comprise LED panels used to larger sizes up to 9.6 m wide×6.3 m high reflecting through a Foil at least 9 m wide and 8 m high. Such a scale permits virtual audiences of many thousands being visible from the stage performers Point of View.

The immersive impact of this effect is greatly enhanced for audience participants if the on stage talent (including the peppers ghost display) is filmed from a downstage location, the images being transmitted real time to larger relay (IMAG) screens located either side of the stage or to the side of or above the audience areas generally. This arrangement provides significantly enhanced body/facial detail of the stage performers to be seen by the audience during performances. Alternatively, the cameras located in the display venue may also or alternatively transmit real time over a network to a display located remotely, including a television screen.

The partially transparent image of the Peppers Ghost is mitigated by use of an AR image instead. This requires audience viewing of the AR image on a second, flat screen, the AR image composited to a plate shot of the peppers ghost display stage, empty in the space occupied by the AR image.

In some embodiments there is a "live" projection of the subject as a Peppers Ghost and/or AR image, which is often coined a "telepresence". The term "live" should be understood to take its conventional meaning of being transmitted at the time of the performance. The skilled person will understand that communications links may introduce some delays between two performance locations of between 80 milliseconds up to 800 mm. Such delays will either be negligible or imperceptible to an audience. A delay of a few seconds may occur, for example in the case of a satellite relay being used in the communication link or a broadcast of a virtual image as a video stream to a mobile or networked device.

According to an embodiment of the Prior Art invention there is provided a method of providing a Peppers Ghost image comprising filming the subject in accordance with previous aspects and embodiments of the invention and projecting the film through a semitransparent screen positioned at an angle, preferably 45 degrees, to the projected film and an audience eyeline such that film images are visible to the audience superimposed on a backdrop to the screen; preferably such that the Peppers Ghost image of the subject appears at the same height as the subject in real-life; or alternatively projecting the images of the subject through a semitransparent screen positioned at an angle to the projected film and an audience line-of-sight such that film images are visible to the audience superimposed on a backdrop to the screen.

Peppers Ghost Display

The display may comprise a projector directing an emission of light directly or via a mirror, or a mirrored lens towards a semi-transparent screen such as a theatrical gauze, or scrim, AKA Holo-gauze, Pepper Scrim, Holo-net and the like; or a front or rear projection screen configured at an angle of between 38-52 degrees to a semi-transparent screen such as a polymer Foil, mirrored glass, sheet glass, Perspex or the like; and wherein the screen is a polymer Foil, the Polymer Foil optionally and preferably comprises flame resistant (FR) material substantially dissolved within the Foil to provide for a screen of less than 3% visible haze against 97% transparency, or preferably exhibits a visible haze of less than 1.8%; and optionally easy to clean and anti-static foil tensioned within a frame arranged in a number of different fashions using a variety of video sources.

Figure 34:
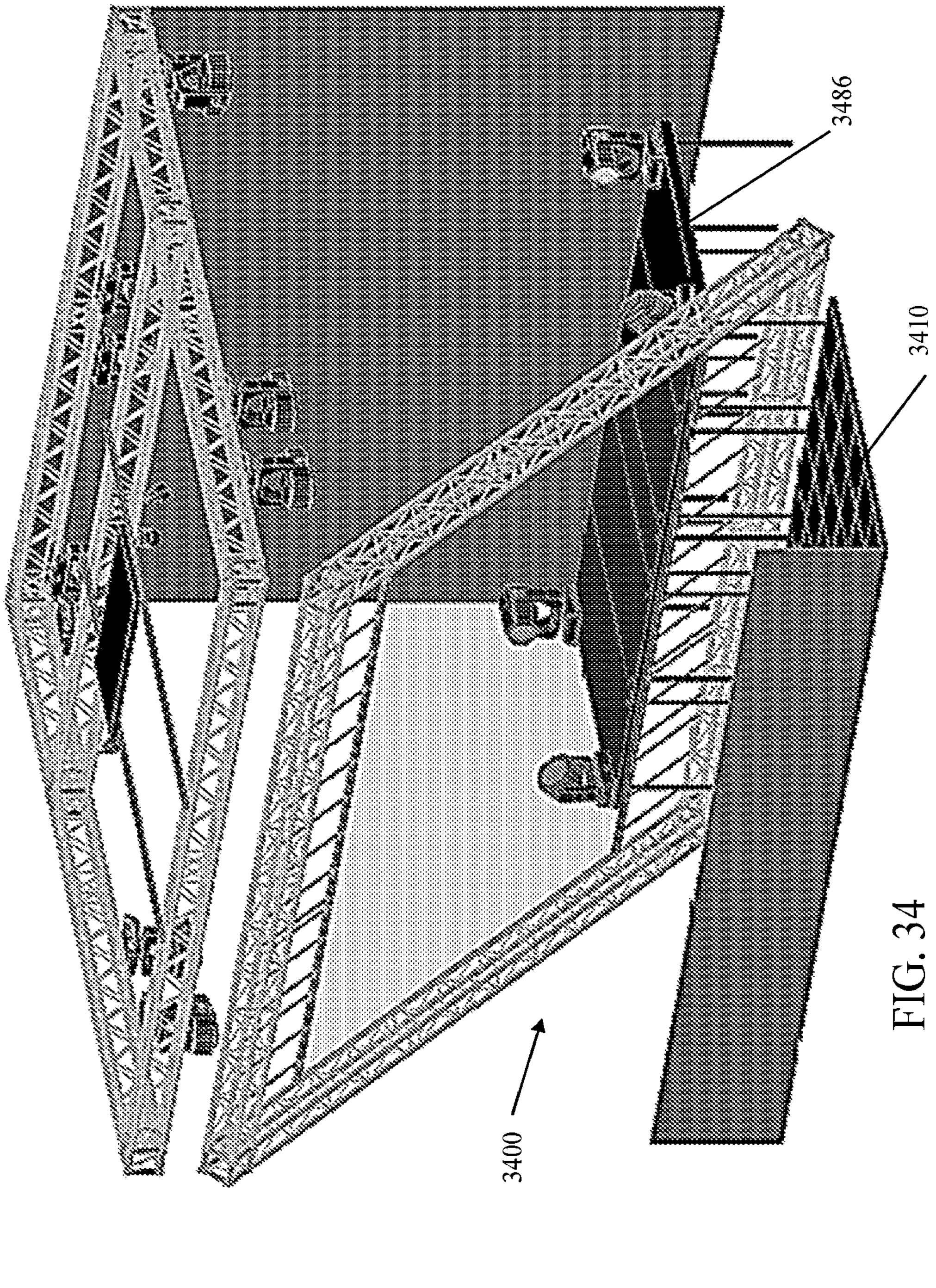
FIG. 34 shows a perspective view of a front setup for a system of the present disclosure for displaying a peppers ghost image including GOB LED or FlipChip Panels as the projection devices.
Figure 35:
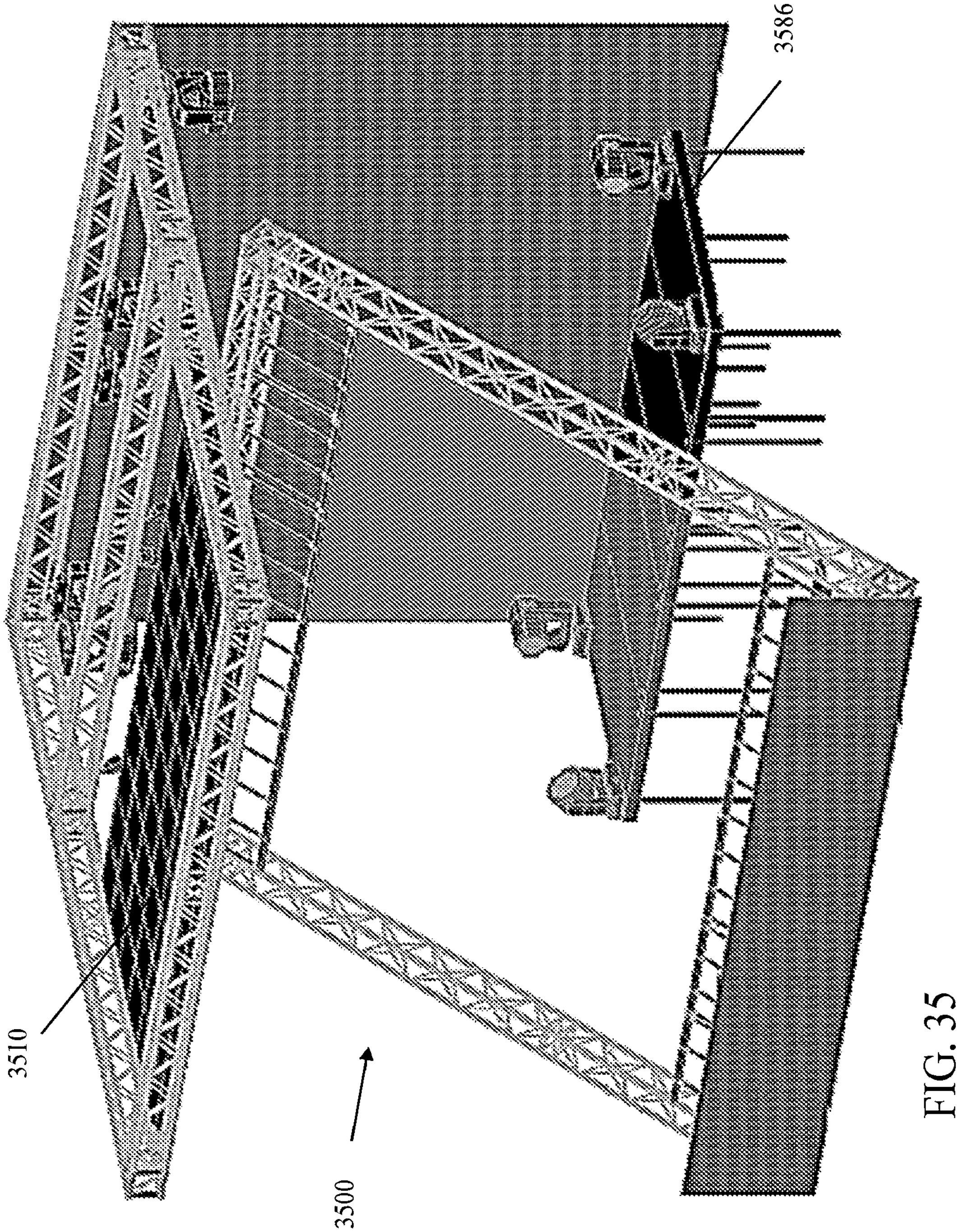
FIG. 35 shows a perspective view of a reverse setup for a system of the present disclosure for displaying a peppers ghost image including GOB LED or FlipChip Panels as the projection devices.

The invention provides improvements to Immersive TP to work effectively in, across and between a greater number of environs. Referring now to FIGS. 34-35, according to an aspect of this invention a foil or glass peppers ghost display system 3400 comprises LED panels 3410 which carry a clear resin top coating, cured to set over Light Emitting Diodes (LED) mounted to a panel, to create a flat, smooth clear or semi-transparent surface. An alternative to this process is known as Glue On Board (GOB) LED.

The clear smooth surface provides a means of diffusing the light emitted by the diodes, minimizing incidence of image moire appearing on the Foil display when illuminated by the GOB LED. The absence of moire provides for audiences and broadcast cameras to view the virtual images from a much closer distance compared to equivalent SMD LED displays, since the integrity of the virtual image is no longer compromised by the incidence of unwanted moire distorting the image. The absence of moire is particularly desirable when acquiring the virtual image display with one or more broadcast cameras, since the image will retain its realism and integrity to a viewing audience even in close up shots.

Additionally, "Flip Chip" LED Panel display screens 3410 are darker or "blacker" in operation mode, because the light emitting chip is mounted upside down in the panel chassis, significantly reducing unwanted white light being emitted when, for example, the LED is projecting a film comprising black around the outline of a virtual image on stage. This feature is advantageous for use in the enhanced display compared to use of a projection screen or conventional SMD LED panels.

Projection screens are by their very nature designed to reflect as much light as possible. Therefore, if the projection environment is generally bright (such as a shopping mall walkway under a glass atrium) then the entire screen can become visible as a reflection in a Foil, reducing contrast of the primary image to the extent the image may appear flat to the viewer. Even in darker environments, the use of LED lighting to the stage backdrop may sometimes be picked up as unwanted reflection in the Foil peppers ghost display.

A significant proportion of LED panels appear grey when viewed in bright environments, or when the LED panels are in operation with a video signal containing black. Optionally and preferably, the Flip Chip LED incorporates cold cathode technology to generate a demonstrably greater color contrast and brighter light output compared to conventional SMD or Chip-on-Board LED panels, as well as LED/laser projectors rated at up to 40,000 lumens light output or more.

The additional brightness provided by Flip Chip LED is beneficial to the method of a peppers ghost display since there is significant light loss from reflecting an image through a semi-transparent screen, in particular screens exhibiting a haze of less than 3% and especially ultra-clear Foil screens exhibiting a haze of less than 2%.

Operating a Flip Chip LED screen for a peppers ghost display provides for greater creative freedom in selection of costume and colors working well in a performance, enabling the TP experience to be effective in brighter environs such as live TV Studios, offices, factory floors, restaurants, retail displays, public auditoriums such as music and exhibition halls, shopping malls or public areas in theme-parks. Moreover, the invention provides a superior system and method for interactive telepresence of one or more filmed subjects on a performance stage engaging with audience groups directly in a live venue, as well audiences located remotely and connected online to the display via a network.

This invention comprises a number of enhancements to the entire set of apparatus used in the TP process. Enhancements may be used selectively or as a whole and thus the performance enhancements resulting may be subtle or significant on a case by case basis.

See U.S. Pat. No. 9,563,115 which describes the Fireproof Foil and at Columns 19 and 20 as to the improvements/advantages of the LED display over projection, especially in areas of high ambient light.

Acquisition Of A Filmed Subject

The Prior Art to the present invention teaches filming and lighting methods for acquisition of one or more subjects (typically up to 5 subjects at one time) within the subject image capture area, in front of a light absorbing black, blue, or green back screen under a lighting arrangement to acquire images of the subject, the lighting arrangement having one or more first lights for illuminating a front of the subject, and one or more second lights for illuminating the rear and/or side of the subject and operated to sharpen by illumination an outline, or extremity of the subject; and optionally, one or more third lights for illuminating the feet of the subject when acquiring images of a full bodied subject; wherein the first lights are angled towards the subject such that the majority of light emitted by the first lights is not reflected by the back screen back to the subject (or the camera), or alternatively, lights which have a drop-off (illumination) distance which is less than the distance between the first (or front) lights and the back screen. The object of either method is to minimize unwanted light incident on the back screen within a plate shot view of a camera filming the subject. In some embodiments, the first and second lights illuminating the filming subject comprise profile spotlights preferably to a ratio equal to or greater than 60% of the illumination directed towards the subject.

In some embodiments, the first and second lights are arranged to illuminate a cuboid volume such that, when the subject moves horizontally within the cuboid volume, a nature of the illumination on the subject remains substantially the same; and optionally and preferably the lighting casts shadow across the subject, accentuating form and the passage of light moving across the subject. In some embodiments, LED lamps can comprise a semi-opaque diffusion panel immediately in front of the LED array to soften the LED spot-light beam; and/or to spread a soft edged light directionally into the cuboid area lighting the subject. In some embodiments, LED flood panels or lights can provide over-head lighting to illuminate a subject, and optionally, the LED Panel units are mounted flat or substantially parallel to the filming studio walls and ceilings, or built flush fastened into the filming studio structure.

At least one camera used to film the subject is stationary, the subject is a moving subject and the lighting arrangement is arranged to illuminate the outline of a subject using the second (back and/or side lights), the level of illumination from the second lights being at least the same as or most preferably greater than the level of illumination directed towards the subject from the front or first lights. The contrasting level of illumination created by the second lights against the first lights, provides a more rounded or 3D look to the image, lifting shadows in the subject's clothing and causing shadows to move across the subject as the subject moves before the camera under the lighting arrangement.

Camera Positioning And Audience Eyeline

Figure 26:
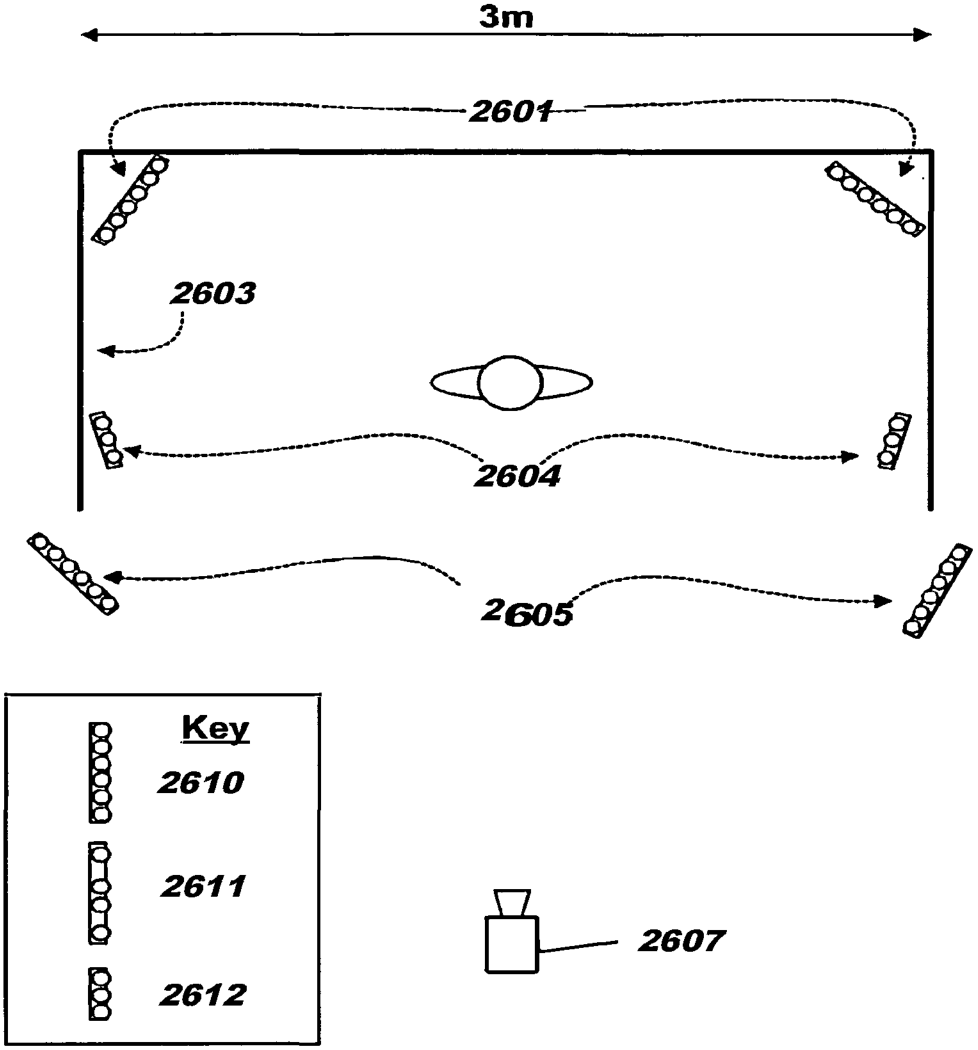
FIG. 26 shows a plan of the studio setup of FIG. 25.

The camera's position varies according to its function within the TP System. If the camera is to acquire a film of a subject to be displayed as a virtual image on a performance stage, the lens position relative to the subject should broadly correspond to the eye line view of the watching audience as shown in FIG. 26. It is essential to get the relative eyeline height correct otherwise the subject could appear to be leaning backwards or forwards.

The appearance of depth up stage/down stage is an illusion. This illusion is most effectively performed when the audience eyeline is just below the line of the stage floor and the camera lens filming the subject is positioned at least 5 m away from the subject and angled corresponding to the angle of audience view relative to the subject. By way of example, the angle of view is ideal when the viewing audience are able to witness glimpses of the shoe soles (or their reflections) belonging to the virtual subject as he or she walks about the stage.

The distance between the camera and the subject is determined by the lens focal length and the subject. In this instance in order to capture a full sized standing person that has the ability to extend their arms freely in the frame without falling out of the frame a 40 mm (35 mm format) Lens is used. Lenses in this range fall within the "normal" range of a subjective Point of View ("P.O.V."). The stage riser is approximately 20 cm below the height of the image capture camera and the camera is vertically adjustable in an upward direction to obtain a more neutral view of the subject and preferably, the filmed subject is performing a presentation looking straight into the camera lens to maintain direct eye contact.

Assuming a stage riser of 1 foot (0.3 meters) high is being used to film the peppers ghost subject placing the Lens approximately 2 feet (0.6 meters) off the ground would allow the point of view of the viewer to be within the normal viewing range for the reflected Telepresence image to appear natural on a slightly raised stage. The camera may be able to be adjusted vertically to attain a more "neutral" angle of view for certain applications or viewing situations. Put another way, the camera acquiring the subject to be projected as a virtual or peppers ghost image upon a stage is generally between knee high and hip high.

Figure 20:
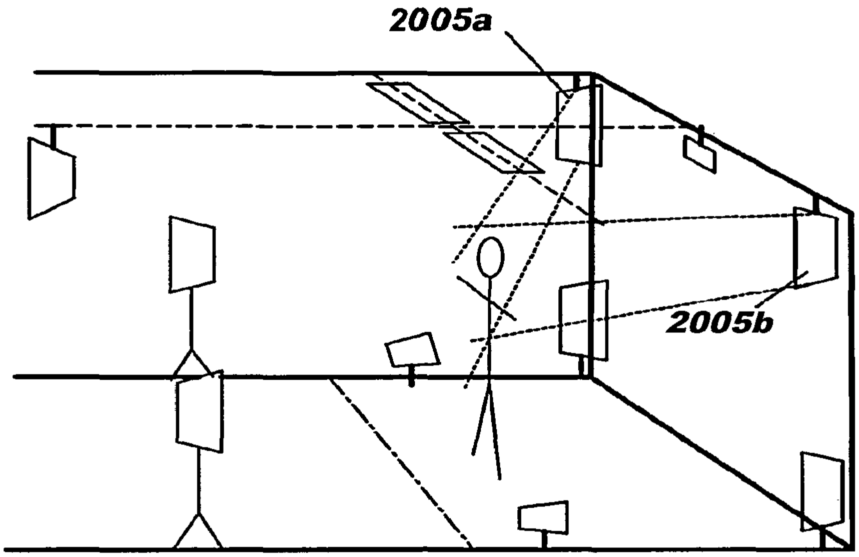
FIG. 20 shows a perspective view of a studio setup of FIG. 15 with the light path illustrated from a light panel arranged to illuminate the head/hair and upper body of a subject.
Figure 21:
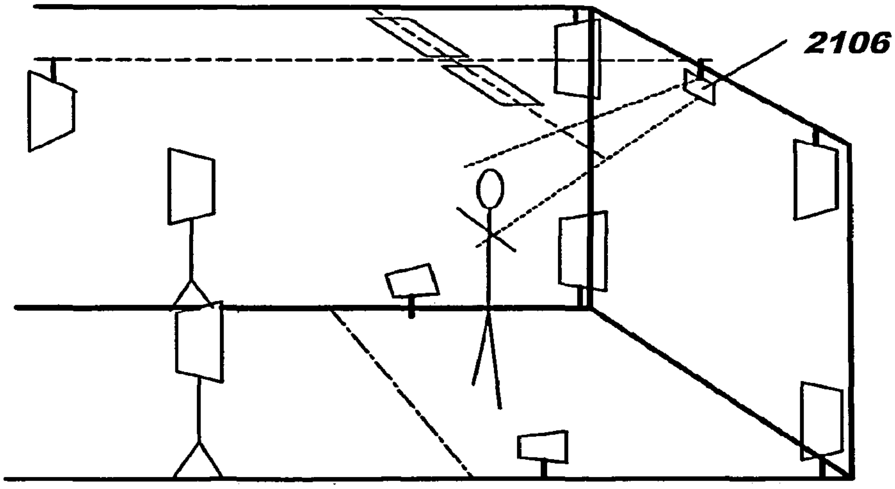
FIG. 21 shows a perspective view of a studio setup of FIG. 15 with the light path illustrated from a light panel arranged to illuminate the head/hair.
Figure 22:
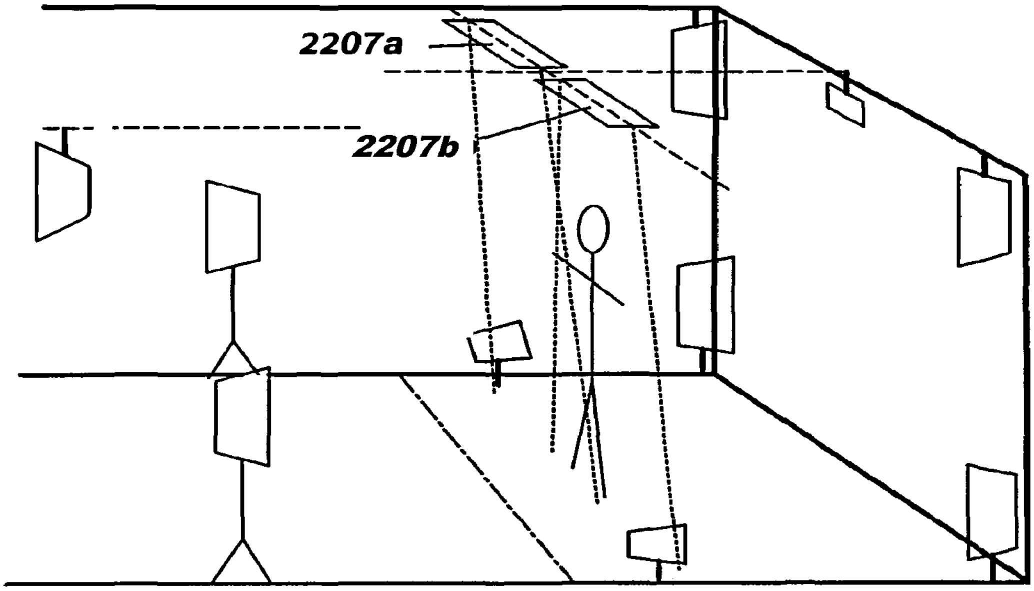
FIG. 22 shows a perspective view of a studio setup of FIG. 15 with the light path illustrated from an overhead light panel arranged to provide rim to the head of a subject.

It is important to understand that the subject is acquired in FIG. 20. As the eyes of a painted subject 'follow you around the room', so the filmed subject looking straight into the camera lens makes eye contact with everyone in the audience. Contributors often have to be coached into not scanning the room as they would in a live situation.

A common standard for HD Cameras are the Sony models HDW X750, HDW 790, F900R, all of which are single link HD SDI processing 10 bit 422 color streams at 1.485 Gigabits/per second and F23 which is both a single and dual link HD SDI processing 12 bit 444 color streams at 2.2 Gigabits/per second.

More recent additions of similar cameras as models yielding the finest picture results using the HD SDI signal at 50/60 frames per second interlaced or progressive include the Sony FS7, the Sony F55 and Sony F65. Progressive cameras include the Red Camera Helium, capable of 4K 6K and 8K resolution.

The SonyF55 is suited to output 4×1080HD 50i/60i film via each of its 4 3G-SDI output connectors. Using quad-SDI signals into a 4K encoder and 4K decoder each equipped with 4SDI inputs and outputs is a new aspect to this invention as a means of capturing up to 4 HD 1080 images such the appearance of the peppers ghost or AR video image approaches a 4K vertical pixel height.

To successfully acquire images of a dancing performance and other sudden movement scenarios, an HD-SDI signal at between 50-120 frames per second would be most ideal. The data rate requiring real time encoding (compression) would be higher than 50 or 60 frames per second, but the final compression to the codec positioned in the subject acquisition location would be 20M/bits per second. High speed frame rates would therefore be transmitted via codec using the picture optimized encode.

Additional cameras in the filming studio operated to acquire AR Holograms, referred to in more detail below, are positioned around the studio at variable angles to the filmed subject, including perpendicular to, and/or overhead, below, behind, and/or upstage of the subject. The AR Hologram images may be full body shots or close up shots. The AR cameras may be moveably mounted on gibs or tracks, or hand-held by a camera operator. The movement control may be operated over a LAN or remotely over a WAN, preferably using an agile network control protocol such as Network Digital Interface.

If the watching audience is viewing the image on a secondary screen filming as an Augmented Reality ("AR") holo-image the camera height is raised to waist high, head high, or higher. AR holograms are suitable for display on the same stage as the virtual image, taking the form of the subject being "dropped into the stage set" in a manner similar to projection of a peppers ghost display, but with an opacity of up to 100% against its lit backdrop. This may be achieved only by the AR image being viewed through a second camera. This may be the same camera/s used to capture the peppers ghost display for streaming to a TV or online audience. The AR image may also be viewed via an app in Smart Phones and other mobile devices such as tablets, the AR displayed against a backdrop acquired by the Phone when camera mode is activated on the mobile device. Typically, an AR hologram is acquired in front of a lit green screen. Optionally, the AR Hologram may be acquired in front of a blue or black screen.

The camera is equipped with a remote moving head attached to a 'magic arm', providing motorized mechanical movement of the camera when anchored to a convenient mounting position. It would be desirable for the camera's features and adjustments to be controlled remotely via LAN and programmable to environmental pre-sets (such as shutter speed responding to programmed subject matter/lighting inputs). This would enable the same cameras to capture a peppers ghost and AR image simultaneously.

Slower film frame rates of 24, 25 or 30 frames a second are acceptable for acquisition of a subject requiring less movement, for example when the subject is seated or presenting from a lectern. Slower film frame rates are also acceptable for image acquisition of an audience member.

The return feed or audience signal communications may also be "slower" than a high speed broadcast codec. For example, if the subject view of the audience is one of mainly a monitoring capacity rather than immediate two way communication, the audience return feed does not necessarily require a high speed broadcast codec but may be delivered via more commonly used software streaming protocols or lower cost contributory codecs described further below.

In summary a camera utilizing a light sensitive high quality fixed prime lens or a wide angle zoom lens, with adjustable shutter angle set to 270 degrees, frame rates adjustable between 25-120 frames per second (fps) interlaced, capable of shooting at up to 60 fps progressive, would address the key range of performance requirements for most kinds of video imagery, from static texts and graphics to streaming images of virtual subjects in motion, displayed either as a peppers ghost or Augmented Reality Hologram.

Camera Positioning And Orientation To Maximize Pixels

One or more cameras may be arranged relative to the person such that the image of the person captured by the camera extends across the entire height of the image captured by the camera. This advantageously maximizes the pixel count for the person, optimizing the resolution of the person in the image.

For extra image solidity and sharpness both the camera Plate Shot in the filming venue and the projection throw in the display venue can be limited to a smaller size—for example 3m width×1.7 m high—thus maximizing the projector's brightness into a smaller concentrated space and the 1920×1080 pixel panel used in forming the image of say 1.68 m high. This technique is particularly advantageous when a presentation or performance necessitates filming of the peppers ghost TP virtual figure on stage for real time video relay to large image (IMAG) side screens or for TV broadcast cameras. The denser pixel count and brighter image looks more solid and realistic when enlarged to bigger side screens. This technique may also be used where bandwidth restrictions dictate HD images are projected using codec compression as low as 3-4 M/bits per second for each AV signal.

Using a foil, a typical DLP 3-Chip or LED Laser projector of 10 000 lumens brightness and 1920×1080 pixels can project realistic images of virtual human beings or other objects up to 5 m wide, provided the closest viewing distance of the audience viewing is at least 5 m distance away. Should the viewing audience be less than 5 m or the image is required to be filmed by cameras for onward broadcast to TV or Online video channels, the throw of the projector would be shorter (or a narrower throw lens used), rendering the pixel count tighter and the image would be correspondingly shrunk—ideally to the optimal 3 m width for 3 m viewing distance. This represents a vertical pixel pitch of 3,000 mm divided by 1920 vertical lines, i.e. 1.56 mm, and a horizontal pixel pitch of 1.56 mm to a height of 1.68 m.

The camera is used to capture an image of a subject located on a stage riser located in-between the camera and a non-reflective, or substantially light absorbent, black, blue or green screen material backdrop to the stage, viewed and captured by the camera using a prime lens between 35 mm-90 mm, which is optionally and/or preferably configured in portrait rather than landscape mode to capture: HD in 1080 pixels width×1920 pixels height; or 4K in 2136 pixels width×3840 pixels height; or 8K with 4,320 horizontal pixels and 7,680 pixels height; and wherein the frame sizing of the image capture lens in portrait mode falls in the range of between 1.2 m-9.6 m width or 1.2 m-9.6 m height; and/or the pixel density of the image capture camera and lens selection equates to between 5-40 pixels per cm height of the subject; and optionally and/or preferably a camera and lens configured in portrait rather than landscape mode to capture HD in 1080 pixels (w)×1920 pixels (h) uses pixel pitch between 1.5 mm-3 mm; or 4K in 2136 pixels (w)×3840 pixels(h) uses pixel pitch between 0.9 mm-2.6 mm; or 8K with 4,320 pixels(w)×7,680 pixels (h) uses pixel pitch between 0.3 mm-2.1 mm.

Figure 32:
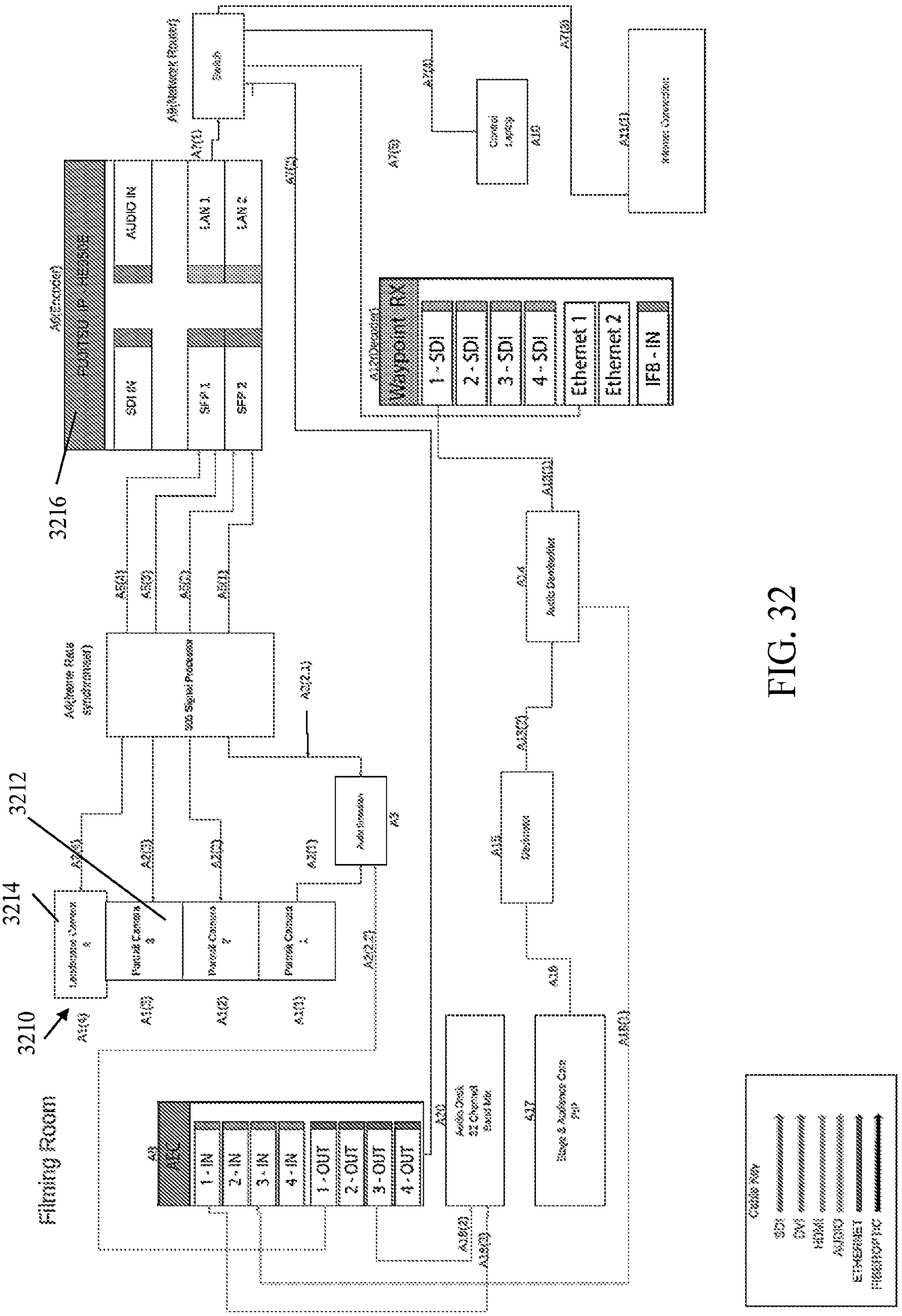
FIG. 32 shows a schematic view of another embodiment of a filming system/filming room for a peppers ghost image including multiple capture cameras, and a frame synchronizer.
Figure 33:
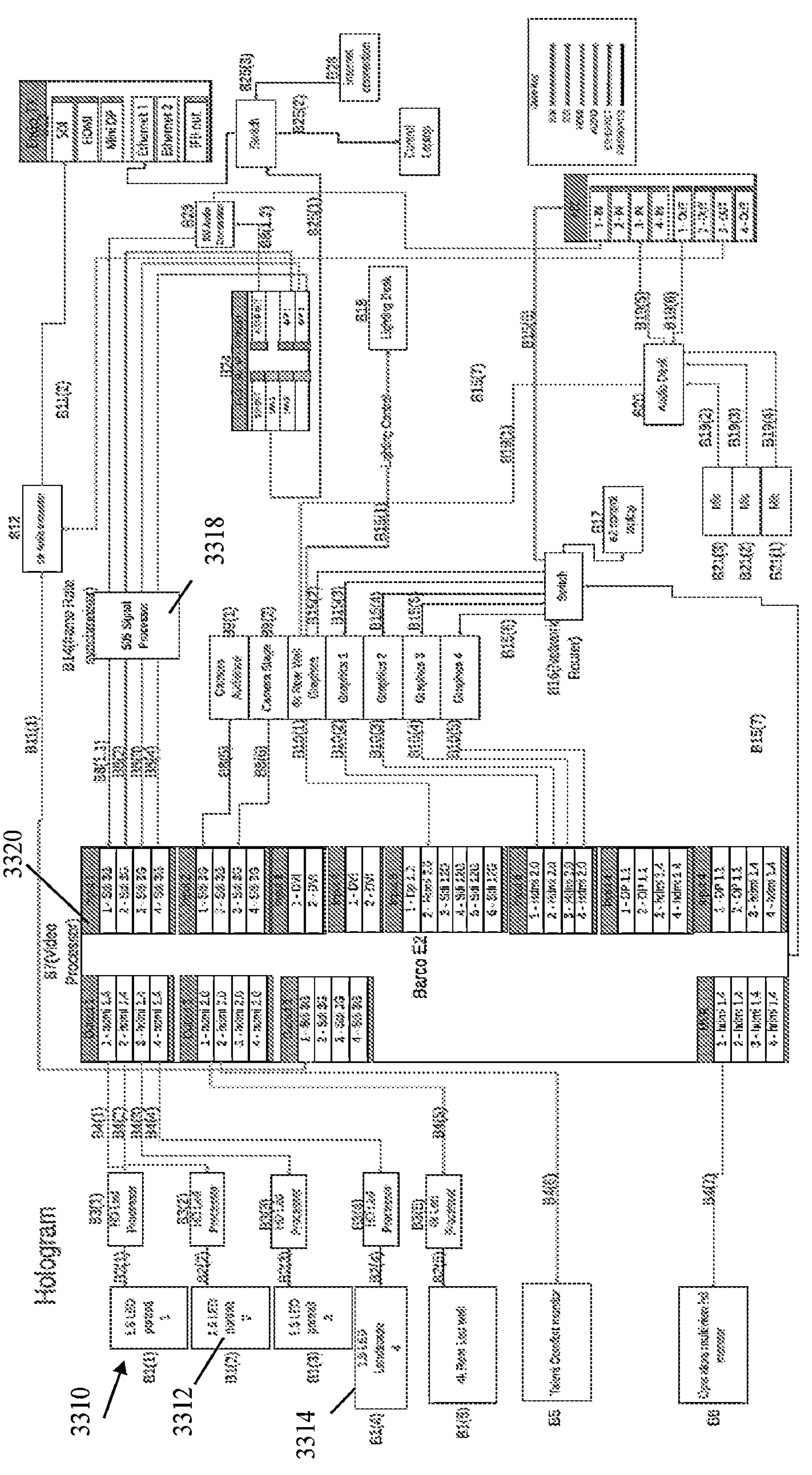
FIG. 33 shows a schematic view of another embodiment of a display system/display configuration for a peppers ghost image including multiple display screens mirroring the orientation of corresponding filming cameras.

As shown in FIGS. 32-33, in some embodiments, filming of a scene or multiple subjects on a stage can include using multiple cameras 3210 positioned in either portrait or landscape orientation, the peppers ghost display can include displaying the feed from each filming camera on a corresponding LED display screen 3310 installed above or below an angled foil. The orientation of the LED display 3310 can match the orientation of the camera 3210 feeding a signal to the LED display 3310. For instance, a portrait camera 3212 orientation preferably outputs a video signal to a portrait oriented LED Display 3312, and a landscape camera 3214 can feed a video signal to a landscape oriented LED display 3314.

Shooting a stage or multiple subjects with multiple cameras in either a portrait or landscape orientation can help maximize the pixel count of a filmed subject display, while helping to minimize transmission times of the video signals to the remote display.

The same principle of pixel density applies to LED panels and the optimal choice of pixel pitch for the peppers ghost display, which should be finer or tighter, the closer the viewing audience (or the camera shots filming the stage) are to the virtual image.

The LED displays can be set up in corresponding orientations above or below the foil at the display site to maximize the pixel count for each subject on stage. The orientation of the cameras and corresponding LED displays can be varied to accommodate a particular group of subjects to be captured (bands of different make up and standing vs. seated members).

For instance, in one embodiment, 3 portrait and 1 landscape shooting cameras 3210 and corresponding LED displays 3310 can be utilized to film and display a peppers ghost display of the captured subjects. This orientation can be useful for instance to capture a four piece band including 3 standing members and one seated members, such as a band including a standing guitarist, bass player, and singer, and a seated drummer or piano player. The portrait cameras 3212 may capture at least one of the guitarist, bass player, and/or singer, and the landscape camera 3214 may capture a seated drummer or keyboard player.

Alternatively, if the group of subjects is a band with all members standing, four cameras portrait oriented and four corresponding portrait LED displays can be utilized.

One benefit of this multiple camera embodiment is that multiple HD cameras can be utilized to send multiple HD signals across a broadband network, and the HD signals can be processed by the Codec to produce a Peppers Ghost display with 4 k or higher resolution. However, because the individual video signals are HD resolution, they can be transmitted together as 4 separate signals using a single 4 k video codec and optionally a frame rate synchronizer comprising means of synchronization of untimed video signals and embedding of a video/audio signal prior to the encoding process and/or after the decoding process, to provide video/audio which is accurately calibrated with external video sources or a timecode of a live performance. A low cost simplistic example for synchronizing an AV signal for transmission to a codec is the https://www.aja.com/products/og-fs-mini In another embodiment of the invention the LED may be configured in a portrait fashion or any other shape consistent with the shape of a subject being acquired. Since the subject is acquired against an invisible backdrop the image capture camera plate shot providing for an LED Screen at 1080 HD to display the maximum pixel count for a virtual human image standing would naturally occur in portrait mode and provide a vertical height pixel count greater than 1080 pixels and preferably at least 1800 pixels to a maximum of 1920 pixels; and/or Projection of a life size virtual human image measuring approximately 180 cm-220 cm high is optimally displayed in HD 1080 where the closest viewing distance of 5 m from the subject display comprises using LED panel displays of at least 5 pixels and preferably 7 pixels per cm of actual life size measurement of the peppers ghost subject display. The pixel pitch of the LED can therefore be in the range of 1.5 mm-3 mm; and/or a life size human image measuring approximately 180 cm-220 sm high is optimally displayed in HD 1080 where the closest viewing distance of 3 m, such as a head and shoulders Relay or TV broadcast camera shot, and further comprises using an LED panel display of at least 7 pixels and preferably at least 10 pixels per cm of life size peppers ghost subject display. The pixel pitch of the LED can therefore be in the range of 1.2 mm-2 mm.

Applying the same principle to an LED Screen for use as a 4K virtual image display has a vertical height pixel count greater than 2160 pixels and preferably at least 2700 pixels and a maximum of 3840 pixels; and/or A life size image measuring approximately 180 cm-220 cm high is optimally displayed in 4K where the closest viewing distance of 2 m is achieved by a close up camera shot of the subject head or face, further comprises an LED panel display of at least 10 pixels and preferably pixels per cm of life size peppers ghost subject display. The pixel pitch of the LED can therefore be in the range of 0.9 mm-1.56 mm; and/or A life size image measuring approximately 180 cm-220 cm high is optimally displayed in 8K where the closest viewing distance of 0.5 m is achieved by a close up camera shot of the subject head or face, comprises using LED panel displays of at least 20 pixels and preferably pixels per cm of life size peppers ghost subject display. The pixel pitch of the LED can therefore be in the range of 0.3 mm-0.9 mm; and/or The LED display at the location of either the image capture studio or the projected Peppers Ghost image, or the Heads-Up-Display ("HUD") comprises a signal frame frequency rate of at least 60 HZ, preferably 120 HZ; and preferably, a frame refresh rate of 3840 HZ. This is because the faster the refresh rate, the smoother motion film will appear in the projected image; and The LED panels directed towards the Foil are controlled to create a color temperature for the subject being filmed that substantially matches the color temperature of real persons or objects, including 5500-5600 deg Kelvin ("K") "daylight" color temperature, applied to the LED image. Accurate control of color fidelity for the lighting and display will ensure the closest match of skin tones and performance costumes as between the real "in the flesh" talent and the virtual images.

Optionally and preferably, around the stage top of the display stage, a reflection in part of the stage top from the image capture stage, including reflections of the feet of the virtual image, should be visible in the projected display and/or The diffusion screen overlaying the LED described in U.S. Pat. No. 9,563,115 is improved by preferably having diffusion integral to the LED panel (instead of being a separate screen or panel cover), in a manner consistent with "Glue on board" or GOB LED Panel technology; characterized by the LED panel comprising a substantively clear resin top coating, (instead of a black rear projection screen cover), the coating having cured over the Light Emitting Diodes (LED) mounted to a panel, in order to create a flat, smooth surfaced transparent diffusion screen capable of minimizing incidence of image moire appearing on the Foil display when illuminated by the GOB LED; and optionally and preferably The LED screen directed towards a Foil may comprise cold cathode technology integrated within panel assembly during manufacture, enabling the diodes to operate indoors and emit between 3,000-6,000 NITS per M2 light output. This higher light luminosity directed toward the Foil maintains optimal volumetric opacity, enabling the peppers ghost image as a reflection to appear realistic when appearing in more brightly lit conditions such as a TV Broadcast or Streaming Studio; and optionally and preferably The LED screen directed towards the Foil comprises "Flip Chip" technology; Flip chip, also known as controlled collapse chip connection or its acronym, C4, is a method for interconnecting semiconductor devices, such as IC chips and micro electromechanical systems (MEMS), to external circuitry with solder bumps that have been deposited onto the chip pads. The solder bumps are deposited on the chip pads on the top side of the wafer during the final wafer processing step. In order to mount the chip to external circuitry (e.g., a circuit board or another chip or wafer), the diode is flipped over so that its top side faces down and aligned so that its pads align with matching pads on the external circuit, and then the solder is reflowed to complete the interconnect. This in contrast to wire bonding, whereby the chip is mounted up-right and wires are used to interconnect the chip pads to external circuitry; or alternatively Flip Chip is a process whereby the LED is configured upside down within the LED Housing panel and wirelessly bonded to minimize the incidence of white light emission in order to maintain high quality contrast; and in which Flip Chip offers several key performance benefits over traditional SMT (Surface Mount Technology) LEDs including enhanced durability, enhanced heat dissipation and superior light performance.

Flip Chip technology lowers costs and energy consumption and minimizes ecological footprint. Flip Chip has successfully demonstrated its advantage in having a lower thermal resistance and cheaper packaging costs over the conventional wire-bond LED Chip on Board "COB". Chip-on-board, COB, is a technology where uncoated semiconductor elements (dice, die, chip) are mounted directly on a PCB or a substrate of e.g. glass fibre epoxy, typically FR4 and die bonded to pads of gold or aluminum. By lowering the thermal resistance, Flip Chip LED chips are able to perform with lower junction temperatures and have less thermal decay while thermal dissipation is enhanced. Meanwhile, lower thermal resistance also enables the feasibility to increase optical output through the higher driving current. With wireless bonded technology the chip can directly emit light from the top and the side with no wire bond casting shadows or creating uneven light distribution, providing 15%-40% more light output compared to SMD LED, with minimal difference in power consumption.

Preferably, the reflection of the LED panels and chassis in the Foil appear black to the viewer within in the stage area displaying pixels where the background image being broadcast is black; and the stage set above or below the LED and Foil, optionally and preferably comprises light absorbent dark materials or black paint coatings to avoid the incidence of unwanted reflections being viewable from either the upstage or downstage side of the Foil screen. Such stage and display arrangements minimize the reflection of unwanted light or glare appearing in the Foil, especially when used in brighter environments such as retail window displays or classrooms; and optionally The LED displaying of one or more 1080HD×1920 pixels images to be displayed as a peppers ghost in portrait mode uses a 4K LED processor instead of an HD LED processor in order to accommodate a vertical pixel count of up to 1920 pixels within a 2136 pixel "image parcel" otherwise used as the horizontal plane of a 4K image 3840×2136 pixels; and optionally The 4K LED processor can process in a single HDMI 2.0 signal up to 4×1080 HD×1920 pixel image parcels configured uniformly in landscape or portrait mode; and The LED may be laid out in the Foil display under multiple Foil screens or the same screen; the LED may be configured as 4 separate screens, each screen arranged either in portrait or landscape mode in a location above or below the Foil, mirrored to the shape and size of the image parcel; and The LED processor is optionally and preferably connected to a video processor, mixer and scaler [for example the Barco Encore system pictured in FIG. A of the Provisional Application 61/080,411] optionally equipped with a 4K video input/output card, wherein the image capture signal 1920 width×1080 height may be in real time, rotated 90 degrees to display an image 1080 in width×1920 in height and further, "flipped" to be a reverse mirror image suitable to reflect the subject through the Foil display in true form; and The video processor/scaler outputs the signal to the video processor as either 4×HD1080 3G SDI signals, which are converted by the video processor/scalar or signal converters to connect with the LED processor using HDMI connectors and cables, or a single HDMI 2.0 4K connection per 4K LED processor.

According to a new aspect of this invention, where more than one camera is in use to acquire virtual images of one or more subjects concurrently, the audio/video signal is transmitted to a frame synchronizer to accurately calibrate (or synchronize) the timing of an incoming video and audio source to the timing of an existing video system (including a codec) in order to ensure the audio/video display works with a performance to a common time base. The frame synchronizer may also be used to embed audio with the video signal to accurately synchronize audio with video; and/or provide accurate color fidelity for each camera signal prior to transmission to a video display.

A frame synchronizer may also be used when displaying more than one audio video signal of a virtual image to a common time code within a performance. For example, a frame synchronizer may be installed at the display venue between the decoder and a video processor transmitting to the projection or the LED display.

According to a further aspect of this invention, the frame synchronizer may be connected to a video processor, or video mixer, transmitting images to a secondary screen, such as an IMAG screen located in the display venue, or a screen located remotely, such as a smartphone or PC being viewed by an audience member.

In one embodiment, images of a subject are concurrently acquired by more than one camera against a black, blue or green screen backdrop. The backdrop may extend to the sides around the subject, or even the stage below the subject, so that the subject images acquired may be keyed out from the backdrop, in order to superimpose the subject image into another, secondary video image as an AR image.

The cameras may be connected to a frame synchronizer programmed to process a common timecode against which the images are recorded (for example a musical performance by one or more artist). Alternatively, if the camera signals are not necessarily being transmitted live, the acquired images may simply be manually edited in the video production.

The synchronized images may be transmitted to a video mixer or video processor equipped to provide a means of superimposing live the virtual image into a second video signal resident in a video mixer/processor located at a display venue. The second video image could for example be an image of a performance stage, or of an audience viewing the performance stage at a display venue.

The first image to be superimposed may comprise a signal of a subject acquired by a locked off camera for the on-stage hologram. Within the time flow of the performance additional AR images of the subject may be acquired by additional cameras located at the acquisition studio. The AR cameras may be static or moving to a pre-defined movement track.

For a real-time performance, the multiple AR camera images of a subject are transmitted via a frame synchronizer to an encoder 3216 for encoding the signals prior to transmission over a network. The point of view and/or motion of the AR camera signals may also be recorded by the frame synchronizer for control to a common timecode in which other cameras are concurrently deployed.

Independently of the frame rate synchronizer, The AR signals are processed at a display location by a video mixer or video processor, superimposing the AR images into an image of a performance stage, and optionally, the video processor transmits to a communications device connected to an audience viewing images of the performance on the display stage acquired by one or more cameras at the display venues. The images of the performance stage may be acquired with or without any performers, according to the production dictates. For example, the stage images may be pre acquired prior to the stage becoming populated with real or virtual talent.

The "empty" stage may be lit in accordance with the final performance lighting. The stage lighting program may also be synchronized to the timecode of the performance.

The AR image may be filmed composited directly with a virtual backdrop comprising CGI Graphics being displayed on LED Backwall (see FIG. 33, B10 (1)) or alternatively, composited directly with a computer graphic of a backdrop, combining one or more film images transmitted as B8(1.1-1.4 inclusive) with one or more graphics images as B10(2)-(5) inclusive. B17 Video processor control mixes the two or more images and outputs to Monitor B6 as a composited image for onward transmission to an online audience.

By acquiring images of a stage "empty" of virtual performers, the signals of the AR cameras and cameras at the display location are successfully mixed to provide the illusion of the virtual image appearing on the stage, the images displaying an angle of view to the subject further calibrated on a timecode pattern to match a point of view and/or motion track of both the AR and performance venue cameras. Alternatively, the AR images may be displayed in front of a virtual stage set comprising 3D computer graphics of a stage backdrop or virtual studio scene.

The synchronized image of a virtual subject may be superimposed into the synchronized image of a performance stage, using the video mixer or processor. The output signal combining the AR images with the acquired images of the performance stage and/or audience is transmitted to a secondary screen, such as an IMAG screen located at the performance venue, or to a TV, PC or smartphone screen being viewed by an audience located remotely.

The mixed images displayed on the IMAG screen or remotely to an online audience provide for a virtual subject performing on a stage wherein the movement of the acquisition cameras around the subject's body adds a volumetric look to the virtual image's appearance on stage. This illusion of realism vested in the virtual subject is further enhanced by the AR image/s retaining 100% opacity against the stage or audience image. This is achieved by alpha channeling the subject in the stage view.

The Immersive Telepresence Display Vs. 2d Flat Video Panels

The use of a flat monitor screen to display a filmed subject, or an audience, is a typical display medium for many presentations and is the greatest limiting factor for achieving both scale and an immersive experience. Whether placed in front of or above a performance stage, the return feed or reference display monitor cannot be satisfactorily positioned at eyelevel to the stage Performer without the monitor frame being visible to the audience. This would be a distraction to the immersive experience sought.

Moreover, monitors and other flat display panels used in isolation offer limited realism in the visual effect, whilst also consuming a greater amount of 'data bandwidth' to achieve their limited effect. Their limited realism arises because displays appear as flat 2-Dimensional images, often confined to head and shoulders shots of a life size subject. This is common and well known to audiences watching conventional television or LED/projection displays.

Return Feed Of An Audience Image To A Filmed Subject

By using a monitor panel or conventional projection screen the camera lens is typically located about the periphery edge of the display. For viewing larger audiences, or in circumstances where the camera lens acquiring images of a subject is some distance away from the filmed subject (say greater than 5 m) then the return feed displaying one or more audience members may comprise an image projector beaming the return feed onto a projection screen, preferably located just above or below the camera lens. The projection screen can be of any size, but to offer greater utility than a monitor should have a surface area of at least 3 m×2 m, arranged vertically or horizontally according to the shape of an audience viewing area and the frame of the camera lens capturing the audience member/s. Preferably the projector will be a 1080 HD, capable of processing both progressive and interlaced signals respectively, through DVI/HDMI and HDSDI interfaces built into the projector.

Another solution would be to arrange the camera to acquire images of a subject filming from behind a smooth transparent foil which is tensioned within a frame and arranged at an angle of approximately 45 degrees to the floor. Alternatively, displaying the return feed using a transparent foil allows the camera to be positioned anywhere, including directly behind the screen as shown in FIG. 4.2. The lens would be preferably be positioned in the central point of the screen, corresponding approximately to the central point of the audience.

The foil if correctly prepared during installation shall have a smooth uniform surface that does not impede the lens view of the TP camera, allowing images to be captured by shooting through the foil. Moreover, the appearance camera side of a virtual image visible to the live talent or audience also does not affect the lens view whatsoever.

The experience for interaction between the subject in the filming studio and the audience in the display location may be enhanced by the form of signal return feed the subject receives when presenting to a live audience attending in person, or watching remotely via a connection over a network. See PCT/GB2009/050850 diagram FIG. 23 and also U.S. Pat. No. 8,462,192 for the configuration of an image acquisition studio in which the filmed subject views a return signal displayed through a semi-transparent screen in front of a stage.

The image is generated by a projector and projection screen (or a video wall) arranged above or below the stage, directing a video image towards the Semi-Transparent screen positioned at an angle of approximately 45 degrees.

The video wall or projection screen, and surrounds, are masked by a black light absorbent surface to prevent or mitigate unwanted light glare from the video projection or set lights interfering with the image capture quality of the subject.

By providing for a camera to acquire images of a subject by shooting through a transparent foil from some distance behind the screen, camera placement is more flexible. However it should be noted that in circumstances where the camera view is shooting through a foil in the design shown at FIG. 23, for a pair of mirrored TP rooms, then the lens view must clear the ancillary masking of the projection pit enclosing the reflective 'bounce' screen, video or LED wall.

As the Prior Art of the invention explains, the return feed viewed in this manner provides for a more "Immersive" Telepresence experience. The video image may include signals from one or more cameras and take the form of another person/s. The audience may be located remotely in a single location, or located remotely across multiple locations, viewing and/or interacting with the presentation online.

Figure 23:
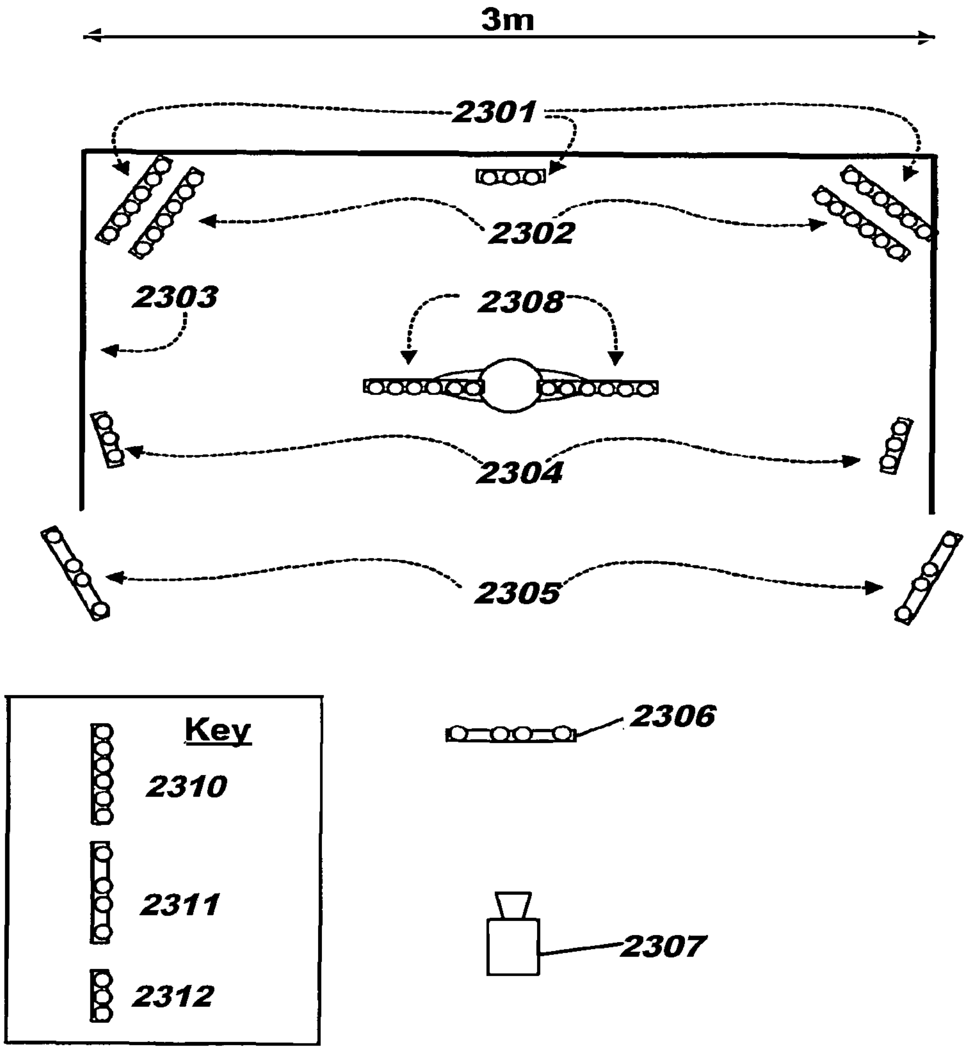
FIG. 23 shows a plan of the studio setup of FIG. 15.
Figure 24:
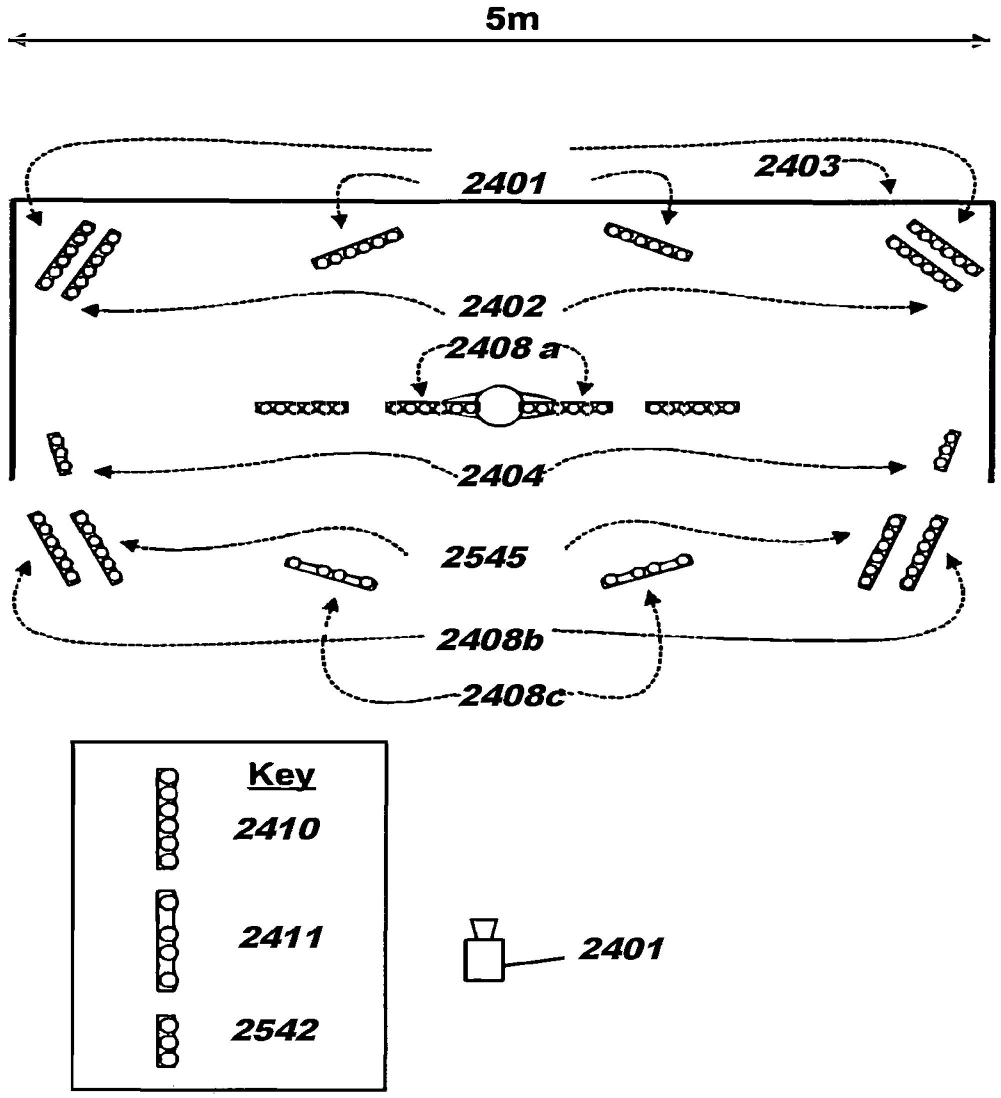
FIG. 24 shows a plan of the studio of a studio setup for a third lighting arrangement in accordance with another embodiment of the invention, wherein the lighting arrangement comprises LED lamps.
Figure 25:
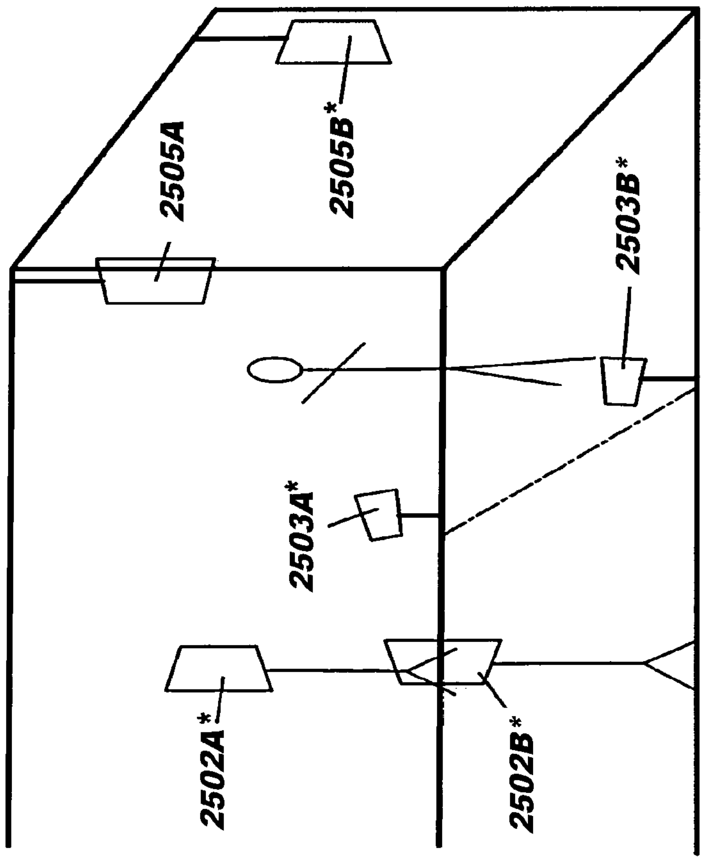
FIG. 25 shows a perspective view of the studio of a studio setup for a fourth lighting arrangement in accordance with another embodiment of the invention, wherein the lighting arrangement comprises LED lamps.

A reflective projection screen or an LED panel display as shown in FIG. 23 may be arranged on the floor or the ceiling of the filming studio. The projection or LED screen directs an image in the same way as a conventional Rear Projection screen. However the positioning of the filming camera lens is central, rather than peripheral, to the audience field area, which significantly improves referencing for better positional reflexes and eye level contact between audience participant and the filmed subject.

This final arrangement is the preferred set up to be used for a TP meeting room experience. In this particular embodiment, a foil tensioned within a frame is arranged at 45 degrees to the floor, approximately in the center of the room, almost cutting the room in half. A projector or LED video wall/screen is arranged as shown in any FIGS. 23, 27, 28 to project a virtual image upon a stage from a remote location acquiring the subject film.

The return feed video may be a mirror image of the filmed subject in which Computer Generated Graphics (CGI) appear as floating virtual 3D images alongside the subject in the mirror image. The image may be displaying a view of the entire stage in a remote location from the audience POV, including live presenters appearing alongside the peppers ghost subject in real time. The video image may combine any number of separate video signals via a mixer to form composite or Picture in Picture ("PIP") images for the subject, stage performers or audience, to view.

One or more cameras acquiring images of an audience may be positioned anywhere convenient at a fixed point upon the stage, the lens directed towards a viewing audience. Overriding consideration should be given to camera position for the performers to acquire a clear and accurate view of the audience from the display stage perspective. Desirably, the camera position permits eye to eye contact between a subject on stage and an audience member. This is most conveniently achieved in most cases for the camera to be positioned at eye level. Additionally, when the filmed subject is directed to be looking straight into the camera lens during filming (including an audience member), the filmed subject makes eye contact concurrently with everyone in the audience.

Since the audience return feed video images of an audience are not viewable by the audience the frame rate/data rate/encode of a camera acquiring images of the audience may be more compressed compared to the filmed subject signal, should limited Internet bandwidth require them to be so. For example, the frame rate may be 1080 25p/30p or 25i/30i.

In the event a large audience is present more than one camera may be used. Indeed for large audiences a number of solutions are available. The first solution is to mount a remote head camera or multiple remote head cameras using magic arms, enabling these cameras to move whilst anchored to a mounting point. The cameras are equipped with variable zoom lens enabling remote adjustment in fore/aft range of at least 10 m.

The cameras may be equipped with lighting integral to the chassis, to assist in the lighting of film subjects; and/or equipped with adjustable iris to compensate for light intensity and arranged to process light having an intensity of below a threshold value as being black.

The cameras are optionally equipped with adjustable shutter speeds providing aperture speeds to be varied as a means of reducing motion blur in the filming process. The cameras are enabled to process either progressive or interlaced HD video signals. For displaying seated audience images, a progressive signal is desirable.

The cameras may be fitted with microphones enabling voice recording in real time. The camera may be enabled to recognize and track a signal or object (such as an infra-red or ultra violet light, or a black and white patterned barcode). Once the lens registers the signal, pre-programmed settings direct the camera's view.

Thus in an audience of hundreds or even thousands of people, when an audience member is chosen to interact in real time with on stage Performers or subjects (live or virtual) an audience management system may be used that highlights in a way recognizable to the camera lens the precise position of that audience member. The program control of the camera would enable the zoom lens and any additional light or sound recording devices to focus predominantly on the audience member, feeding back an image to the live or virtual Performer on stage that is clear and referentially accurate in terms of eye line.

Figure 27:
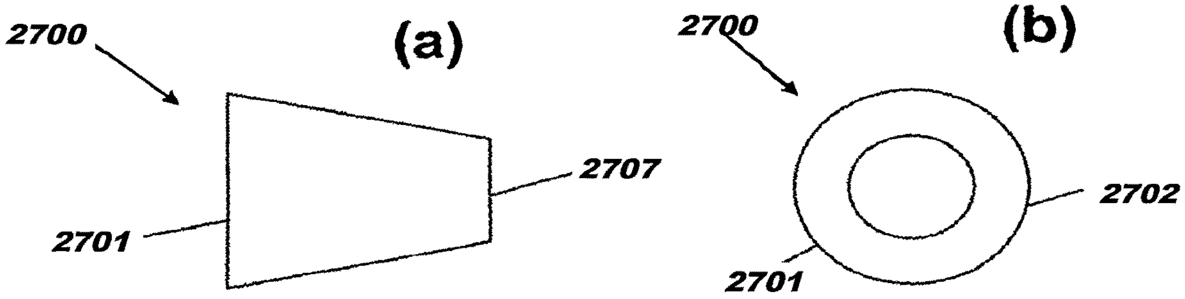
FIG. 27 shows, in accordance with an embodiment of the invention, a light hood.
Figure 28:
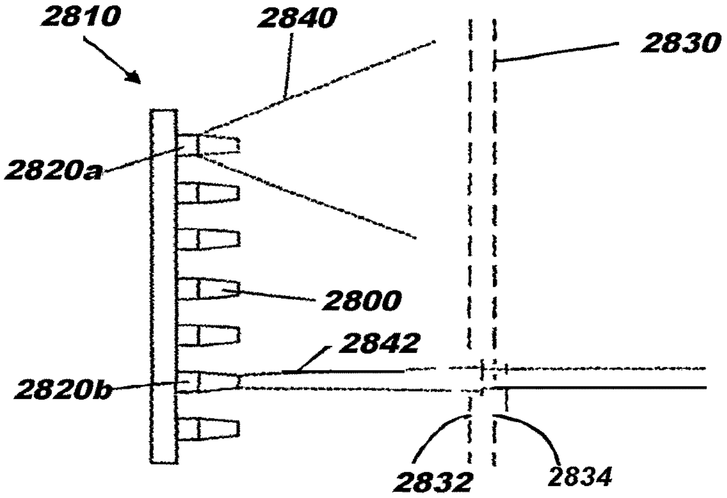
FIG. 28 shows, in accordance with an embodiment of the invention, an LED array with light baffles/hoods.
Figure 29:
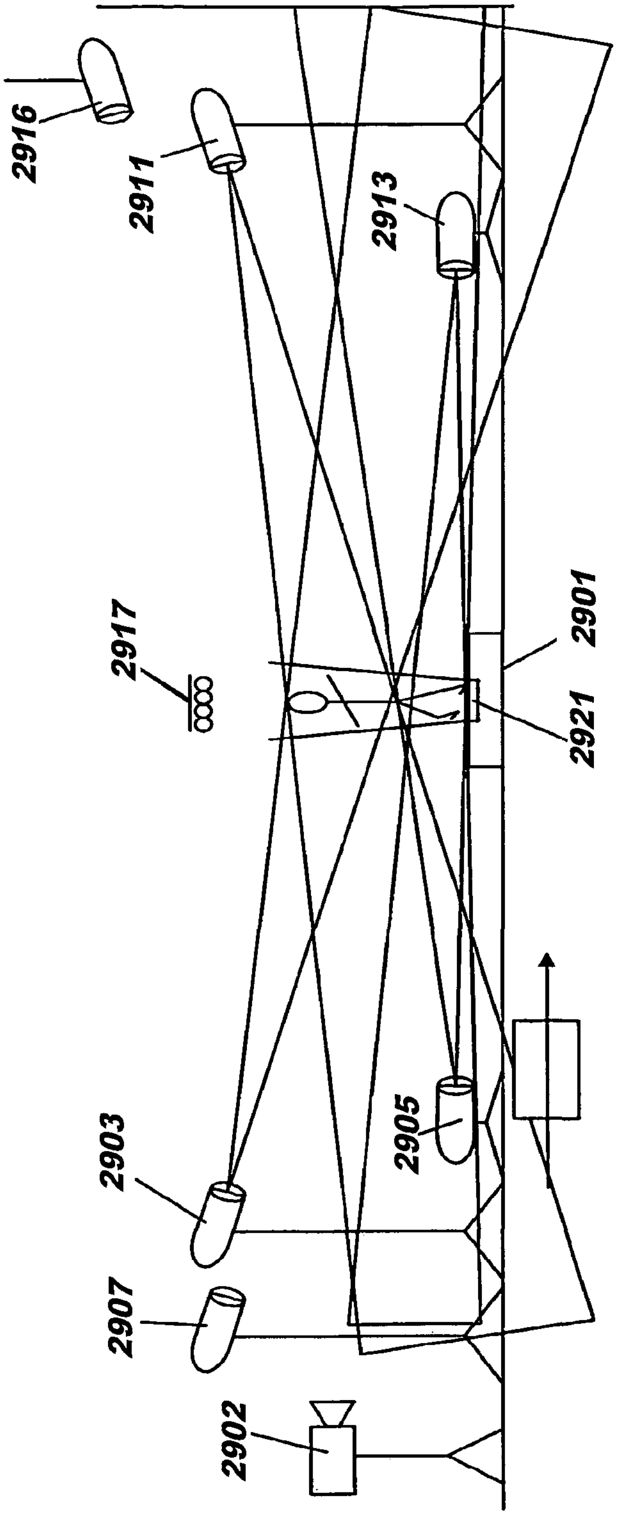
FIG. 29 shows a cross-sectional view of a studio setup for a lighting arrangement in accordance with another embodiment of the invention.
Figure 30:
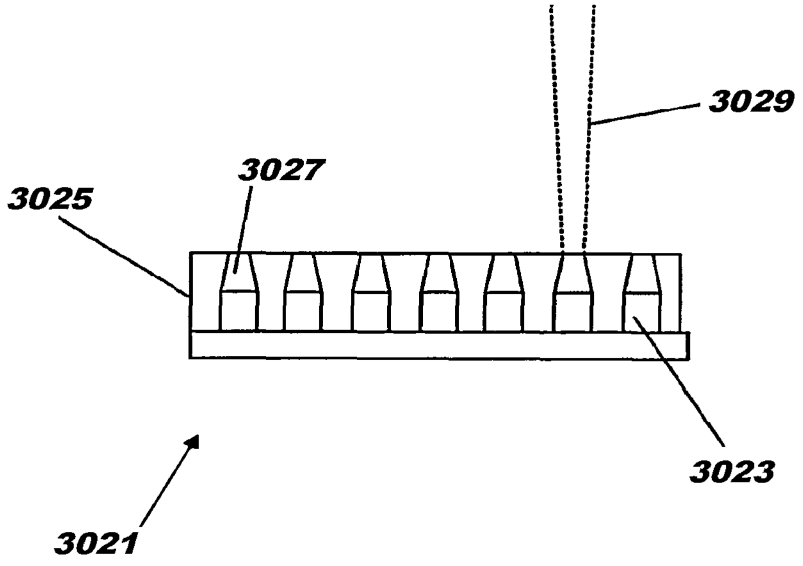
FIG. 30 shows, in accordance with an embodiment of the invention, a floor light with an LED array with light masks.
Figure 31:
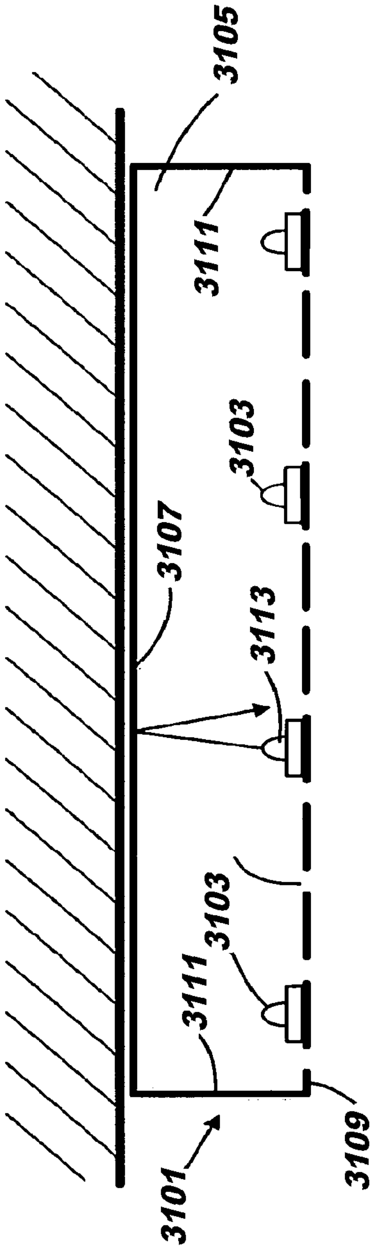
FIG. 31 shows, in accordance with an embodiment of the invention, a luminaire comprising an LED array inside a chamber with reflective surfaces.

The light or sound recording devices used for audience members may be pre-set. Lighting is permanently installed and powered on to light the audience/individual audience members whenever needed. Cameras and microphones arranged likewise. FIG. 27 shows how an auditorium might be configured for light, camera and sound. FIG. 28 shows how a smaller TP meeting room might be configured. The arrangements show lighting and sound recorders arranged throughout the auditorium.

Lighting is angled towards the audience and away from the stage so as not to feed back as much audience vision as possible to Performer, whilst not impeding audience vision and experience of the foil projected images.

Each audience seat block or individual seat may be equipped with devices enabling the audience member to table interest to interact with the stage talent e.g. to ask a question—such that when selected, the seating area around the audience participant is then automatically lit for optimal motion video image capture. A nearby sound recording device and remote head camera (located on a magic arm either individually to each seat or seat block) activates to begin transmitting a suitable Audience image back to the subject.

A 360 degree camera device is suitable to capture images in the display venue for onward display on the return or "reference" feed video signal to the filmed subject. The 360 degree cameras may positioned up stage of the Foil, directed towards the audience but able also to capture the live performers appearing on stage and alongside the peppers ghost subject; or downstage of the Foil, to be configured to stream live video images of the stage and/or the audience from any row Point of View (POV) amongst the seated audience.

The camera may send or live RAW camera data indicating lighting settings on the image capture stage, the performance stage, or the audience areas. The data may be sent to the same show control system, enabling the lighting control at the filming venue/s to be more easily programmable to suit the lighting effects around the performance stage/s; and further, control the lighting of the audience/s located in the performance venue/s. The 360 degree camera may also be configured to broadcast images of an audience to a Foil video display.

The audience seating may be remotely located to the display stage and connect via a corporate network, or public online meeting forums, such as Teams or Zoom.

The final reference camera positions are those to provide necessary reference for interaction between live and virtual stage Performers and Compares. At least one camera and display screen is required for each stage. The object of these cameras is to provide accurate positional reference of the on stage talent movement. One or more cameras are located downstage of the display stage to acquire images of all or part of the stage from an audience Point of View.

In the event an AR image is displayed by transmission to larger relay screens, the AR image of the subject may also be captured at the same time (or in real time) against a green, blue or black screen using a similar lighting arrangement to the peppers ghost. The AR camera facing the front of the subject is located in the same plane but approximately 2-3.6 ft (0.3 m-1 m) higher than the peppers ghost image capture camera. This AR camera is locked off. The remaining AR cameras are movable, enabling different camera views of the subject to appear as an AR image viewable at the audience display venue, including as an enlarged image of a relay projection screen, or an image on the Foil stage, augmented into the stage shot using a pre produced camera plate shot of the stage, captured from upstage or behind the Foil, or otherwise augmented into a 3D CGI Virtual stage presented as a different image to audience viewing the AR images online.

Lighting The Image Acquisition Stage

A modest lighting arrangement lights the room upstage of the foil to provide the illusion of depth for the virtual image. A more substantial lighting rig is arranged downstage of the foil to correctly illuminate the live talent being filmed.

This lighting rig may be free standing, arranged as disclosed in FIG. 34. The lights may be retained by a truss frame, possibly an extension of the foil truss. See also FIG. 35.

For the purposes of this specification the term "back lights" includes lights to illuminate the rear and/or side of the subject. The term "side lights" is used to refer to lights that illuminate the side of the subject and the term "rear lights" is used for lights used to illuminate the rear of the subject.

It will be understood that the term "front of the subject" refers to the side of the subject facing towards a camera and the term "rear of the subject" refers to the side of the subject facing away from the camera. In most cases, the front of the subject will include the face of the subject as in some embodiments it is important that the subject maintains eye contact with the camera, but the invention is not limited to the front of the subject including the face of the subject.

Conventional TP lighting is able to satisfactorily illuminate seated live participants for the camera lenses to relay sharp HD images upon HD monitor screens. To light the subject in the filming studio a more considered approach must be taken. The image capture stage is preferably framed on 3 sides by dark covered walls and ceiling optionally and preferably light absorbent materials. A suitable camera is arranged at one end of the room, upstage of the foil, in the same field area as the virtual images, to face the live talent or audience participants. The far wall facing the camera can be covered either with black material drape or, in short throw distances (where lighting required to illuminate live stage talent would otherwise spill onto the wall causing the black material to become grey), a blue-screen/green-screen back drop and floor arrangement is preferred. The need for green screen is because if the black curtain is over lit such that it turns grey, the clarity of the virtual image is compromised, particularly around the subject outline—a fuzziness which renders the virtual image less realistic.

Relevant elements include: a true 'black' background; effective lighting to enhance the projected image; correct color fidelity; minimum motion blur without a strobing or shuttered look; correct camera height to represent the audience eyeline; effective 'costume' control to suit the talent, and which benefits the projected image; Directly behind the subject is a non-reflecting, preferably light absorbing material or configuration.

Alternatively a "light trap" may be able to accomplish an even less reflective background. Such device could be concave or have louvers at such an angle that allow "spill" light to pass through the louvers and be "trapped" within a non-reflective area while obscuring the camera's view with the surface of the louver angled perpendicular to the camera s angle of inclination.

Vantablack is a form of paint comprising nanotechnology to mimic the effect of a light trap. The use of Vantablack is a most practical example of non-reflecting "True-black" backdrop to the Source Stage in confined spaces, defined as space less than 6 m from camera lens to the backdrop (filming the subject to be a peppers ghost image). Vantablack or the like applied to aluminum panels arranged to form a seamless display constructed upon an aluminum frame in a manner similar to building an LED panel wall in vertical mode. The panels benefit from nanotechnology acting as a light trap absorbing over 99% of light directed towards it. The nanotechnology properties of Vantablack remain intact only if the panels remain untouched and therefore unmarked. The enhanced TP system comprises a backdrop to a peppers ghost filming or display, comprising reusable sheet panels of light absorbent black paint, optionally incorporating nanotechnology to absorb light, such panels being approximately 1 m×0.5 m in size and 3 mm thick, framed, packed in purpose designed flight cases and installable so the panel front faces form a seamless flat panel backdrop up to 6.3 meters high×18.8 meters wide, which avoids coming into contact with any surface during installation, operation and transit (full description to follow).

Another embodiment comprising Vantablack is an adjustably moveable stage set-partially submerged, more vertically inclined in the stage floor, the screen, frame and monitor disguised from audience or TP source talent view either as invisible black or as a component of stage set/scenery.

The human figure for the purpose of lighting is essentially divided into two main parts (head to waist, waist to feet) but adds left and right control for the back of the head, face (shadow fill) and hair fill as separate elements.

Lighting a human figure for a 'holographic' effect needs to fulfil the following criteria wherein the one or more front (first) lights and the one or more rear and/or side (second) lights each comprises different lamps for illuminating different sections of the subject, wherein the different sections comprise vertical sections of the subject; and be bright enough to capture subject detail in a uniform manner without dark spots (otherwise image becomes invisible or disappears) or overly bright spots (image bleaching).

The lighting should pick out differing textures as well as cast shadow across the subject accentuating form and the passage of light movement across the subject. Back light can optionally form a rim around the subject outline for maximum image sharpness; the one or more front lights further comprise a profile spotlight for illuminating the eyes of the subject and a fill lamp, such as a Fresnel lamp, for illuminating the subject from below such that light is incident on the underside of the subject to lift shadows in the clothing of the subject. A tightly slotted 'eye light' near to the camera line for example, will lift deep-set eyes without over-filling the body. Reducing the front/fill level compared to the side and rim light emphasizes the third dimension. The invention overcomes the problem of reduced light passing through the screen by utilizing the psychological effect that an object will appear brighter if contrasted with something that is less bright.

According to an aspect of this invention, by having the front light less bright than the back and/or side light, the edges of the subject, especially edges of darker clothing, hair or skin, will appear disproportionately brighter, which creates the illusion of the image to appear more rounded and to have greater depth. Furthermore, the shadows of the subject are more evident as they are not washed out by a bright front light, which would otherwise cause the image to appear flat.

By increasing the brightness of the back lighting relative to the front lighting, the projected Peppers Ghost (or AR) image appears to be more rounded and to have greater depth than images created from filming a subject using conventional three point lighting methods.

Optionally, and preferably when filming a subject with dark hair, dark skin or dark clothing, slightly exaggerated back/rim light gives the projected image enhanced brightness and sharpness. It also encourages the perception of a 3D image. Dark and glossy hair can be lifted by adjusting the height and position of the overhead KinoFio fixtures. However, advantageously the one or more overhead lights comprise one or more LEDs.

According to an aspect of the invention there is provided a method of filming a subject to be projected as a Peppers Ghost and/or AR image, the method comprising filming the subject under a lighting arrangement having one or more floor lights, wherein the subject is located directly above the one or more floor lights such that the subject is illuminated from below by the one or more floor lights.

A possible advantage of having one or more floor lights to illuminate the subject from below is that areas which would not be illuminated by front, back or side lights may be illuminated. For example, the underside of the subject's shoes or feet may be illuminated by the floor lights. By illuminating areas of the subject which would not be illuminated normally, the projection of the subject for a Peppers Ghost appears more real. For example, if the subject lifts their feet, the floor lights illuminate the base of the feet so that the base of their feet are captured on the projected film instead of the base of the feet appearing black due to a lack of illumination.

In one embodiment the one or more floor lights comprise a mask to collimate light emitted by the one or more floor lights such that light emitted by the one or more floor lights is not directly incident on a camera used to film the subject.

During acquisition of a full bodied image pay particular attention to illumination of the legs and feet of the subject. Make sure both are clearly defined, even to the extent of insisting that the shoes are changed to make them visible in the final projected film. The lighting arrangement is arranged to illuminate undersides of the subject's feet so that the base of the subject's feet are captured on the projected film.

An aspect of the invention provides a method of filming a subject to be projected as a Peppers Ghost and/or AR image, the method comprising filming the subject under a lighting arrangement having one or more lights which comprise one or more LEDs, wherein significant illumination of the subject, as measured at the subject, is provided by the one or more LEDs.

It will be understood that the term "significant illumination of the subject" means the one or more LEDs provide at least 10% of the lighting power incident on the subject, at least 25% of the lighting power incident on the subject, preferably at least 50% of the lighting power and most preferably at least 90% of the lighting power. In one embodiment, all of the lamps of the lighting arrangement are LED lamps and, therefore, 100% of the lighting power is produced by LED lamps. In some embodiments, the LED lamps can be flood lamps and/or spot lamps. If the filmed subject is being illuminated by LED it is preferable to use LED lights in the display venue too. LED lights are more easily programmed to match color temperatures of the live talent skin tones to the skin tone of the virtual subject/s being displayed as a projected image.

In certain—mainly music—situations, the design may require additional color washes. These are most effective as rim and side light using a limited range of distinctive colors. To make a substantial impact, the intensity of the colored sources must be sufficient to show above the existing rim light. PAR64 batons are an effective, if unsubtle, supplement to the lighting rig.

Acquiring a full bodied image of a subject requires a Steel deck stage or similar, to provide the subject a spatial boundary between the floor and the filming space and for the subject to work within. The stage size should match the dimensions of the display stage or the projected area within the display stage, whichever is smaller.

Semi-matt (e.g. 'Harlequin' dance floor) or high gloss surface applied to stage meaning the top of the filming and display stage. For instance a Black "Marlite" or "TV Tile" riser may give some subtle reflections of feet, etc. that may help the illusion that the virtual projected image is "standing" on the physical stage it is being projected in proximity of Black curtains would be the most preferable backdrop to filming each live stage talent and in certain circumstances the silvered grey or Vantablack modular screen arrangement could be used.

The lighting may be measured by a 360 degrees camera device (such as the RICOH THETA Z1 360) capable of capturing and accurately stitching 360 degrees images in RAW and/or DNG format (including the latest Android smartphones). The DNG format is open standard, which means the file format specification (based on the TIFF 6 file format) is made freely available to any third-party developer. This supports the case for DNG as an archive format that meets the criteria for long-term file preservation that will enable future generations to access and read the DNG raw data. The DNG raw data may comprise the lighting direction and luminosity in a single given area, such as about the filming stage of the subject.

The data settings may be processed by a number of programs able to read from and write DNG files including Lightroom and Photoshop from Adobe. The data settings may be programmed into the lighting control of the studio to regulate the position, luminosity or color temperature of the filming lights and/or the RAW data camera settings. Camera Raw caching is a process whereby the opening of proprietary raw files is now almost as fast as opening a DNG with Fast Load Data enabled in the Lightroom program. The DNG specification also enables image tiling, which can speed up file data read times when using multicore processors compared with reading a continuous compressed raw file, that can only be read using one processor core at a time.

Lighting The Display Stage

The color temperature of the lighting directed towards a live on stage performer should provide a skin tone match to the virtual Performer, a skin tone that is natural and matches as close as possible the hue and color temperature of the skin tones of similar skin types performing as live talent upon the display stage.

The key to lighting the live talent on-stage is to have the ability to match the color temperature, intensity and angles of the lighting for the person that is being transmitted to the live stage. One option is to use a number of static lights (generics) to firstly be rigged at the correct angles to light the live talent. These lights would then need to be color corrected with gel to match the color temperature of the holographic image.

Another method would be to use moving lights to light the live talent. The use of LED moving wash lights would make adjustments easier to light the live talent as one of the major problems with lighting using generic lanterns is that as you bring the intensity of light on the live talent down the color temperature it emits will change and there will be a greater mismatch in color temperatures. If LED moving lights are used they maintain a constant color temperature as their intensities are reduced thus making the match a lot easier. Also the LED moving wash lights have an integrated color mixing system using cyan, magenta, yellow and occasionally eta (color temperature orange). These effects make it particularly suitable to provide accurate color fidelity between the live and projected subjects, even when viewed on a secondary screen via a camera acquiring images from the display stage.

Another element of the lighting for the live stage element of the TP is the importance of creating the illusion of depth on the stage so that the holographic talent appears to stand out from the back drop and therefore becoming more lifelike. Again it is possible to use generic lighting to perform this function. I.e. up-lighting the backdrop of the stage with floor mounted par cans, making sure that none of these lights illuminate the area behind the holographic talent as this lighting will overpower the holographic projection and take away from the overall effect. Care needs to be taken to also ensure that the lighting level is consistent throughout the viewing angle of the system.

To make this task easier again the use of moving head wash and spot lights can be used with the addition of LED batons and/or par type fixtures. The advantage to using moving lights and LED technology is that you can alter the intensity, position, color and texture on the backdrop to avoid the position of the holographic talent in the live environment. The LED lighting can also provide a static color changing facility with the ability to alter the intensity; this again performs the same function of the moving lights.

According to another aspect of this invention LED Stage lights are located upstage around the peppers ghost display and LED display from downstage, wherein the lights are controlled to match lighting effects as used during acquisition of the filmed subject at a location of the projected subject image; and/or controlling the lights comprises illuminating the subject being displayed in response to a changing lighting environment at the location of the image acquisition; and/or the lighting arrangement further comprises one or more floor lights located on or below the display stage, wherein the subject display is located directly above the one or more floor lights such that the subject appears to the viewing audience to be illuminated from below by the one or more floor lights; and/or up-lighting a backdrop to a stage on which the Peppers Ghost is projected whilst making sure that none of these lights illuminate the area behind the Peppers Ghost image as this lighting may overpower the Peppers Ghost projection; and/or at least 10%, at least 25%, at least 50%, at least 75%, at least 90% or substantially all of the illumination of the subject by the lighting arrangement is provided by the one or more LED lighting units, or one or more LED Panels (together named "LEDs"), configured to emit light either directly towards an audience or onward broadcast camera or be reflected by a mirror towards an audience; and/or the filming of a subject to be projected as a Peppers Ghost image comprises projecting a telepresence through a semi-transparent screen, such as a sheet of glass or Foil, wherein the light output characteristics of the LEDs installed at either of the image acquisition or display venue are controlled substantially in real time; and/or the lights are controlled to create a color temperature for the subject being filmed that substantially matches the color temperature of real persons/objects at the location of the virtual image displayed, including 5500-5600 degrees Kelvin ("K") "daylight" color temperature applied to the white spotlights located about the stage and/or directed towards the virtual image being displayed and further, preferably directed towards the stage top around the feet of the projected image; and/or LED panels at the display venue are equipped to maintain the realistic match of appearance and skin-tone as required both to the naked eye of the viewing audience and the camera signal feeds capturing the display stage performance, the LEDs generating a virtual image for display with a color temperature range of between 1800K-9200K including 5500-5600 degrees Kelvin ("K") "daylight" color temperature applied to the white in the LED panel display; and/or Conditioning light emitted by the or at least one of the one or LEDs (impinging upon the semi-transparent screen) comprises using at least one hood or baffle fitted to at least one of the one or more LEDs so as to reduce the divergence of said light, such that the light is collimated by the hood or baffle into a beam which is substantially parallel and directed perpendicular to the light emitting surface of the LEDs; and/or the LED hood has a first end with a first aperture which is, in use, arranged to receive light from the LED and a second end with a second aperture arranged to allow said received light to escape the hood; and/or the second aperture is smaller than the first aperture; and/or the at least one hood has a substantially frustoconical or cylindrical shape and the inside surface of the hood is substantially composed of plastic, rubber or a combination of plastic and rubber.

As most film shoots will involve the recording of sound, a properly sound insulated and acoustically treated studio should be used. Bear in mind that the sound will be reproduced at a high level in the presentation and every extraneous sound will be heard. A professional sound recordist may be employed to use high quality microphones to record via a boom or personal/radio mic as appropriate.

According to an aspect of the invention there is provided a data carrier having stored thereon instructions that, when executed by a processor, causes the processor to receive inputs on characteristics of a subject to be filmed for projection as a Peppers Ghost and/or AR image, determine from the inputs a required configuration for lamps of a lighting arrangement for illuminating the subject during filming and send control signals to at least one of the lamps to cause the lamps to adjust to the required configuration. In this way, the control system can automatically configure the lamps as required by the characteristics of the subject to be filmed, saving time and reducing the need for an expert lighting technician.

The lighting control system may comprise memory having stored therein data on the required configuration for the lamps for different characteristics of the subject and determining the required configuration may be carried out by comparing the inputs of characteristics of the subject to those stored in memory. The control system may be configured to control the lighting arrangement so as to perform the method in accordance with any one of the lighting claims. The system may comprise a data carrier having stored thereon instructions for executing the method in accordance with any one of the earlier processes.

Peppers ghost images of 'virtual' human beings are becoming ever more realistic with advances in foil screen manufacture and installation processes allowing reflective polymer foil material as thin as 11 up to 120 microns to form large screens with surface areas typically up to 36 m wide×8.1 m high, characterized by surfaces that are smooth and free from surface deformities such as creases or wrinkles. In some embodiments, a frame carrying the foil can include adjustment mechanisms for re-tensioning the foil to maintain a substantially wrinkle free and flat screen surface finish during operation. The result is a screen that when used as part of an illuminated stage apparatus is all but invisible to the viewing audience yet is capable of 'bouncing' (reflecting) imagery (solid or video) onto the stage that is virtually indistinguishable from the image of the original.

Transmission Of The Virtual Image To A Remote Location

In order to permit audience members viewing online to interact with a filmed subject, each display monitor in the remote location requires a camera and microphone. Further, the live audience at the display venue is visible to the filmed subject. Transmission of the AV signal needs a certain amount of data space, or bandwidth, from the communications link in order to transmit the AV signal to the remote location. The amount of data space required is dependent upon two key factors—the data size of the signal in its 'unpackaged' (uncompressed) format and the way the AV signal is then 'packaged' or compressed. The packaging of data is achieved using an audio/video codec.

The key difference between telepresence (TP) and streaming is that TP is a real time low latency signal of between 100 milliseconds-600 milliseconds and streaming is typically a more contributory form of transmission in the range of 700 milliseconds up to 30 seconds in a live event scenario, or streaming productions may be recorded and transmitted to a viewing audience as a video on demand service typically using a PC, smartphone or set top box device.

Codec accessories and communications protocols come in many forms. Generally, a codec includes software for encryption and compression (together Encoding) of video and audio into a data packet, which can then be transmitted over an ethernet, wi-fi, satellite, wireless 4G or 5G cellular connection or radio wave signals; the encoded signal subsequently being decoded by a decoding device located at the remote location. The codec is often incorporated into a box chassis, much like the casing of a typical small network computer chassis.

Codec chassis can have a variable number of inputs and outputs allowing the processing of multiple data streams or signal feeds, inwards (downloading) and outwards (uploading). See PCT/GB2009/050850 attached diagram FIG. 1 to understand how a codec sits in the broadcast stream and FIG. 2 to view internal working of a codec unit. Codec are designed and configured to process particular kinds of audio and video streams. (See FIG. 2, in which the codec audio inputs are fitted with various technical features described as filters, limitors, gates, compression and EQ Delay).

Prior Art to this invention relates in the main to the most common video streams at the time (2008) of Broadcast Pal or NTSC (BP NTSC), High Definition signals of 720 horizontal lines progressive (720P) for the filming room return feed display and/or the Heads Up Display [see patent U.S. Pat. No. 8,462,192] and for the display stage a minimum of 1920 vertical lines×1080 horizontal lines progressive (1080P) and 1920 vertical lines×1080 horizontal lines interlaced (1080i). Other video standards such as 2K, 4K, and 8K resolutions could also benefit from the teachings here but we shall concern our solutions to be capable of solving the issues using video standards that are in widespread use currently.

ATSC and DVB Codec support 1080p video, but only at the frame rates of 24, 25, and frames per second (1080p24, 1080p25, 1080p30) and their 1000/1001-rate slow versions (e.g. 29.97 frames per second instead of 30). Higher framerates, such as 1080p50 and 1080p60, could only be sent with more bandwidth or if a more advanced codec (such as H.264/MPEG-4 AVC) were used. Higher frame rates such as 1080p50 and 1080p60 are currently being used as a broadcasting standard for film, streaming and TV production.

A fast 10 MB public line may bottleneck at some point before reaching its destination, thus again affecting the signal which, in TP applications, manifests itself as a sound/video/picture drop out—i.e. a temporary blank screen or a blast of missing words-unacceptable for a realistic immersive interactive experience.

This format to work effectively will require a whole new range of studio equipment including cameras, storage, edit and contribution links (codecs) as it has doubled the data rate of current 50 or 60 fields interlaced 1920×1080 from 1.485 Gbits/sec to the Progressive format of 50p and 60p approximating nominally to 3 Gbits/sec. 4K is nominally 12 Gbits/sec.

The Codecs

According to new aspects of this invention is a method of filming a subject suitable for display as life size peppers ghost image and optionally, transports the live capture signal in a secure, low latency, HD video over a private or public network at extremely low bit-rates, wherein:

The codec box will have integral to its design or be augmented with a sound echo cancelling delay device. The function of this device is twofold; to allow manual adjustment of an audio signal (such as the speaking voice of a filmed subject) to be synchronized with the lip movements of the subject when appearing on the audience viewing stage, and to cancel out echo of the amplified audio signal being broadcast at the audience venue (including the voice of the filmed subject) as it is fed back as a return audio signal to the filming studio.

The Acoustic Echo Cancellation (AEC) block is designed to remove echoes, reverberation, and unwanted added sounds from a signal that passes through an acoustic space. AEC is needed when a far end signal (voice originating at the other end of a line of communication) is played over a loudspeaker into a reverberant acoustic space and is picked up by a microphone. If the AEC algorithm were not implemented, an echo corresponding to the delay for the sound to travel from the speaker to the microphone, as well as any reverberation, would be returned to the far end. In addition to sounding unnatural and being unpleasant to listen to, the artifacts substantially reduce speech intelligibility.

As shown in the diagrams the sound coming from the remote person speaking, known as the Display Stage, is sent in parallel to a DSP path and to an acoustic path. The acoustic path consists of an amplifier/loudspeaker, an acoustic environment, and a microphone returning the signal to the DSP. The AEC block is based on an adaptive FIR filter. The algorithm continuously adapts this filter to model the acoustic path. The output of the filter is then subtracted from the acoustic path signal to produce a "clean" signal output with the linear portion of acoustic echoes largely removed. The AEC block also calculates a residual signal containing nonlinear acoustic artifacts. This signal is sent to a Residual Echo Cancellation block (RES) that further recovers the input signal. The signal is then (optionally) passed through a noise reduction function to produce the output, which in this invention is the remote location. The filter pauses adaptation when it detects sounds in the acoustic path unrelated to the far end in. This allows sounds in to be added to the far end out.

For example, in the case of a hands-free system or speakerphone, adaptation pauses when a person speaks directly into the microphone. The person at the far end hears only the local talker and not the echoes and reverberation from the far end in the near end space. This is absolutely necessary for clear, full duplex conversation over a communication channel.

It is desirable for the codecs used in a live and interactive audio video stream to deliver a signal return speeds of between 80 milliseconds (ms) and 800 ms supporting a frame rate for the display of 1080 HD of at least 50 frames per second using 4 mb/sec; or a higher more continuous bandwidth by way of individually or in blended form any of ethernet cable, wi-fi, satellite, Wireless Cellular 4G, 5G and even 6G signal transmission technology providing the required bandwidth to connect a desirable signal data rate of 8 mb/sec 1080 50p for a full bodied HD image.

Codecs supporting H.264 signal encoding and decoding can be beneficial for live, interactive and bandwidth constrained applications using single channel SDI, DVI and Dual channel SDI configurations; and optionally the codecs provide recovery from packet loss with either forward error correction (FEC) or by using the Secure Reliable Transport (SRT) open source protocol capable of an adjustable receive buffer to tune signal speed performance of a filmed subject where transmission is significantly reliant upon a public internet connection between the film acquisition and display stage.

Secure Reliable Transport (SRT) is an open source video transmission protocol and technology stack that optimizes video streaming performance across unpredictable networks such as a public internet connection. One key feature of SRT is a guaranteed service whereby the compressed/encoded video signal that enters the network is identical to the one that is received at the decoder, dramatically simplifying the decoding process. SRT also provides users with the means to more easily traverse network firewalls (in contrast to both RTMP and HTTP that only support a single mode). SRT also provides for bringing together multiple video, audio, and data streams within a single SRT stream to support highly complex data workflows, including multipoint to multipoint data delivery, preferably via a network cloud often referred to as an SRT gateway.

Corporate firewalls are a common hindrance to the inward flow of a low latency video transmission since by their very nature, a firewall exists to be a form of gatekeeper to the inward data stream. Deploying SRT provides greater robustness to the signal integrity being successfully retained during transmission by providing control to the signal speed to be optimized according to the performance and available bandwidth of the network, even if the process of mitigating signal drop out manifests itself only in marginal delay to the signal latency; and/or Forward error correction (FEC) or channel coding is a technique used for error control in data transmission over unreliable or noisy communication channels, for example a public internet connection. The key principle of FEC is that the video transmission data from a sender location is encoded in a redundant way, most often by using an ECC.

The redundancy allows the display location decoder to detect a limited number of errors that may occur anywhere in the message, and often to correct these errors without re-transmission. FEC gives the receiver the ability to correct errors without needing a reverse channel to request re-transmission of data, but at the cost of a fixed, higher forward channel bandwidth. FEC is therefore applied in situations where re-transmissions are costly or impossible, such as one-way communication links and when transmitting to multiple receivers in a multicast situation.

Alternatively, the signal transmission and operational control of one or more cameras located at an image acquisition or a display location and connected to a communications network may take the form of a Network Device Interface (NDI), including the more recent protocols of NDI HX, NDI HX 2 and most desirably NDI 5. The NDI protocol is most commonly operated over a Local Area Network, enabling easier control and monitoring of NDI devices, such as a camera acquiring an image of a subject or a performance stage. In particular NDI 5 protocol provides for more efficient operational control over a Wide Area Network (WAN) as well as support for cameras recording audio integral to their process.

It is desirable for the codec providing support for H.265, or HEVC protocols, which is especially useful when transmission of the AV signal is over a public internet connection rather than a private or dedicated WIPLS connection, because HEVC can reduce bandwidth requirements by up to 50%, while maintaining video quality when compared to H.264; and/or H.264, H.265 and HEVC codec capable of decoding streams with 8- or 10-bit pixel depth & 4:2:0 or 4:2:2 chroma sub-sampling; and/or 4K codec comprising 4×3G 1080 SDI connectors to provide either a single 12G SDI signal totaling 3840×2136 pixels and optionally, 2 or more 3G 1080 SDI connectors in which the individual signals are configured or subsequently processed through a video processor/scaler for onward display to an LED screen arranged to a frame HD1080 pixels width×1920 pixels height signals, and/or together with 1 or more individual HD 1080 pixels height signals with 1920 pixels width.

One benefit of this multiple camera embodiment is that multiple HD cameras can be processed by a single Codec equipped with multiple 3G SDI inputs; wherein the individual video signals are HD 1080 resolution transmitted together as 4 separate signals using a single 4 k video codec and optionally a single video/audio embedder, resulting in more accurate synchronized video/audio accuracy or programmed timing delay when compared to transmitting the multiple independent HD signals using multiple independent codecs.

The codecs are connected to a network router which is connected to a high upload and download speed network via ethernet cable, or wirelessly through a 5G wireless router and 5G data sim card transmitting the audio/video signals to each of the filming studios or display stages over either a public network or private virtual network.

The codecs may be equipped to embed audio and video signals together prior to encoding or decoding, but are optionally and preferably connected to a devices capable of embedding the audio and video stream/s being transferred to and from the image capture stage; and de-embedding the incoming audio video stream to and from the display stage in order to maintain intelligent lip synching of the peppers ghost display and the audience return feed signal to the filmed subject. Preferably, embedded audio is used in the Telepresence display, wherever the location.

A Frame Synchronizer 3218 may be used to embed and de-embed video/audio being captured in one or more locations using one or more cameras and/or where one or more subject films originating from one or more different locations or are displayed using in one location upon one or more display devices. The Frame Synchronizer 3218 provides synchronization of an incoming video and audio source to the timing of an existing video system (including a codec) to ensure the audio/video display works with a common time base to the video timecode or timecode applied in a live performance, such as an existing musical or rhythmic click track to ensure the audio/video display works with a common time base to a musical or rhythmic click track or a genlock signal.

A Frame synchronizer 3218 may also provide up/down/cross-conversion on each video signal input as standard and allows 1080i to 720p, or 720p to 1080p conversion; and/or Provide audio signal processing capability with individual audio channel delay adjustment of between milliseconds and 1,000 milliseconds (1 second) and optionally, collective delay adjustment for each audio grouping; and/or provide video signal processing capability equipped with a frame buffer to provide adjustment of up to 12 frames or 500 milliseconds of delay; and/or provide embedded audio signal per line of 3G/HD (synchronous/asynchronous) video or SD-SDI* (synchronous) input; and/or provide Audio to Digital and Digital to Audio conversion, MUX/DEMUX and remapping, in combination with the embedded audio signal and/or a sampling rate converter to superimpose an external sound source such as a microphone on the camera image.

In addition to inserting external LTC time codes, provide an internal time code generator which enables each channel selected to insert timecode or bypass the Timecode channel/s altogether; and/or register Log Gamma curves for HDR (High Dynamic Range) processing providing for accurate color fidelity and control between cameras and display devices, including control of accurate color for display devices comprising semi-transparent screens, in order to ensure the audio/video display matches the color pantones and saturation of an existing video display and; or register Log Gamma curves for HDR (High Dynamic Range) processing to ensure the audio/video display matches ITU-R BT.2020 WCG (Wide Color Gamut) specifications, providing control of color pantones and saturation relative to a live talent performance; and/or provide color fidelity correction to the camera output signal without upsetting the display white balance; and/or to convert video signal colors into a monotone or sepia; and/or to convert a level B 3G Video signal from any Sony Camera Output to a Level A 3G signal, defined as an up/down/cross/aspect converter to unify signal formats originating in various devices.

The Frame Synchronizer 3218 may provide work as 4×1080p or a 2160p, 4K (QFHD) video processor, where real time low latency processing and color fidelity are required, and be operated as a 4K-compatible frame synchronizer 3218, as well as a 4K color corrector.

The Frame Synchronizer 3218 may be equipped with a full range of Input and Output signal options for 4K/UltraHD displays including HDMI v2.0b/CTA-861-G; Quad 1.5G; Dual 3G; and Quad 3G, 6G and 12G over a range of Coax and optional Fiber cable choices.

The system functionality of the Frame Synchronizer 3218 may be operable entirely remotely via a network connection.

System Discussion

According to an aspect of the invention there is provided a system for acquiring live and on demand audio/video images of one or more subjects concurrently, the system comprising one or more cameras, a stage riser arranged in front of a black, blue, green or silver screen, a lighting arrangement having one of more first lights for illuminating a front of the subject, one or more second lights for illuminating the rear and/or side of the subject and operated to illuminate the outline of the subject.

The one or more cameras may be equipped with a zoom lens or preferably, with a fixed prime lens of between 35 mm-50 mm. The cameras may acquire images in 1080 HD interlaced or progressive signals or UHD 3840×2160 pixels, or 7680×4320 progressive of between 24-120 frames per second. The cameras may be equipped with adjustable iris settings to compensate for light intensity and arranged to process light having an intensity of below a certain threshold value as being black. The cameras are preferably equipped with variable shutter angles to apply motion blur to the image of the subject appearing in the projected film, as a means of providing fluid motion of the filmed subject, without a strobing or shuttered look. Optimally the shutter angle is set to 180 degrees when filming at 24 frames per second, to 270 degrees when filming 1080 HD or UHD 3840×2160 or 7680×4320 progressive at 60 frames a second. Higher speed filming at 120 frames a second may advantageously use a 360 shutter, in which the film receives all the light during exposure.

The system comprises tripods or mounts for the cameras providing for the camera lens to be at least 20 cm higher than the stage and vertical adjustment to a height up to 200 cm higher than the stage.

The backdrop behind the subject may comprise light absorbent or non-reflective black material such as serge wool drape or panels coated with Vantablack® in order to minimize unwanted reflection of the filming lights appearing in the projected film. Alternatively the backdrop may be a green screen, preferably digital green, providing for an easier keyline separation of the subject image from the background during transmission.

The stage may be covered with a semi matte black vinyl floor top such as Marlite ballet flooring to reflect the lower portions and feet of a subject.

The lighting may include LED panels as wash or spot lights and/or illumination for the subjects lower body and feet, the illumination preferably directed towards the subject from lights located on the floor, or below the subject.

The system may comprise equipment to acquire audio of a subject, comprising one or more microphones to capture audio, one or more in-ear monitors enabling subjects to receive an audio signal directly in ear; one or more amplifiers to amplify an audio signal; one or more audio monitors transmitting audio into an acoustic space and one or more audio desks to process and distribute the audio to the AV transmission equipment.

The audio is optionally processed by one or more audio to video embedders and one or more video to audio de-embedders; the units being either integral to a frame synchronizer described in further detail below, or stand-alone units, equipped with SDI or HDMI input or output connectors the embedders providing means of embedding the audio signal of the subject to the video signal of the subject prior to the signal encoding at an image acquisition location, and further de-embedding the audio from the video signal after the signal has been decoded at a display location, whereby the system accurately calibrates the audio and video to present subject lip movement correctly synchronized to the subject audio.

The system may comprise one or more pairs of encoders and de-coders to encode an audio video signal at a location for acquiring video images and decode the video signal at a location for displaying images, the two locations each further equipped with network routers connected to the encoder/s and decoder/s for transmission over a communications network between an image acquisition location and a display location.

Alternatively transmission between the remote venues may be via a network cloud service providing web-based video content hosting, storage and distribution. Optionally, the encoders/decoders may incorporate in their design or be augmented with either forward error correction (FEC) or the Secure Reliable Transport (SRT) open source protocol capable of an adjustable receive buffer to tune the data stream optimally to the signal speed performance.

The codec are preferably equipped with one or more SDI 3G input connectors, preferably at least 4 inputs, providing encoding of one or more 1080i audio video signals at 50 or 60 frames per second, and preferably, 4× HD1080i signals or 1×UHD signal of 3840×2160 pixels. The codec are preferably equipped with or augmented to an Acoustic Echo Cancellation (AEC) block designed to remove echoes, reverberation, and unwanted added sounds from a signal that passes through an acoustic space.

The codec are preferably equipped with or augmented to a Frame Synchronizer providing means to synchronize the timing of up to 5 channels of incoming video and audio sources to the timing of an existing video system (including a codec), wherein the available adjustment to video delay is up to the greater of 12 video frames or 500 milliseconds per channel; and the available audio delay is between 8-1000 milliseconds, to ensure the audio/video signal works with a common time base forming part of the performance at the display venue.

The Frame synchronizer 3218 may comprise features and functionality to provide means of homogenizing the frame rate, format and/or color characteristics of more than one video signal acquired in a single venue prior to transmission to an encoder. Alternatively, if there are multiple video signals transmitted to the display venue from more than one acquisition studio location. the Frame synchronizer may be installed at the display venue to receive multiple signals from a decoder in order to perform similar functions as described above, prior to transmission of video to the video processor and audio to the audio desk.

The frame synchronizer may provide processing of more than one audio source transmitted to the timing of an existing musical or rhythmic click track from one or more image acquisition locations, to ensure performances originating from multiple remote locations and working with a common time base to a musical or rhythmic click track, are synchronized to the common time base prior to the final performance being broadcast at the display location.

A system incorporating a video processor 3320 such as the Barco Encore, and Christie Spyder X20 located in the display venue between the decoder and the video display, the processor providing a switchable matrix for routing multiple audio/video signals from one AV device to another to provide a Heads Up Display; and/or incorporating alpha channel layering for compositing a live display of more than one image source to become a single composite image display; and/or Picture In Picture (PIP) processing of one or more camera signals viewing a projection stage at a display location, together with one or more cameras viewing an audience at a display location; and/or image sizing the signals; and/or arranging image orientation in portrait or landscape mode; and/or controlling the locational placement of the filmed subject on a stage; and optionally displaying 3D Graphics via the processor's input channels from a live signal via codec or pre-recorded media player alongside an image of a filmed subject display.

The System Of Display

A system comprising a semi-transparent screen and an image source installed upon a performance stage in front of a backdrop, the semi-transparent screen being a smooth, flat partially transmissive surface for receiving a video image projected by the image source, the image source comprising a projector and reflective projection screen, or a video wall comprising LED panels generating and directing a partially reflected image toward an audience. The system comprises LED lights located behind the semi-transparent screen, and installed on or above the stage; the system including a semi-transparent screen arranged at an angle to the projected subject film, wherein the amplified light image source projects the subject film towards the semi-transparent screen from above the stage or below the stage, and illumination of the stage backdrop located behind the subject and semi-transparent screen, wherein the stage lights are equipped to provide control to maintain a constant color temperature as the level of illumination is reduced and further, to balance the color temperature between the live and projected subjects.

The LED lights may include spot lights, or wash lights or batons and/or par type fixtures located upstage behind the semi-transparent screen, the lights illuminating the stage and directed toward the subject from behind the subject, controlled such that projecting the film produces a Peppers Ghost image, wherein the semi-transparent screen is a Foil, for example the Peppers Ghost system as described in WO2007052005, wherein the amplified light image source directed towards the Foil comprises a projector and a front or rear projection screen.

What is claimed is:

1. A video acquisition and display system, comprising a display system including: a video wall for generating and projecting an image, wherein the video wall comprises at least one LED panel including a clear, smooth surface coating to diffuse light from the at least one LED panel to minimize the incidence of moire on the image generated by the video wall; a foil screen tensioned in a frame, the foil screen reflecting the image generated by the LED Panels, the reflected image forming a hologram superimposed onto a stage backdrop located behind or upstage of the foil screen; and a filming system for capturing the image of one or more subjects at a remote location from the display system, the filming system including:

one or more filming cameras positioned to capture one or more images of corresponding one or more subjects, each of the one or more filming cameras orientated in either a portrait or landscape orientation depending on the orientation of the corresponding one or more subjects; and a single codec encoder operable to receive the captured one or more images from the one or more filming cameras, encode the one or more images into a data packet, and transmit the data packet to the display system.

2. The system of claim 1, wherein the LED panel includes a display face positioned closest to the foil screen at a distance of at least 12 inches or 25 cm from the foil screen.

3. The system of claim 2, wherein the clear smooth surface coating is a clear resin top coating applied to the display face of the LED panel to create a flat, smooth clear or semitransparent surface to diffuse light from the at least one LED panel to minimize the incidence of moire on the image generated by the video wall.

4. The system of claim 1, wherein the video wall of the display system further comprises one or more LED panels which each receive a corresponding captured image from a corresponding one or more filming camera of the filming system, each of the one or more LED panels mirroring either the portrait or landscape orientation of the corresponding one or more filming camera, wherein each of the one or more captured images acquired by the one or more filming cameras is a 1080 HD resolution video, and each of the one or more LED panels is a 1080 HD resolution LED panel, such that when each of the one or more LED panels projects the corresponding 1080 HD resolution captured image onto the foil screen, the resulting hologram can have up to 1920 pixels in vertical height resolution.

5. The system of claim 4, wherein the filming system further comprises a frame synchronizer operable to receive the one or more captured images from the one or more filming cameras, and take one or more of the following actions prior to sending the one or more captured images to the codec encoder:

(i) synchronizing the timing of the one or more captured images with a common time base; and/or (ii) synchronizing the timing of the one or more captured images to the timing of a time base of a live performance; and/or synchronizing the timing of the one or more captured images to the time base of an existing musical or rhythmic click track.

6. The system of claim 5, wherein each of the one or more captured images includes an audio and visual component, the frame synchronizer is operable to synchronize both the audio and visual components of the one or more captured image to the common time base and/or the time base of the live performance and/or the time base of the existing musical or rhythmic click track.

7. The system of claim 5, wherein the frame synchronizer is operable to:

(i) Register Log Gamma curves for HDR (High Dynamic Range)* processing providing for colour matching between the one or more cameras of the filming system and the one or more LED panels of the display system to ensure the colour pantones and saturation of the one or more captured images matches the colour pantones and saturation of an existing video display of the display system; and/or (ii) Register Log Gamma curves for HDR (High Dynamic Range)* processing to ensure the colour pantones and saturation of the one or more captured images matches the colour pantones and saturation of an existing live performance display of the display system; and/or (iii) Register Log Gamma curves for HDR (High Dynamic Range)* processing to ensure the one or more captured images matches ITU-R BT.2020 WCG (Wide Color Gamut) specifications; and/or (iv) Provide colour correction to one or more captured images without upsetting the white balance of the display system.

8. The system of claim 1, wherein each of the one or more filming cameras is operable to capture an image of a different subject within the filming system.

9. The system of claim 1, wherein each portrait oriented one or more camera is operable to capture the image of a corresponding standing subject, and each landscape oriented one or more camera is operable to capture the image of a corresponding seated subject.

10. The system of claim 1, wherein the one or more cameras can be in the same location or in remote locations from one another.

11. The system of claim 1, wherein the display system includes a display stage on which the hologram is projected, and the display stage includes a lit backdrop positioned behind the projected hologram.

12. A method for recording or live transmission of one or more captured audio/visual images of one or more subjects captured in one or more locations using one or more cameras, the one or more captured audio/visual images being displayed in another location using one or more LED panels to project corresponding captured audio/visual images toward a foil screen tensioned in a frame, the foil screen reflecting the one or more captured audio/visual images projected by the one or more LED panels, the reflected image forming a hologram superimposed onto a stage backdrop located behind or upstage of the foil screen, wherein each of the one or more LED panels is coated with a clear resin top coating applied to a display face of the one or more LED panel to create a flat, smooth clear or semi-transparent surface to diffuse light from the at least one LED panel to minimize the incidence of moire on the image displayed by the LED panel, and wherein the subject film signals are channeled through a Frame Synchroniser in order to:

(i) synchronize the timing of the one or more captured images with a common time base; and/or (ii) synchronize the timing of the one or more captured images to the timing of a time base of a live performance; and/or (iii) synchronize the timing of the one or more captured images to the time base of an existing musical or rhythmic click track.

13. The method of claim 12, wherein each of the one or more subjects is filmed in front of a black, blue, green or silver screen under a lighting arrangement having one of more first lights for illuminating a front of the subject, wherein the first lights are angled such that the majority of light emitted by the first lights is not reflected by the back screen back to the subject, and one or more second lights for illuminating the rear and/or side of the subject and operated to illuminate the outline of the subject; wherein the level of illumination from the second lights illuminating the outline of the subject is equal to or greater than the level of illumination from the one or more first lights, wherein the camera is locked off and the subject is moving, the lighting arrangement arranged to cause shadows to move across the subject as the subject moves under the lighting arrangement.

14. The method of claim 12, wherein the captured image from each of the one or more cameras is provided to and displayed from a corresponding LED display.

15. The method of claim 12, wherein each of the one or more cameras is oriented in either a portrait or landscape orientation, and each of the one or more LED panels has an orientation matching the corresponding one or more camera.

* * * * *